(12) United States Patent
Yanagisawa

(10) Patent No.: US 6,332,756 B1
(45) Date of Patent: Dec. 25, 2001

(54) MOTION CONVERTING UNIT

(75) Inventor: Ken Yanagisawa, Matsumoto (JP)

(73) Assignee: Yugen Kaisha Sozoan, Nagano (JP)

( * ) Notice: Subject to any disclaimer, the term of this patent is extended or adjusted under 35 U.S.C. 154(b) by 0 days.

(21) Appl. No.: 09/478,368

(22) Filed: Jan. 6, 2000

(30) Foreign Application Priority Data

Jan. 12, 1999 (JP) .................................. 11-004867
Mar. 9, 1999 (JP) .................................. 11-062239

(51) Int. Cl.[7] .................................. F03D 5/06; B63H 1/00
(52) U.S. Cl. .................................. 416/81; 416/198 R
(58) Field of Search .................................. 416/65, 66, 68, 416/81, 198 R

(56) References Cited

U.S. PATENT DOCUMENTS

| | | | |
|---|---|---|---|
| 1,486,040 | * | 3/1924 | Schieferstein ................ 416/81 X |
| 2,721,453 | * | 10/1955 | Reutter ................ 417/254 |
| 3,040,976 | * | 6/1962 | De Mattos ................ 416/66 X |
| 3,341,689 | * | 9/1967 | Reichenbach ................ 416/81 X |
| 3,874,320 | * | 4/1975 | Wood ................ 416/81 X |
| 4,184,805 | | 1/1980 | Arnold . |
| 4,595,338 | * | 6/1986 | Kolm et al. ................ 416/81 X |
| 5,522,712 | | 6/1996 | Winn . |

FOREIGN PATENT DOCUMENTS

| | | |
|---|---|---|
| 2612157 | 10/1951 | (JP) . |
| 6036600 | 3/1985 | (JP) . |
| 6280000 | 5/1987 | (JP) . |
| 6159300 | 6/1994 | (JP) . |
| 8177710 | 12/1996 | (JP) . |

* cited by examiner

Primary Examiner—John E. Ryznic

(57) ABSTRACT

The multi-functional motion converting unit can be compact, efficient and inexpensive. In the motion converting unit of the present invention, a holding member is provided in a plane. A swing fin is extended, from the holding member, in a direction perpendicular to the plane. The swing fin has a first face and a second face, which cross a swing direction of the swing fin. The faces are capable of guiding a flow of a fluid. A swing width of a free end of the swing fin is wider than that of a base end thereof when the holding member is moved in the direction parallel to the plane. Guiding means guides the movement of the swing fin with the holding member.

21 Claims, 39 Drawing Sheets

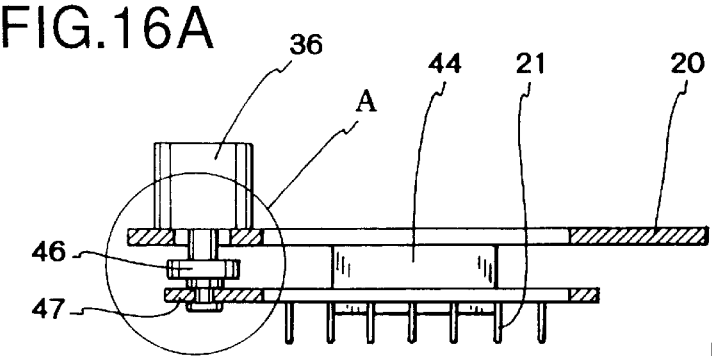
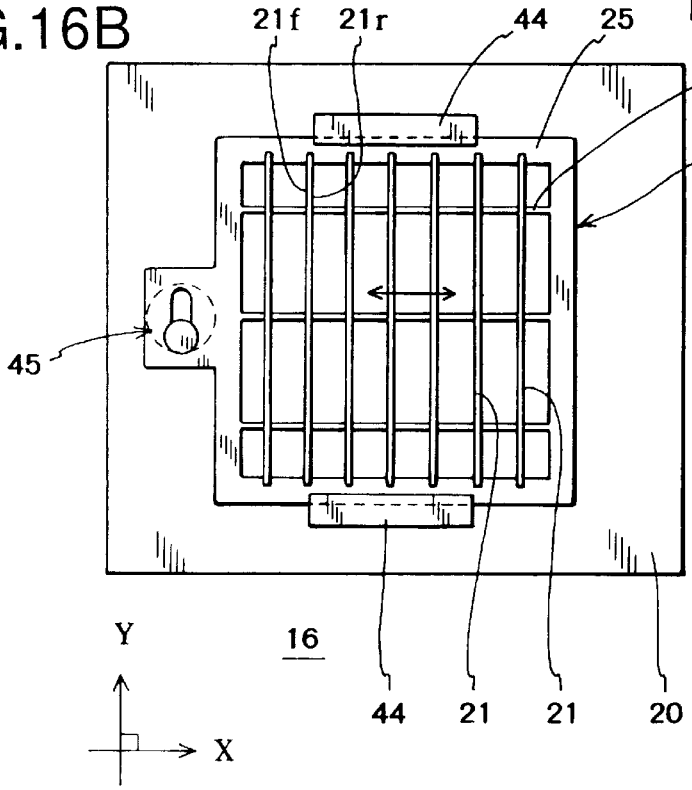
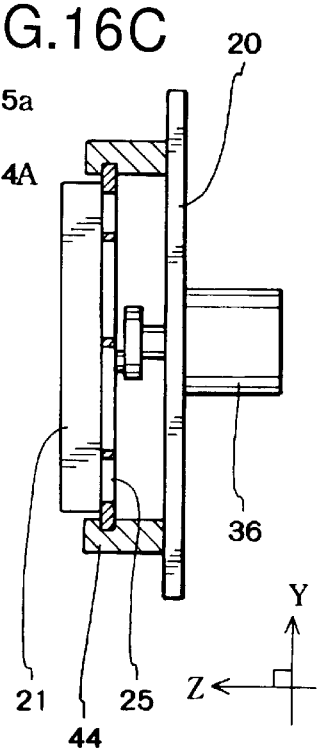

FIG.29A
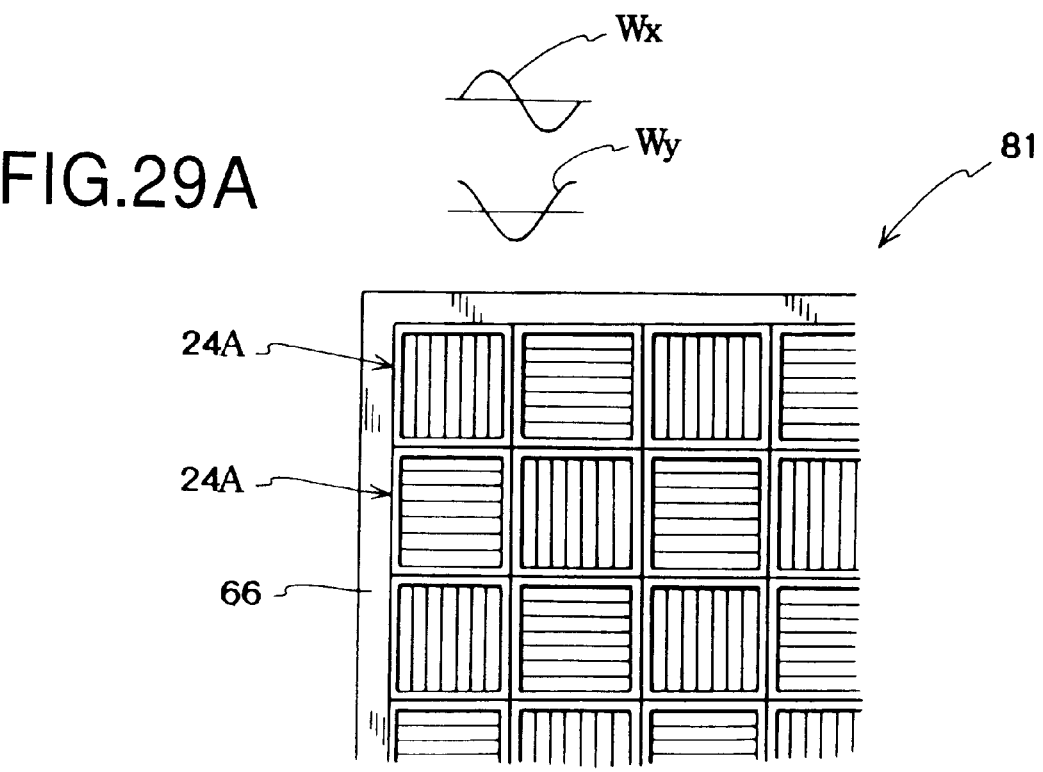
FIG.29B
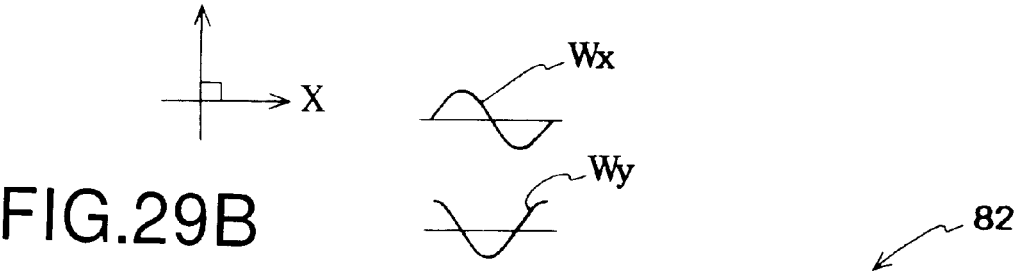
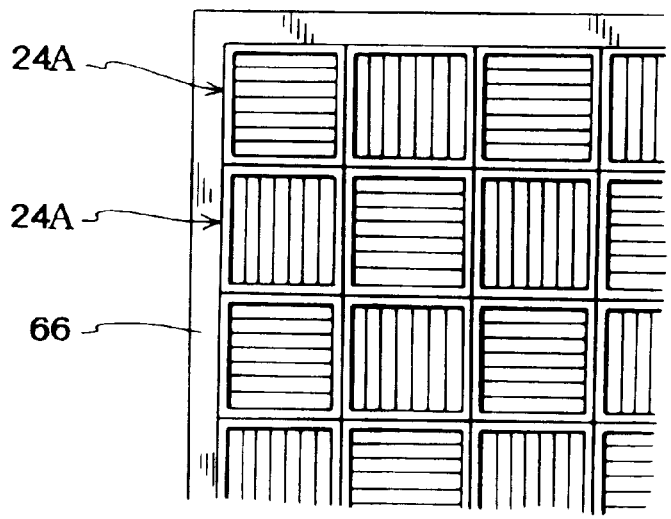

MOTION CONVERTING UNIT

BACKGROUND OF THE INVENTION

1. Field of the Invention

The present invention relates to a motion converting unit. In particular, the present invention relates to a motion converting unit capable of converting mechanical motion into a flow of fluid, e.g., a blower, a pump, or converting a flow of a fluid into a mechanical motion, a wind electric generator, a wave electric generator.

2. Description of Background Art

An air blower has a propeller and a motor for rotating the propeller. By rotating the propeller about its own axis, an air flow is generated. Namely, a mechanical motion (the rotation of the propeller) is converted into the air flow.

On the other hand, a propeller of a wind electric generator is rotated by the air flow (wind). The air flow rotates the propeller about its own axis. Namely, a flow of a fluid (the air flow) is converted into a mechanical motion (the rotation of the propeller). Finally, energy of the flow is converted into electricity.

If the fluid is water (liquid), a pump converts a mechanical motion (rotation of a propeller) into a water flow; a water-driven electric generator converts a water flow into a mechanical motion (the rotation of a propeller).

The above described mechanisms are capable of converting kinetic energy of a solid body (or a mechanical motion) into kinetic energy of a flow of a fluid (or a flow motion) and vice versa.

Each of said mechanisms includes a motion converting unit, in which a moving body is capable of revolving about its own axis like a rotor unit or reciprocatively moving like a cylinder-piston unit.

In the case of a reciprocative motion unit, a high pressure flow can be generated or great power can be gained from a high pressure flow. However, the reciprocative motion unit cannot efficiently generate power when the pressure of the flow is lower and the amount of the flow is greater. Furthermore, vibration is apt to occur in the unit.

Therefore, conventional blowers, e.g., an air conditioner, a ventilator, a cooling fan, employs the fan revolving about its own axis.

However, the conventional motion converting units have the following disadvantages.

They cannot be made thinner, their function cannot be improved, and their manufacturing cost cannot be reduced, so they cannot be satisfied with various requirements, e.g., size, output power.

For example, the conventional revolving fan has a simple structure and is capable of efficiently flowing air. But a motor is serially connected to a shaft of the fan. Therefore, it cannot be made thinner in size. And, an opening section, to which the fan is attached, is partially closed by the motor, so a whole area of the opening section cannot be used for sucking air. Further, the size of a blower must be defined by a size and a shape of the fan, so a size and a shape of the blower cannot be designed freely. Namely, sizes and shapes of blowers must be limited.

SUMMARY OF THE INVENTION

An object of the present invention is to provide a multi-functional motion converting unit, which can be compact, efficient and inexpensive.

To achieve the object, the motion converting unit of the present invention has following structures.

A motion converting unit, comprises:
- a holding member being provided in a plane extending in a first direction and a second direction perpendicular to the first direction;
- a swing fin extending in a third direction, which is perpendicular to the first and second directions, from the holding member, the swing fin having a first face and a second face, which cross a swing direction of the swing fin and which are capable of guiding a flow of a fluid, wherein a swing width of a free end of the swing fin is wider than that of a base end thereof when the holding member is moved in the direction parallel to the plane; and
- means for guiding the movement of the swing fin with the holding member.

In the motion converting unit, rigidity of a base end part of the swing fin may be greater than that of a free end part thereof. With this structure, the mechanical motion including a linear motion can be converted into the flow motion of the fluid and vice versa.

In the motion converting unit, a plurality of the swing fins may be provided, in parallel, on the holding member, which is provided in the plane. With this structure, the mechanical motion including a linear motion can be converted into the flow motion of the fluid and vice versa.

In the motion converting unit, a plurality of the swing fins may be matrically and symmetrically provided, in parallel, in the first direction and the second direction with this structure, the mechanical motion including a circular motion can be converted into the flow motion of the fluid and vice versa.

In the motion converting unit, the swing fins may be held by the holding member, which has an opening section for introducing the fluid in the third direction. With this structure, a flow-in direction and a flow-out direction of the fluid can be the same, so that fluid resistance can be reduced and the motion can be efficiently converted.

In the motion converting unit, the swing fins and the holding member may be formed in a swing fin unit, the holding member may be formed into a frame shape and have an opening section for introducing the fluid in the third direction, a bridge section may be spanned in the frame-shaped holding member, the swing fins may be integrally connected the bridge section. With this structure, the motion converting unit can be employed for wide use, and the efficient motion converting unit can be manufactured with a low cost.

In the motion converting unit a plurality of the swing fin units may be matrically and symmetrically provided. With this structure, the function of the unit can be improved and the size and the shape of the unit can be freely designed by properly combining the swing fin units.

Another motion converting unit comprises a plurality of sub-units, which are linearly arranged in a flowing direction of a fluid,
  wherein each sub-unit comprises:
    a holding member being provided in a plane extending in a first direction and a second direction perpendicular to the first direction;
    a swing fin extending in a third direction, which is perpendicular to the first and second directions, from the holding member, the swing fin having a first face and a second face, which cross the swing direction of the swing fin and which are capable of guiding a flow of a fluid, wherein a swing width of a free end of the swing fin is wider than that of a base end thereof when the holding member is moved in the direction parallel to the plane; and means for guiding the movement of the swing fin with said holding member. With this structure, the flow with higher pressure can be generated, or greater power can be gained from the flow with higher pressure.

In the motion converting unit, the swing fins and the holding member of each sub unit may be formed in a swing fin unit, the holding member may be formed into a frame shape and have an opening section for introducing the fluid in the third direction, a bridge section may be spanned in the frame-shaped holding member, the swing fins may be integrally connected to the bridge section. With this structure, the flow with higher pressure can be generated, or greater power can be gained from the flow with higher pressure.

In the motion converting unit, the guiding means may be a linear guide capable of linearly moving the swing fin in the direction parallel to the plane. With this structure, the motion can be converted efficiently.

In the motion converting unit, the guiding means may be a two-dimensional drive system capable of moving the swing fin, along a circular orbit, in a plane parallel to the plane without revolving. With this structure, the swing fin can be properly moved, so that the motion can be converted efficiently.

In the motion converting unit, the two-dimensional drive system may include a plurality of crank levers, one end of which is fixed to a rotary shaft, which is rotatably provided on a body of the motion converting unit. The other end may be pivotably connected to the swing fin, and a distance between both ends may be fixed. With this structure, the swing fin can be properly moved round without revolving.

In the motion converting unit, at least one of the rotary shafts may be connected to means for converting energy. With this structure, the flow of the fluid can be properly generated when a power source, e.g., a motor, an electric generator, is connected to the motion converting unit; a power or an electric power can be properly gained when the energy converting means, e.g., an electric generator, is connected to the motion converting unit.

In the motion converting unit, the swing fin may generate a flow of the fluid, with a wave motion, in the third direction when the swing fin is moved by a driving unit and the guiding means. With this structure, the mechanical motion can be efficiently converted into the flow of the fluid without wind noise or bubbles.

The swing fin may act as a propeller of an air blower. In this case, the air blower can be thinner and can efficiently blow air without wind noise.

The swing fin may act as a propeller for generating a flow of the fluid. In this case, a thin and efficient pump can be realized.

The swing fin may be used for a driving mechanism of a ship. In this case, a higher driving power can be gained, without bubbles, like a dolphin kick.

The swing fin may be used for a driving mechanism of an aircraft. In this case, the motion converting unit can be used for a helicopter, a hovercraft, etc.

In the motion converting unit, the driving unit may be a vibrator, and the holding member may be capable of elastically holding the swing fin so as to use sympathetic vibrations of the swing fin when the vibrator vibrates the holding member. With this structure, the swing fin can be swung with a simple structure. By using the sympathetic vibrations, efficiency of converting energy can be improved.

In the motion converting unit, the swing fin may generate a mechanical motion when the flow of the fluid, which includes a wave motion, works to the swing fin and the guiding means. With this structure, the flow motion can be efficiently converted into the mechanical motion without wind noise or bubbles.

In the motion converting unit, the swing fin may be used for a wave electric generator. In this case, electric power can be efficiently gained by moving the swing fin by wave motion of the sea water.

In the motion converting unit, the swing fin may be used for a wind electric generator. In this case, electric power can be efficiently gained by moving the swing fin by wave motion of the air.

Further, another motion converting unit, comprises:
a first sub-unit including:
a first holding member being provided in a first plane extending in a first direction and a second direction perpendicular to the first direction;
a first swing fin extending in a third direction, which is perpendicular to the first and second directions, from the first holding member, the first swing fin having a first face and a second face, which cross the swing direction of the first swing fin and which are capable of guiding a flow of a fluid, wherein a swing width of a free end of the first swing fin is wider than that of a base end thereof when the first holding member is moved in the direction parallel to the first plane; and
first guiding means for guiding the movement of the first swing fin with the first holding member; and
a second sub-unit including:
a second holding member being provided in a second plane extending in the first direction and the second direction;
a second swing fin extending in the third direction from the second holding member, the second swing fin having a first face and a second face, which cross the swing direction of the second swing fin and which are capable of guiding the flow of the fluid, wherein a swing width of a free end of the second swing fin is wider than that of a base end thereof when the second holding member is moved in the direction parallel to the second plane; and
second guiding means for guiding the movement of the second swing fin with the second holding member,
wherein the free ends of the first swing fin and the free end of the second swing fin are mutually faced,
whereby the first sub-unit converts an inputted mechanical motion into a flow of the fluid, and the second sub-unit converts the flow into an output mechanical motion. With this structure, energy can be efficiently transmitted by wave motion.

In the present invention, the swing fin can be swung in the directions parallel to the plane and the swing width of the free end of the swing fin is wider than that of the base end thereof. Therefore, the motion converting unit is capable of efficiently converting the mechanical motion into the flow motion and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The motion converting unit can be made thinner, the converting efficiency can be improved, the manufacturing cost can be reduced, and the function can be freely designed on the basis of the use.

BRIEF DESCRIPTION OF THE DRAWINGS

Embodiments of the present invention will now be described by way of examples and with reference to the accompanying drawings, in which:

FIGS. 16A–16C are explanation views showing a drive system of Sixth Embodiment, which makes sine curve motion of the swing fin;

FIGS. 29A and 29B are explanation views of the motion converting unit of Fourteenth Embodiment, in which sub-units are linearly arranged;

DETAILED DESCRIPTION OF THE PREFERRED EMBODIMENTS

Basic Theory

Unlike the conventional motion converting units, the motion converting unit of the present invention uses wave motion of a fluid.

For example, a motion converting unit of the present invention converts a mechanical motion into a flow of a fluid by using characteristics of a wave motion. The motion converting unit generates the wave motion of the fluid, e.g., air, liquid, by swinging a swing fin in the fluid.

If the swing fin and a driving mechanism for swinging the swing fin are fixed at a predetermined position, the fluid can be sent by the wave motion of the fluid, which is generated by the swing motion of the swing fin. On the other hand, if the swing fin and the driving mechanism are not fixed in the fluid, they can be moved in the fluid by a counter force of the wave motion.

Further, the motion converting unit of the present invention converts the flow of the fluid into the mechanical motion by using the characteristics of the wave motion. Namely, energy of the fluid, which is generated by the wave motion, can be converted into kinetic energy of a solid body by the wave motion of the fluid.

Concept 1

The concept of the theory of the present invention will be explained with reference to FIGS. 1–5.

Figure 1:
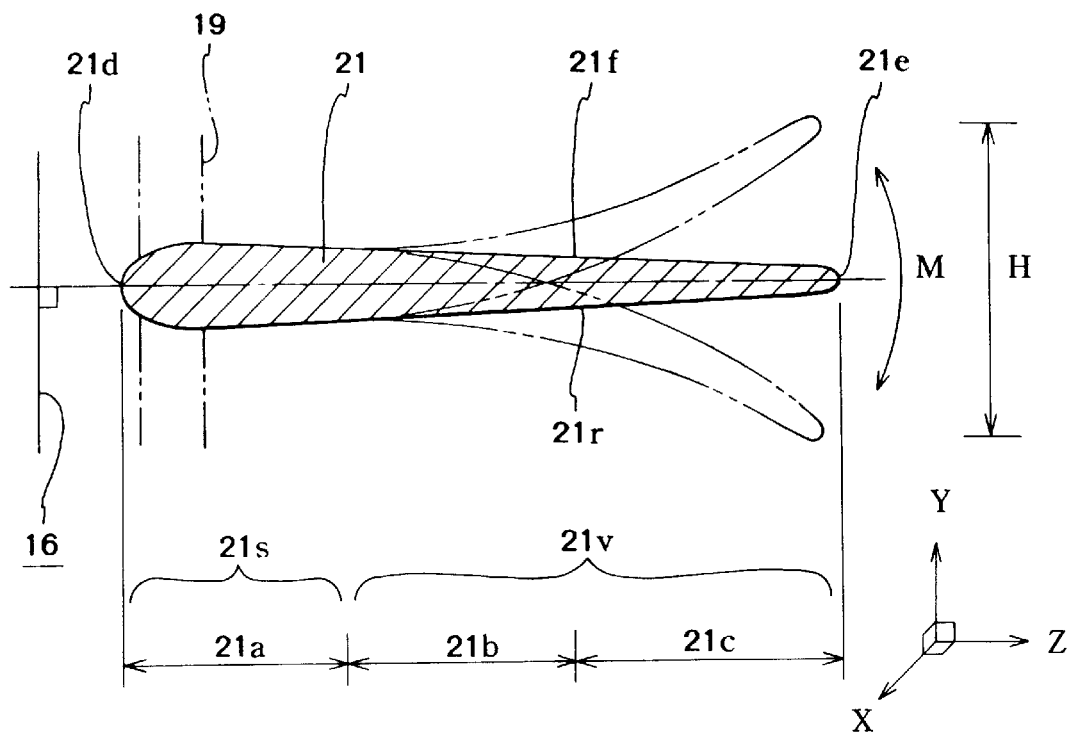
FIG. 1 is a sectional view of an example of a swing fin of the motion converting unit of the present invention.
Figure 2:
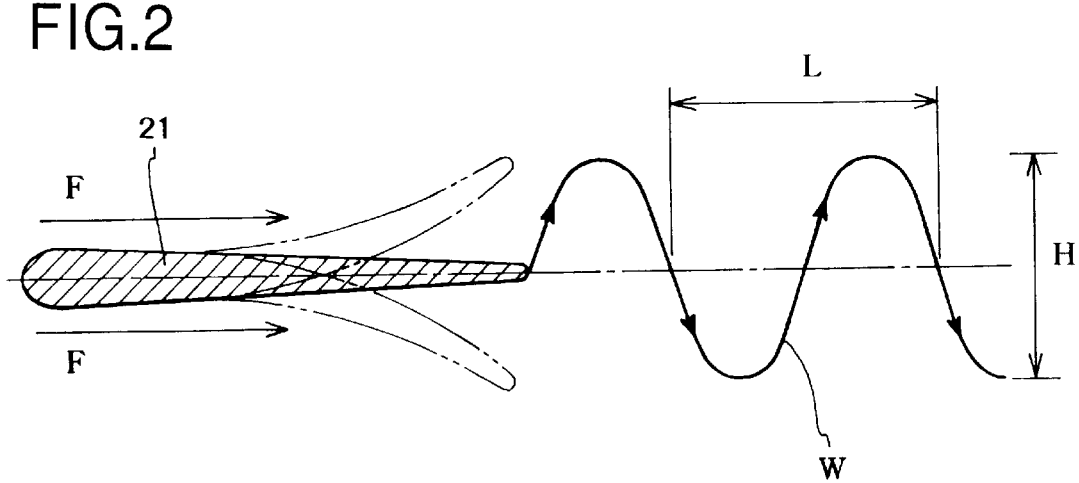
FIG. 2 is an explanation view of showing a state of generating wave motion by the swing fin.

FIG. 1 is a sectional view of an example of a swing fin of the motion converting unit of the present invention; FIG. 2 is an explanation view of showing a state of generating the wave motion by the swing fin; FIGS. 3A–3D are explanation views showing relationship between the wave motion energy and amplitude/frequency of the wave motion.

A holding member 19 is located in a plane 16, which is extended in a first direction X and a second direction Y perpendicular to the first direction X.

A base end part 21a of the swing fin 21 is held by the holding member 19. The swing fin in extended in a third direction Z perpendicular to the plane 16. With this structure, the swing fin 21 can be moved (swung) in the direction parallel to the plane 16, and a swing width of a free end 21e of the swing fin 21 is wider than that of the base end part 21a thereof. The swing fin 21 has a first face 21f and a second face 21r, which cross the moving (swing) direction of the swing fin 21. The faces 21f and 21r send the fluid in the third direction Z, so we call the faces 21f and 21r guide faces.

The base end part 21a of the swing fin 21 is moved, together with the holding member 19, so as to swing the swing fin 21.

As shown in FIG. 1, rigidity of a base end part 21a of the swing fin 21 is greater than that of a free end part 21c. And the swing fin 21 is formed into a tapered shape, namely the width of the swing fin 21 is made shorter toward the free end 21e.

The base end part 21a is made thicker so as to rigidly extend in the third direction Z while the swing fin 21 is moved. So we call the part 21a a straight section 21s.

The swing fin 21 further has an intermediate part 21b and a front end part 21c. The parts 21b and 21c are capable of moving (swinging) in the direction parallel to the plane 16, so we call them a swinging part 21v.

The swing fin 21 is wholly made of one material. The thickness of the swing fin 21 is gradually made thinner from the base end 21a to the free (front) end 21e, so that the rigidity of the swing fin 21 is also gradually made smaller toward the free end 21e. In other words, flexibility is gradually made greater toward the free end 21e. With this structure, the intermediate part 21b can be swung wider than the base end part 21a. Furthermore, the front end part 21c can be swung wider than the intermediate part 21b.

The rigidity of the swing fin 21 is partially changed by changing the thickness. Furthermore, the rigidity of the swing fin 21 may be partially changed by partially changing materials. For example, the swing fin 21 may have a core part, having a length or thickness which is partially changed. Furthermore, the swing fin 21 may be formed of a plurality of materials. In this case, the base end part 21a is made of a material having greater rigidity; the intermediate part 21b is made of a material having a rigidity smaller than that of the base end part 21a; and the front end part 21c is made of a material having a rigidity smaller than that of the intermediate part 21b.

The sectional shape of the swing fin 21 is not limited to a tapered shape. If the swing fin 21 can be moved (swung) in a predetermined range, the thickness may be equal from the base end 21a to the free end 21e. In this case too, the swing width of the free end part 21e is wider than that of the base end part 21a when the base end part 21a is moved.

If the swing fin 21 has required rigidity and durability, the swing fin 21 is made thinner so as to reduce fluid resistance and improve energy converting efficiency. Shapes of the guide faces 21f and 21r is not limited to rectangular shapes.

By continuously swinging the swing fin 21, the swing fin 21 is moved like a dolphin kick, so that the mechanical motion can be efficiently converted into flow motion and vice versa.

Stress is repeatedly applied to the swing fin 21 during operation, so the swing fin 21 must have enough durability. Especially, the stress is concentrated to the intermediate part 21b, so the shape and material of the intermediate part 21b are selected to bear the stress.

For example, fiber reinforced plastics, rubber, spring steel, which have enough rigidity and elasticity, may be selected as the material of the swing fin 21. If acceleration of the swing movement of the swing fin 21 is high, material having high rigidity is selected; if acceleration of the swing movement of the swing fin 21 is low, a material having low rigidity is selected. To generate desired wave motion, a swing angle M and a swing width H of the swing fin 21 are properly designed.

To reduce the fluid resistance, shapes of the rear end 21d and the free end 21e of the swing fin 21 are formed into streamline shapes.

As shown in FIG. 2, the wave motion of the fluid is generated by swinging the swing fin 21. By repeating the wave motion, a wave motion flow is generated in the fluid.

The flow of the fluid is introduced from the rear end 21d side to the free end 21e side as shown by an arrow F. The flow becomes the wave motion flow W from the free end 21e of the swing fin 21. The amplitude H of the wave motion flow W is proportional to the swing width of the swing fin 21. The wave length L of the wave motion flow W is proportional to the frequency of the swing of the swing fin 21.

The amount of the flow is proportional to the area, the swing width, and the frequency of the swing fin 21. The magnitude of the energy of the wave motion flow W is proportional to the amount, the amplitude H and frequency thereof. Namely, if the amount of the flow is greater, the amplitude is greater and the frequency is higher, the magnitude of the energy will be greater.

The higher the frequency is, the more the wave motion flow W flows linearly. On the other hand, the lower the frequency is, the more the wave motion flow W diffuses.

Four types of the wave motion flow W are shown in FIGS. 3A–3D. FIG. 3A shows the wave motion flow W having greater amplitude and higher frequency; FIG. 3B shows the wave motion flow W having greater amplitude and lower frequency; FIG. 3C shows the wave motion flow W having lower amplitude and higher frequency; and FIG. 3C shows the wave motion flow W having lower amplitude and lower frequency.

The magnitude of the energy of the wave motion flow W can be known by multiplying the amplitude by the frequency. Therefore, the wave motion flow W shown in FIG. 3A has the greatest energy; the wave motion flows W shown in FIGS. 3B and 3C have middling energy; and the wave motion flow W shown in FIG. 3D has the smallest energy.

The wave motion flows W shown in FIGS. 3A and 3C have higher linearity; the wave motion flows W shown in FIGS. 3B and 3D have lower linearity.

Figure 3:
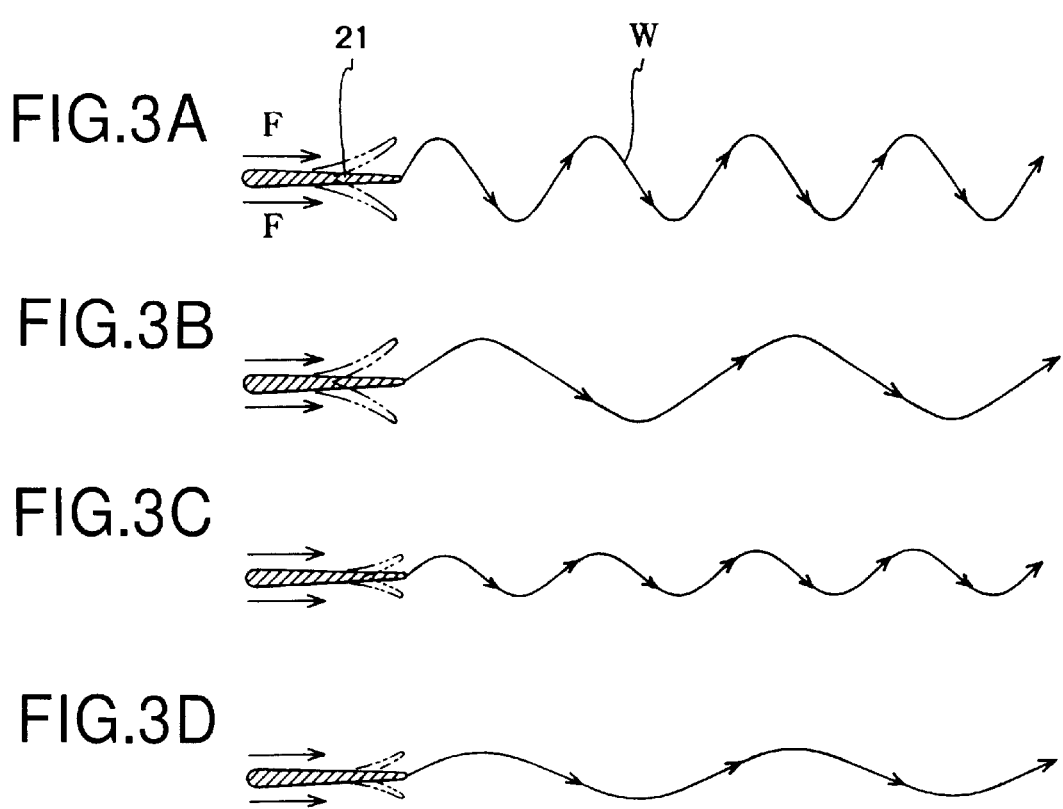
FIGS. 3A–3D are explanation views showing relationship between wave motion energy and amplitude/frequency.

As shown in FIGS. 2–3D, the desired swing motion of the swing fin 21 is the sine curve motion. Vibration of a spring is also the sine curve motion. The sine curve motion of the swing fin 21 generates the sine curve wave motion flow W. The sine curve motion is highly regulated and less damped, so the sine wave motion is capable of properly transmitting energy.

To move the swing fin 21 like the sine curve motion, the swing fin 21 is moved, in the X-Y direction, by a moving body, which is moved round without revolving its own axis.

Figure 4:
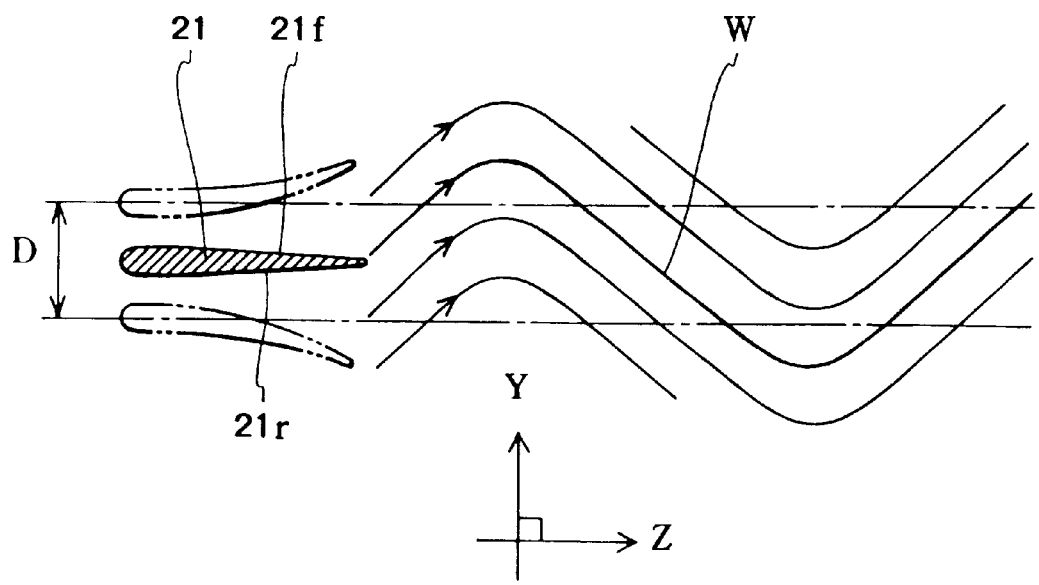
FIG. 4 is a sectional view showing a state of swinging the swing fin shown in FIG. 1.
Figure 5:
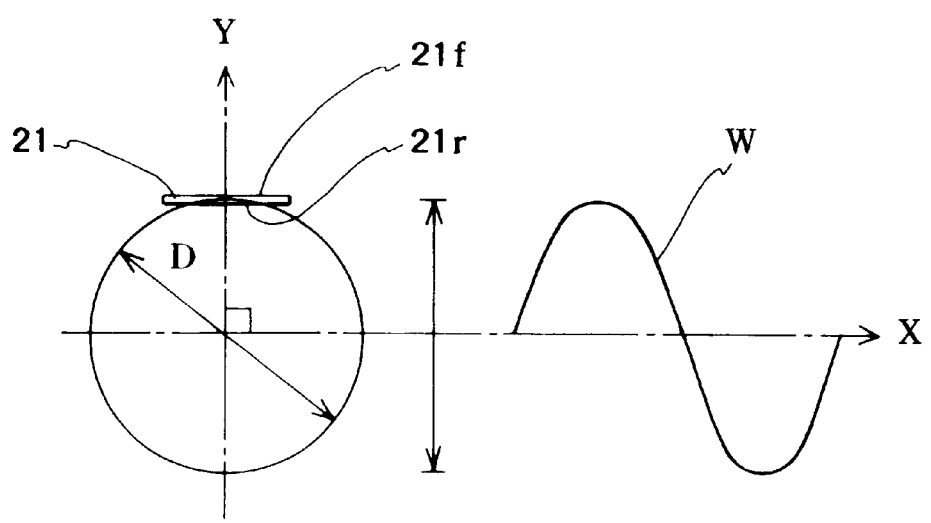
FIG. 5 is an explanation view showing the swing motion of the swing fin shown in FIG. 1.

Motional components in the X- and Y-directions can be gained from the moving body. The theory will be explained with reference to FIGS. 4 and 5. FIG. 4 is a sectional view of the swing fin 21 seen from a side (The X-direction); FIG. 5 is a view of the swing fin 21 seen from the free front end of the swing fin 21 (the Z-direction).

As shown in FIGS. 4 and 5, the swing fin 21 is moved round, at fixed speed, along a circular orbit, whose diameter is D, without revolving its own axis. The guide faces 21f and 21r, which cross the Y-direction, are moved like the sine curve motion in the Y-direction, further the swing fin 21 is moved like the sine curve motion in the X-direction.

The swing fin 21 has the guide faces 21f and 21r, which are perpendicular to the Y-direction, and the swing fin 21 is capable of moving (swinging) in the Y-direction. With this structure, the swing fin 21 is moved like the sine curve movement by the motional component in the Y-direction.

Thus, the motional component in the Y-direction can be properly extracted from the swing motion of the swing fin 21. Namely, the wave motion flow W can be properly generated by the swing motion of the swing fin 21.

By moving the swing fin 21 round without revolving, the motional components in the X- and Y-directions are the sine curve motions, so the swing fins 21, which are arranged in the X- and Y-directions, can be moved as the sine curve motion.

The sine curve motion can be generated by converting a rotation of a rotor, which rotates at fixed speed, into a reciprocative linear motion of a linear moving body by command of a linear guide. A concrete example is shown in FIGS. 16A–16C.

To make the sine curve motion of the swing fin 21, there are two ways as described above. In the first way, the swing fin 21 is directly fixed to the moving body, which is moved round without revolving. In this case, the sine curve motion is generated while the swing fin 21 is moved round without revolving. In the second way, the swing fin 21 is directly fixed to the linear moving body, which is linearly reciprocatively moved, without revolving, as the sine curve motion.

The way for making the sine curve motion of the swing fin 21 is selected according to the use, but the general reason for selecting the way will be explained. If the swing width (the amplitude) is small, the swing fin 21 is directly fixed to the moving body, which is moved round without revolving. In the present invention, the free end 21c of the swing fin 21 can be swung wider than the base end 21a thereof. With this structure, the swing width of the base end part 21a may be small, so using the moving body, which is moved round without revolving, is advantageous due to less vibrations and a simple structure. On the other hand, if the swing width (the amplitude) is great, the swing fin 21 is directly fixed to the linear moving body, which is linearly reciprocatively moved, without revolving.

First Embodiment

Figure 6A:
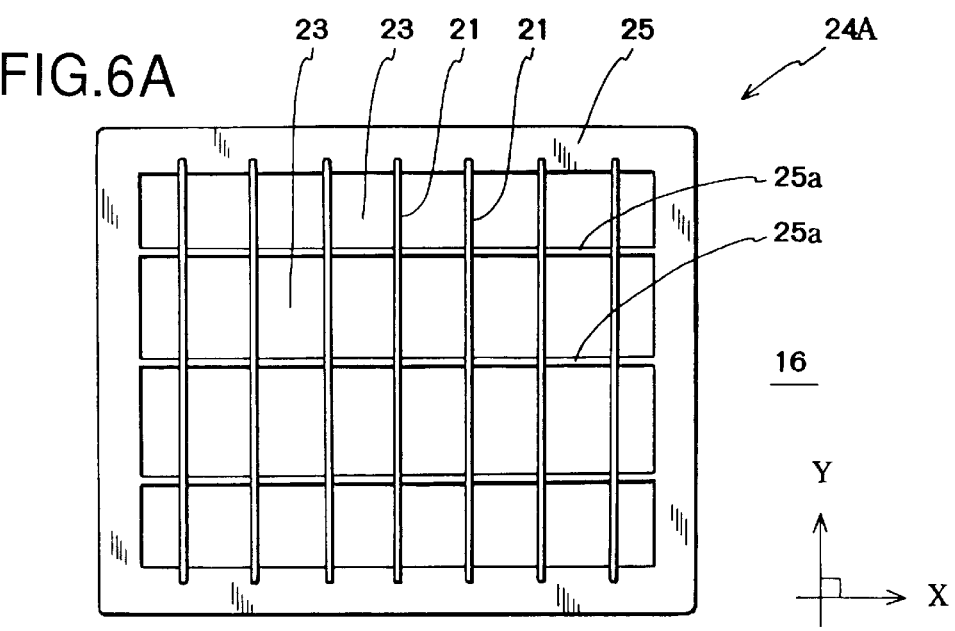
FIGS. 6A and 6B are explanation views of the motion converting unit of First Embodiment of the present invention.
Figure 6B:
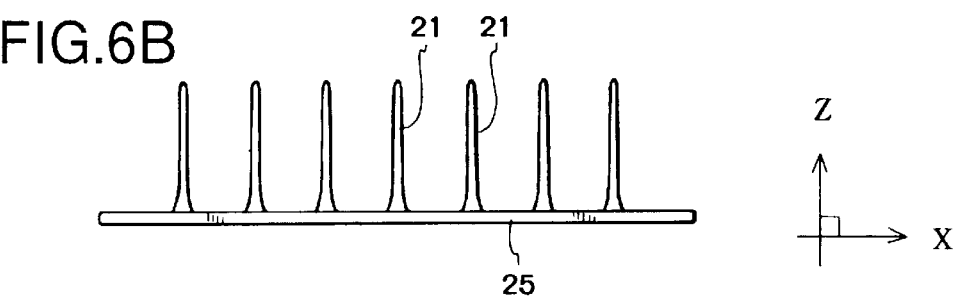
Figure 7:
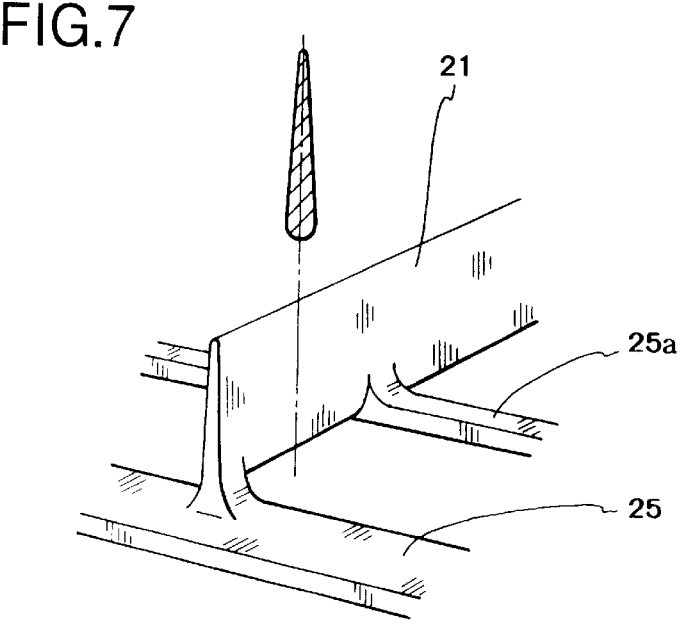
FIG. 7 is a perspective view of the motion converting unit of the First Embodiment.

First Embodiment will be explained with reference to FIGS. 6A–7. FIGS. 6A and 6B are explanation views of the motion converting unit of First Embodiment of the present invention; FIG. 7 is a perspective view of the motion converting unit of the First Embodiment As shown in FIGS. 6A and 6B, a plurality of swing fins 21 are provided in parallel and linearly arranged in a first direction X or a second direction Y. In the present embodiment, the swing fins 21 are linearly arranged in the X-direction. The X- and Y-directions are included in a plane 16, whose location may be freely defined. Therefore, the swing fins 21 are linearly arranged, in one direction, in the plane 16.

In the First Embodiment, the swing fins 21 are provided, in parallel, in the plane 16, and opening sections 23 are formed so as to introduce a fluid in a third direction Z.

A frame 25 includes the swing fins 21 and the opening sections 23 and is located parallel to the plane 16. In the frame 25, bridge sections 25a are spanned like ribs, and the swing fins 21 are integrally connected to the bridge sections 25a. Namely, the frame 25 including the swing fins 21, etc. is a swing fin unit 24A.

The rectangular frame 25 has a pair of X-sides and a pair of Y-sides, and a center part is hollow. Three bridge sections 25a are extended, in parallel, in the X-direction, they are linearly arranged in the Y-direction, and they are located in a plane including the frame 25. The bridge sections 25a look like elongated rods.

Seven swing fins 21 are integrally connected to each bridge section 25a of the frame 25. The swing fins 21 are extended, in parallel, in the Y-direction, and they are linearly arranged in the X-direction. With this structure, the swing fin unit 24A has a lattice-shaped structure as shown in FIG. 6A, so it has enough durability in spite of having the opening sections 23.

When the frame 25, which is located in the plane 16, is swung in the X-direction, the swing fins 21 are repeatedly bent in the X-direction. By this action, the wave motion flows W are generated from the swing fins 21 as described in Basic Theory.

The swing fin unit 24A can be easily formed using resin molding dies.

The swing fins 21 of the swing fin unit 24A are linearly arranged in the X-direction, namely the swing fin unit 24A has a simple structure and can be made easily. Furthermore, the swing fins 21 can be efficiently swung by linearly reciprocatively moving the swing fin unit 24A, so that the wave motion flows W can be efficiently generated.

Second Embodiment

Figure 8A:
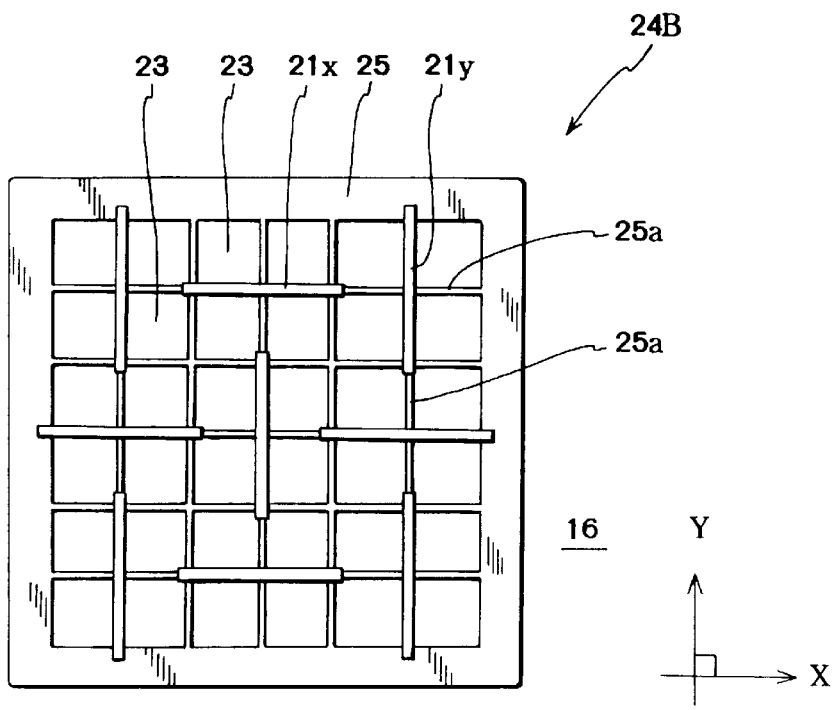
FIGS. 8A and 8B are explanation views of the motion converting unit of Second Embodiment of the present invention.
Figure 8B:
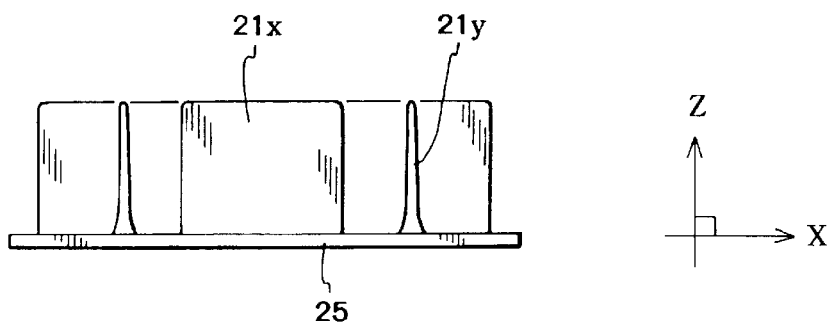
Figure 9:
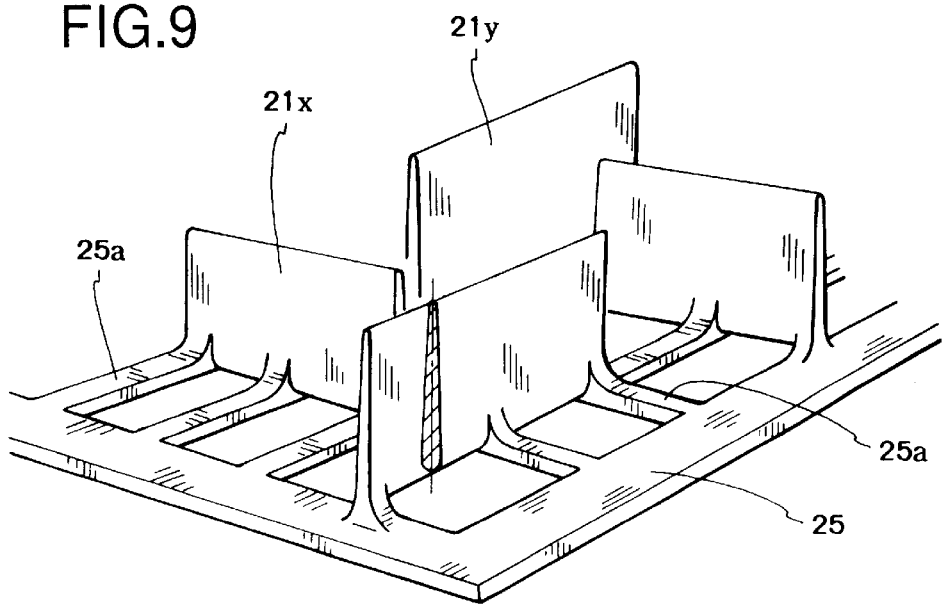
FIG. 9 is a partial perspective view of the motion converting unit of the Second Embodiment.

Second Embodiment will be explained with reference to FIGS. 8A–9. FIGS. 8A and 8B are explanation views of the motion converting unit of Second Embodiment of the present invention; FIG. 9 is a partial perspective view of the motion converting unit of the Second Embodiment. In the Second Embodiment, a plurality of swing fins 21 are arranged in a first direction X and a second direction Y, so they are matrically and symmetrically arranged.

The swing fins 21 are provided, in parallel, in the plane 16, and opening sections 23 are formed so as to introduce a fluid in a third direction Z. A frame 25 includes the swing fins 21 and the opening sections 23 and is located parallel to the plane 16. In the frame 25, bridge sections 25a are spanned like ribs and they look like a lattice. And the swing fins 21 are integrally connected to the bridge sections 25a. Namely, the frame 25 including the swing fins 21, etc. is a swing fin unit 24B.

The rectangular frame 25 has a pair of X-sides and a pair of Y-sides, and a center part is hollow. Five bridge sections 25a are extended, in parallel, in the X-direction, they are linearly arranged in the Y-direction, and they are located in a plane including the frame 25. Another five bridge sections 25a are extended, in parallel, in the Y-direction, they are linearly arranged in the X-direction, and they are located in a plane including the frame 25, so the bridge sections 25a are formed like a lattice as shown in FIG. 8A. The bridge sections 25a look like elongated rods.

A plurality of the swing fins 21x and 21y, which are parallel, are arranged in zigzag forms in the X- and the Y-directions. They are integrally connected to each bridge section 25a of the frame 25. By arranging the swing fins 21x and 21y in the zigzag form, mutual interference of the swing fins 21x and 21y can be prevented while swinging, and they can be efficiently arranged in a space.

The swing fin unit 24B has a lattice-shaped structure, so it has enough durability in spite of having the opening sections 23.

The swing fin unit 24B is fixed to a moving body, which is moved round at fixed speed without revolving about its own axis. So, as described in Basic Theory, the swing fins 21x in the X-direction are swung like the sine curve motion by the motional component in the X-direction; the swing fins 21y in the Y-direction are swung like the sine curve motion by the motional component in the Y-direction.

With this structure, the swing fins 21x and 21y, which are respectively arranged in the X- and Y-directions, can be properly swung, and can efficiently generate wave motion flows W.

By moving the swing fin unit 24B, the wave motion flows W in the X-direction, which are generated by the swing fins 21x, and the wave motion flows W in the Y-direction, which are generated by the swing fins 21y, are combined, so that a resultant wave motion flow is generated.

When the swing fin unit 24B is moved round without revolving, a time lag is formed between the generated wave motion flow W generated by the swing fins 21x and that generated by the swing fins 21y. Phase of the wave motion flows W in the X-direction is shifted 90° with respect to phase of the wave motion flows W in the Y-direction.

Therefore, the resultant wave motion flow is constituted by the wave motion flows W, whose phase are mutually shifted 90°, namely the sine curve motions, whose phase are mutually shifted 90°, are combined. So the swing fin unit 24B, in which the swing fins are matrically arranged, can efficiently convert the mechanical motion into the flow motion.

Successively, the motion converting units, in which the swing width of the swing fins 21 is relatively wider with respect to a size of the swing fins 21 or radius of a circular orbit of the swing fins 21 is greater, will be explained in the Third to Fifth Embodiments of the present invention. Generally, in the case of the wider swing width, the swing fins 21 generate not only wave motion flows but also other flows. On the other hand, if the swing width is small, the swing fins 21 mainly generate wave motion flows.

Third Embodiment

Figure 10A:
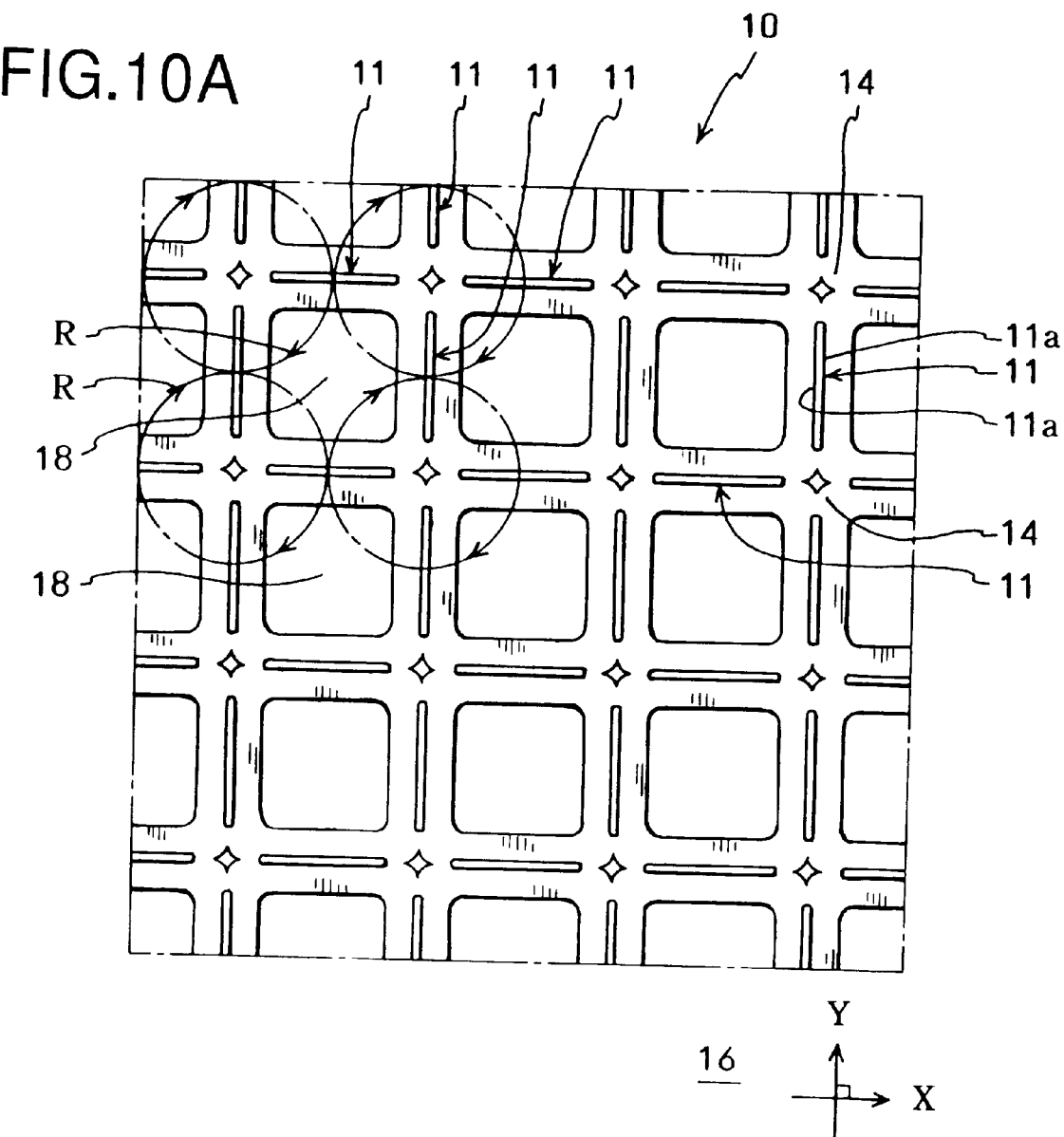
FIGS. 10A and 10B are explanation views of the motion converting unit of Third Embodiment of the present invention.
Figure 10B:
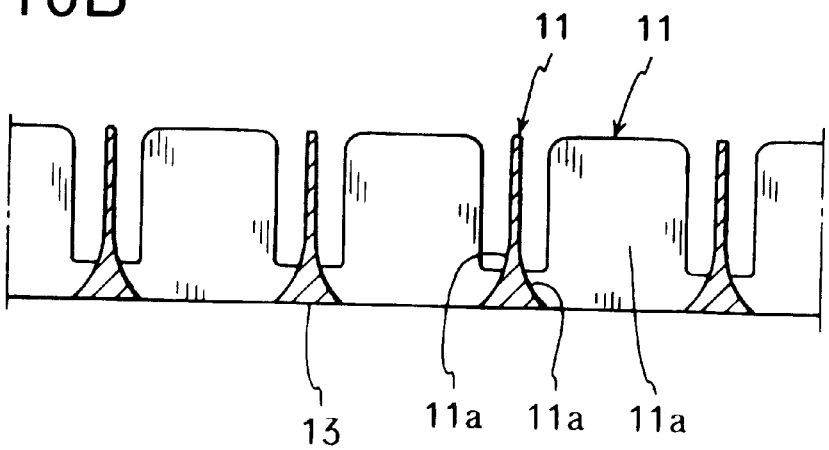
Figure 11A:
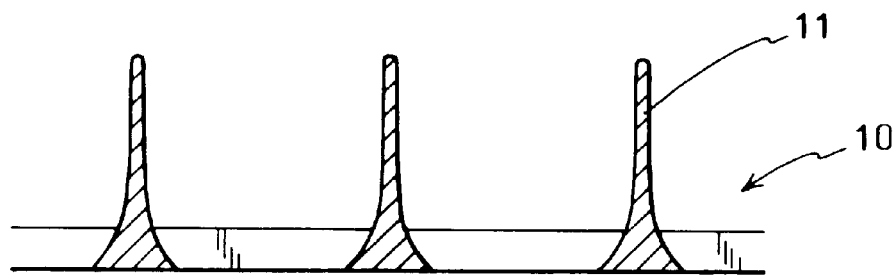
FIGS. 11A–11C are explanation views showing action of the swing fins of Third Embodiment.
Figure 11B:
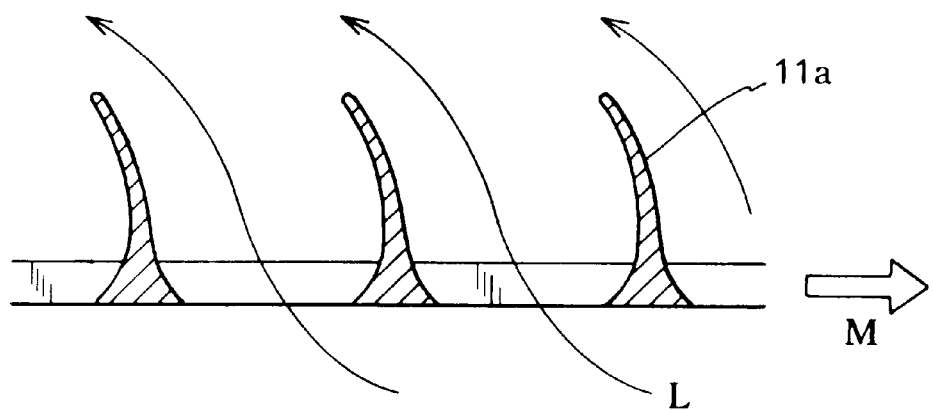
Figure 11C:
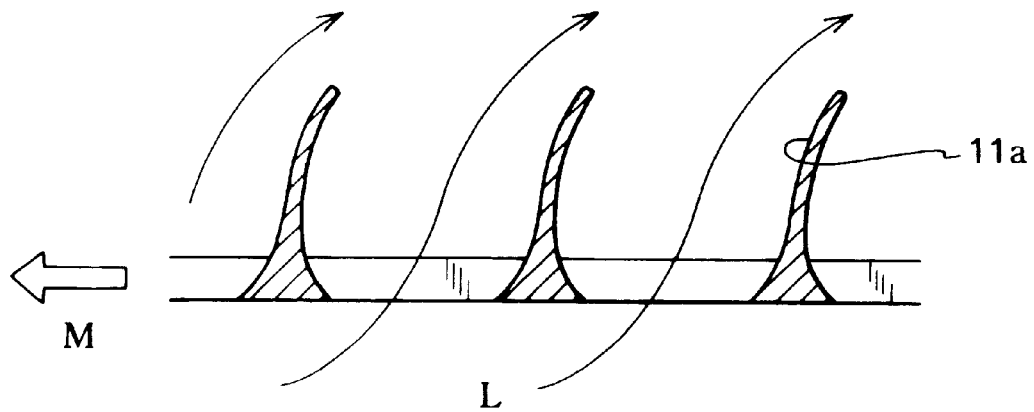

FIGS. 10A and 10B show a motion converting unit used as a blowing unit of an air blower. The motion converting unit converts orbital movement of swing fins into a flow. FIG. 10A is a plan view; FIG. 10B is a sectional view. FIGS. 11A–11C are sectional views explaining action of the swing fins.

A plurality of swing fins 11 are matrically arranged in a fin panel 10. The swig fins 11 are mutually connected by connecting sections 14. In the present embodiment, as clearly shown in FIGS. 10A and 10B, the swing fins 10 are provided in a plane, which is extended in a first direction X and a second direction Y perpendicular to the first direction X, with regular separations. The swing fins 11 are matrically and symmetrically arranged, so they can be efficiently arranged in the fin panel 10. A planar shape of the fin panel 10 including the swing fins 11 and the connecting sections 14 looks like a lattice (see FIG. 10A).

To guide the flow, each swing fin 11 has guide faces 11a, which are inclined with respect to a plane 16. The swing fins 11 are capable of moving round in the plane 16 without revolving. In the present embodiment, the swing fins 11 are integrally provided in the fin panel 10, the fin panel 10 is capable of moving round in the plane 16 without revolving.

In the Third Embodiment, each swing fin 11 can be inclined, with respect to the plane 16, in the opposite direction of the moving direction of the fin panel 10 (see an arrow M shown in FIG. 11B), so the face 11a acts as the guide face. When the swing fin 11 is inclined, a free end of the swing fin 11 is moved close to a base plate section of the fin panel 10, which is parallel to the plane 16.

The swing fins 11 are made of a plate-formed elastic material. When the swing fins 11 are stopped, they stand straight with respect the base plate section of the fin panel 10. As described above, the swing fins 11 are inclined, with respect to the plane 16, in the opposite direction of the moving direction M of the fin panel 10 when the fin panel 10 is moved together with the swing fins 11. Namely, as shown in FIG. 11B, the swing fins 11 are bent leftward when the swing fins 11 are moved rightward. On the other hand, as shown in FIG. 11C, the swing fins 11 are bent rightward when the swing fins 11 are moved leftward. Therefore, the both faces 11a of each rectangular swing fin 11 alternately act as the guide faces with the orbital movement of each swing fin 11.

Elasticity of the swing fins 11 cause the above described action. The action of the swing fins 11 are automatically synchronized. Thus, posture of the swing fins 11 are self-controlled.

The faster the speed of moving the swing fin 11 are, the greater the inclination angle of the guide faces 11a of the swing fins 11 are made. In the high speed operation, fluid resistance and greater inertia works to the guide faces 11a of the swing fins 11. In the case that the free ends of the swing fins 11 are made heavier, the swing fins 11 can be inclined by the inertia, and influence of the fluid resistance can be reduced. On the other hand, in the case that the free ends of the swing fins 11 are made lighter, the swing fins 11 can be inclined by the fluid resistance, and influence of the inertia can be reduced. The manners can be selected optionally. The swing action of each swing fin 11 is indicated by a sign curve. Namely, the action is a smooth symmetrical action.

To efficiently convert energy, the inclination angle of the swing fins 11, with respect to the moving speed of the swing fins 11, are properly designed. Thus, elasticity of the swing fins 11 are selected on the basis of rated speed of the swing fins 11, which depends on a use of the motion converting unit. In the case of slow operation, the swing fins 11 are made of a soft material and have lower elasticity; in the case of fast operation, the swing fins 11 are made of a tough material and have higher elasticity.

If the swing fins 11 are smoothly inclined within a prescribed angular range, the guiding faces 11a cause proper flow L. To make the proper flow of the fluid, the material and a sectional shape of each swing fin 11 are designed on the basis of the moving speed of the swing fins 11, etc. The swing fins 11 may be made of a plastic, a metal, etc.

In the Third Embodiment, each swing fin 11 is made of a plastic and made thinner toward the free end, and the guiding faces 11a are curved so as to properly guide the flow L. The swing fins 11 are integrated as the fin panel 10. The fin panel 10 can be made by resin molding, so manufacturing cost can be reduced.

The swing fins 11 shown in FIGS. 11A–11C are extended in the X-direction. The swing fins 11 extended in the Y-direction act as well.

In the case that vector in the Y-direction (see FIG. 10A) is greater when the fin panel 10 is moved round, the guiding faces 11a of the swing fins 11 which are extended in the Y-direction mainly cause the flow of the fluid. On the other hand, in the case that vector in the X-direction (see FIG. 10A) is greater when the fin panel 10 is moved round, the guiding faces 11 a of the swing fins 11 which are extended in the X-direction mainly cause the flow of the fluid.

By arranging the swing fins in a plurality of directions, e.g., the X- and Y-directions, even if density of the fluid, e.g., air, is low, the orbital motion and the flow can be efficiently converted when the fin panel 10 is moved round without revolving.

The guiding faces 11a of the swing fins 11 are always inclined in the direction opposite to the moving direction of the fin panel 10, the flow of the fluid can be directed and continuously generated.

In the present embodiment, the motion converting unit is used for an air blower. Therefore, the swing fins 11 act as a means for generating air flow. The fin panel 10 has a simple structure, so it can be manufactured with a low cost. Furthermore, it may be used as throw away fins for an air ventilator.

In the present embodiment, the fin panel 10 is connected to guiding means, which includes a plurality of crank levers 30 (see FIGS. 30–33), so that the fin panel 10 can be moved round without revolving about its own axis.

Many types of guiding means, other than the crank levers 30, may be employed.

For example, a two-dimensional drive system, which is disclosed in the Japanese Patent Gazette No. 2-35252, may be employed as the guiding means. The two-dimensional drive system generates an optional two-dimensional movement of a moving body by combining linear motion in the X- and Y-directions. With this structure, the moving body can be moved round without revolving. By attaching the fin panel 10 to the moving body, the fin panel 10 can be moved round without revolving.

Further, the fin panel can be moved round without revolving by, for example, a plurality of cams. And, the guiding means may be driven by electromagnetic power.

The fin panel 10 is moved round without revolving, the swing fins 11, which constitute the fin panel 10, are also moved round without revolving. Orbits of the swing fins 11 are indicated by symbols R (see FIG. 10A).

The fin panel 10 is moved round without revolving, and the radius of the orbits R of all swing fins 11 are the same. The radius of the orbit of the fin panel 10 and that of each swing fin 11 are the same, so that all swing fins 11 can be moved at the same speed.

In FIGS. 10A and 10B, the radius of the orbit of each swing fin 11 is equal to a half of a distance between adjacent swing fins 11.

The design of the radius of the orbits is not limited to the present embodiment and it may depend on the use of the motion converting unit. Note that, under the same condition, the greater the radius of the orbit is made, the greater an energy of the air flow can be made. The fin panel 10 has a plurality of through-holes 18, each of which are formed between the adjacent swing fins 11. By the through-holes 18, the fluid can be uniformly and smoothly flowed as shown in FIGS. 11A–11C, so that energy can be efficiently converted.

The swing fins 11 are provided on one side face of the fin panel 10, so the fin panel 10 can generate the flow of the fluid or can be moved by the flow thereof even if no through-holes are formed therein. To upwardly generate a stream from a bottom of a water tank, for example, the fin panel 10 having no through-holes can be employed. In this case, the water flows into spaces between the swing fins 11, then the water is upwardly introduced along the guide faces 11a of the swing fins 11. By this manner, a water stream can be generated in a wash tub of an automatic washer, etc.

The fin panel 10 shown in FIGS. 10A and 10B can be easily manufactured with molding dies, so the manufacturing cost can be reduced.

A rear face 13 of the fin panel 10 must not generate the flow of the fluid, so it may be a flat face (see FIG. 10B), etc.

In the case of the flat rear face 13, the fear face 13 is wholly parallel to the plane 16. When the swing fins 11 are moved round, the swing fins 11 are moved round in the state in which the rear face 13 is kept parallel to the plane 16. Therefore, the rear face 13 does not push the air. The rear face 13 may have cavities so as not to push the air.

By forming the cavities in the rear face 13, the weight of the fin panel 10 can be reduced, and bad influence of inertia can be reduced.

Fourth Embodiment

Figure 12A:
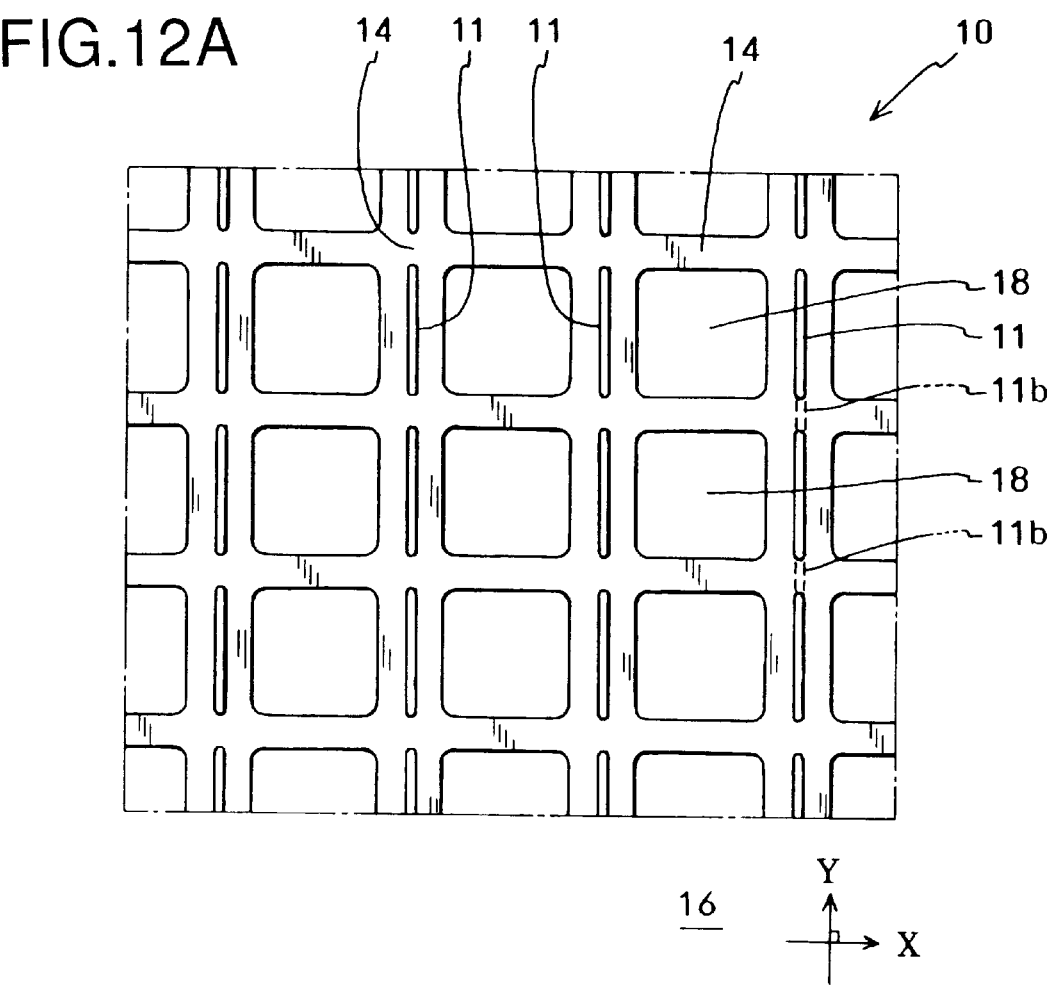
FIGS. 12A and 12B are explanation views of the motion converting unit of Fourth Embodiment of the present invention.
Figure 12B:
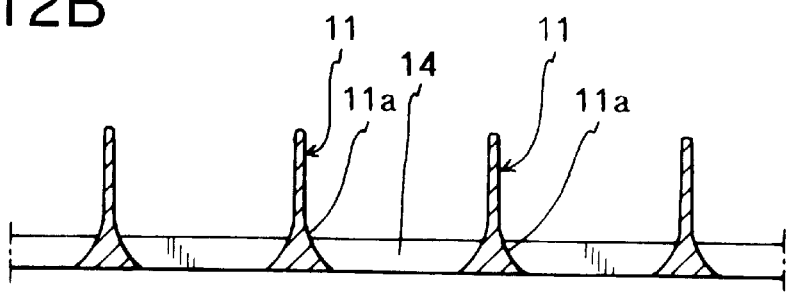

Fourth Embodiment of the present invention will be explained with reference to FIGS. 12A and 12B. FIG. 12A is a plan view; FIG. 12B is a sectional view.

In the present embodiment, a fin panel 10 has a plurality of swing fins 11, whose guide faces 11a are extended in the Y-direction.

In the present embodiment, the fin panel 10 including the swing fins 11 are continuously moved round without revolving. Guiding means guides the round movement of the swing fins 11. The round motion of the swing fins 11 and a flow of a fluid can be mutually converted by the motion converting unit of the present embodiment Energy can be efficiently converted when the swing fins 11 are moved in the X-direction.

A part of an orbit of the round movement is formed into an arc. But if the radius of the orbit is made longer, the part of the orbit is formed like a linear line. Therefore, the concept of the round movement without revolving includes a reciprocative linear movement.

Shapes and function of the swing fin 11 are equal to those of the swing fins of Third Embodiment, so explanation will be omitted.

In the present embodiment, a plurality of the swing fins 11 is arranged in the Y-direction with separations. However, some swing fins 11 that are linearly arranged may be integrally connected as shown by dotted lines 11b (see FIG. 12A). In this case, the unit has the same function and same effects.

Fifth Embodiment

Figure 13A:
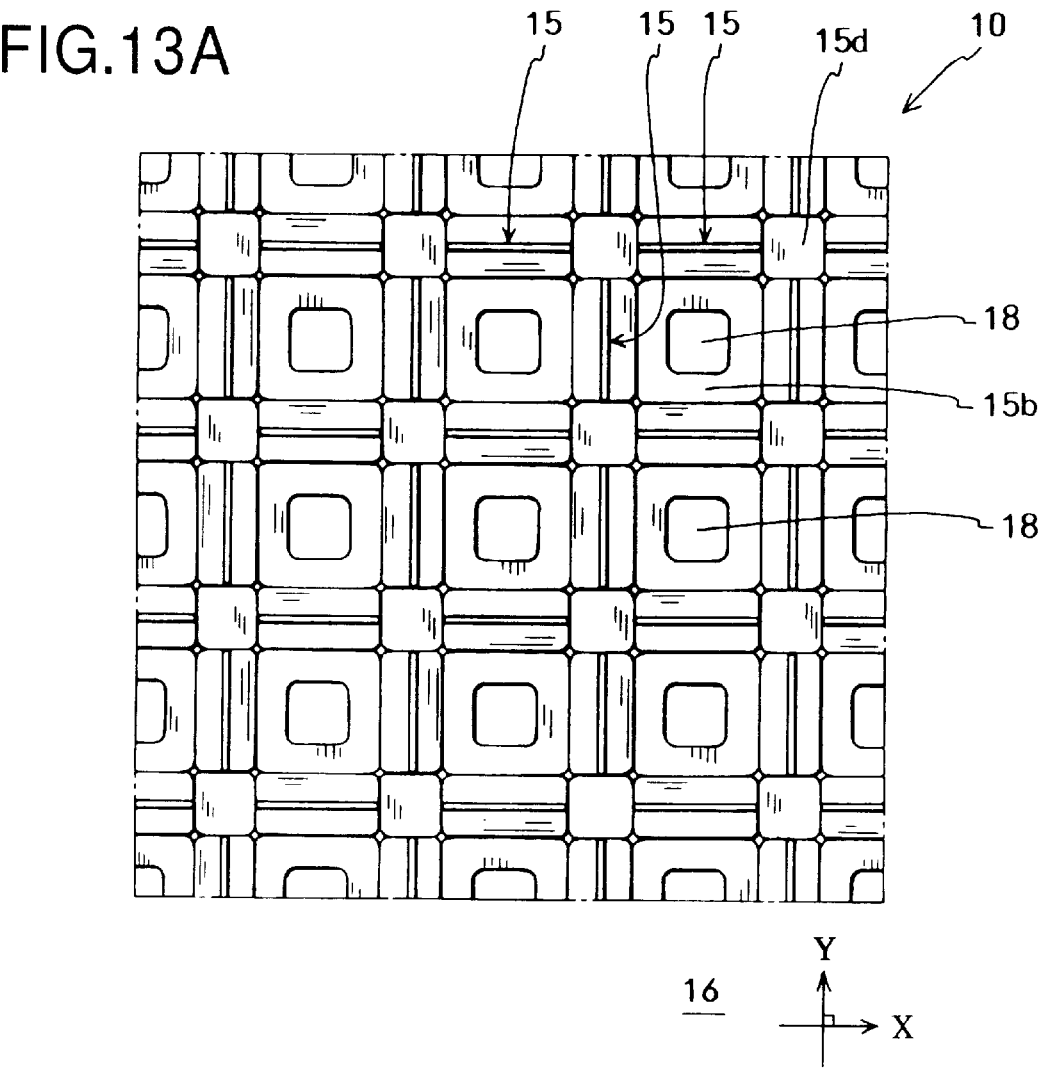
FIGS. 13A and 13B are explanation views of the motion converting unit of Fifth Embodiment of the present invention.
Figure 13B:
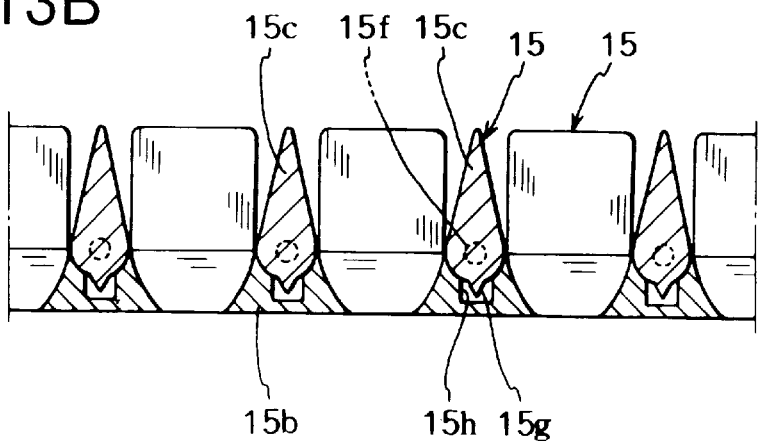
Figure 14:
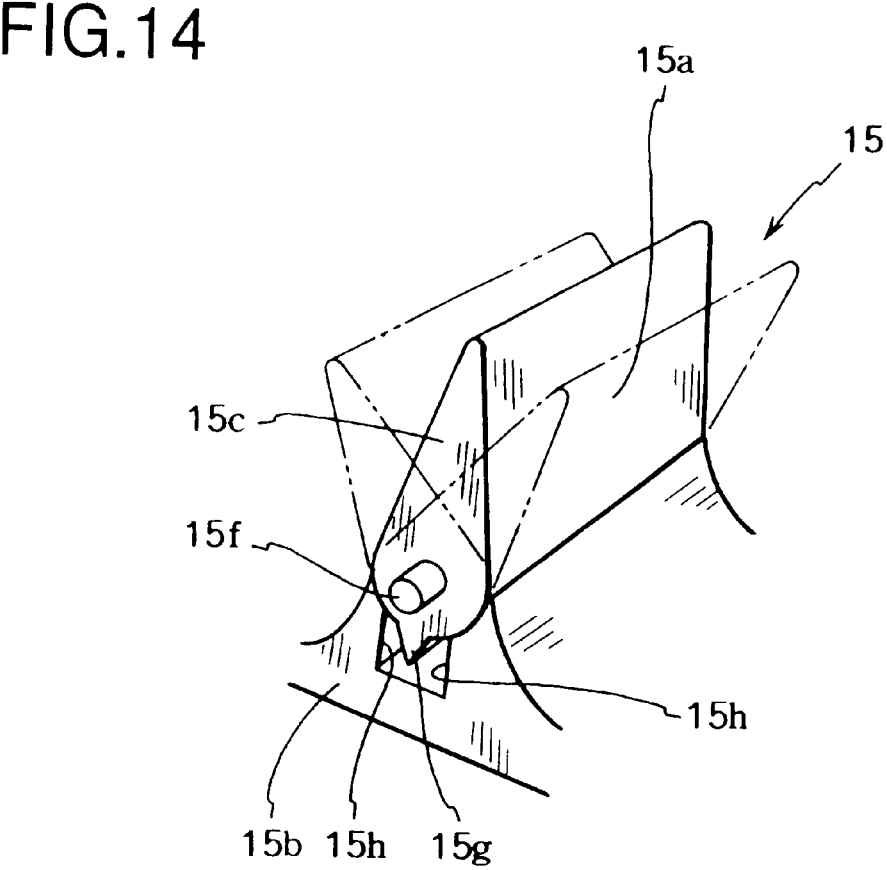
FIG. 14 is a partial perspective view of the motion converting unit of the Fifth Embodiment.
Figure 15:
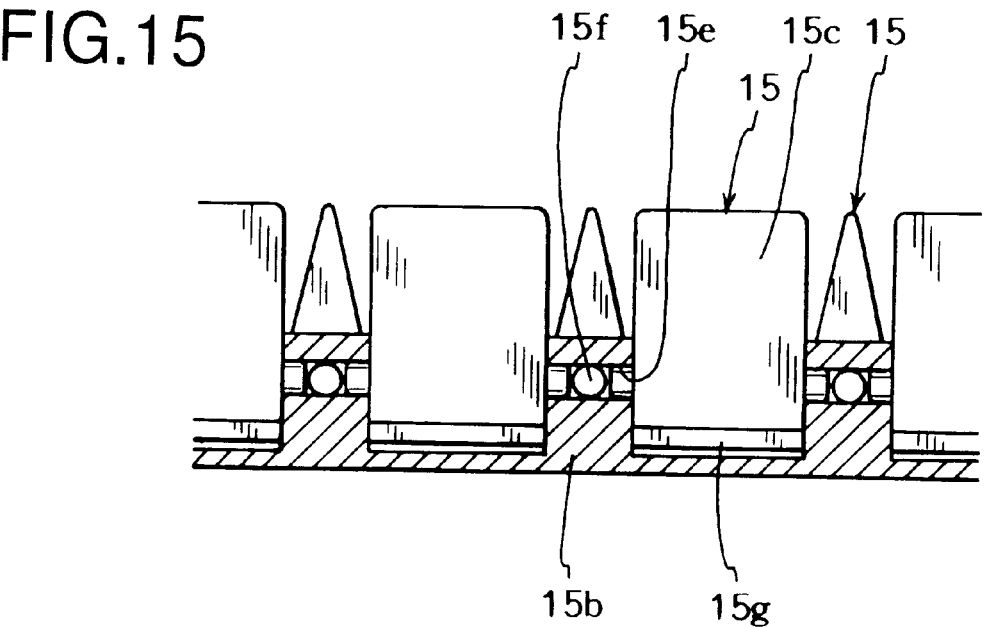
FIG. 15 is a sectional view of the motion converting unit of the Fifth Embodiment.

Fifth Embodiment of the present invention will be explained with reference to FIGS. 13A–15. FIG. 13A is a plan view; FIG. 13B is a sectional view; FIG. 14 is a perspective view; FIG. 15 is a sectional view.

A plurality of swing fins 15 are continuously moved round without revolving in a plane 16. The movement is guided by guiding means. Each swing fin 15 includes a fixed section 15b and a fin section 15c, whose base end is pivotably connected to the fixed section 15b. The fin section 15c is inclined in the direction opposite to the moving direction. The swing fins 15 are integrated like the fin panel 10 of the former embodiment, in which the swing fins 11 are arranged like the lattice. Cross points of the lattice are bearing sections 15d. There is formed a shaft hole 15e in each bearing section 15d. Shafts 15f are respectively projected from both end faces of the base end of each fin section 15c. The shafts 15f are pivotably fitted in each shaft hole 15e. With this structure, each fin section 15c, which has two rectangular guide faces 15a, can be swung about the shafts 15f.

In the present embodiment, as clearly shown in FIGS. 13A, the swing fins 15f are matrically arranged, in the X- and Y-directions, with regular separations, as well as the Third Embodiment. The swing fins 15 whose guide faces 15a are extended in the X-direction are inclined in the Y-direction; the swing fins 15 whose guide faces 15a are extended in the Y-direction are inclined in the X-direction.

The inclination angle of each swing fin 15 is limited by a stopper section 15g, whose swing is limited by limiting walls 15h of each fixed section 15b. Since each swing fin 15 has a fixed section 15b and the fin section 15c, the inclination of the fin section 15c can be executed properly, so that the round motion of the swing fins 15 and a flow of a fluid can be mutually converted by the motion converting unit of the present embodiment. By dividing the swing fin 15 into the fixed section 15b and the fin section 15c, they may be made of a tough and durable material.

The swing fins 15 have less flexibility, but their action and function of the unit are almost equal to those of the Third Embodiment, so explanation will be omitted.

Sixth Embodiment

Figure 17A:
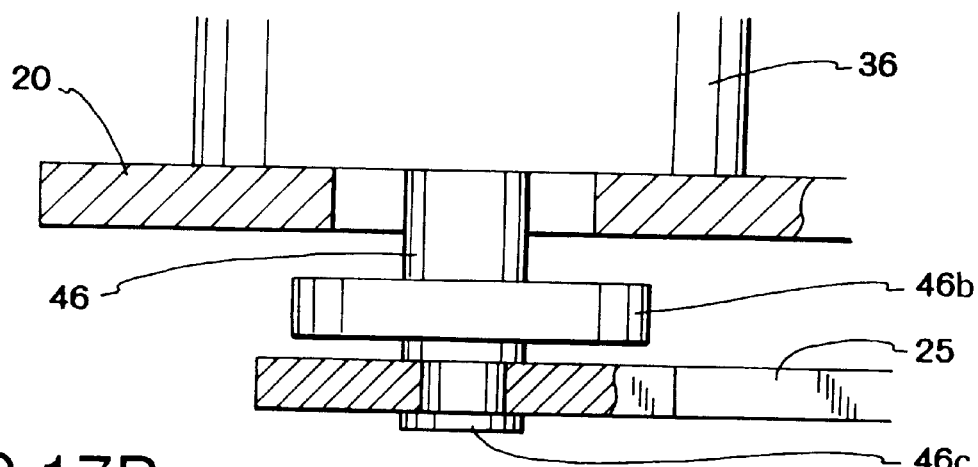
FIGS. 17A and 17B are detailed views of a part A of FIG. 16A.
Figure 17B:
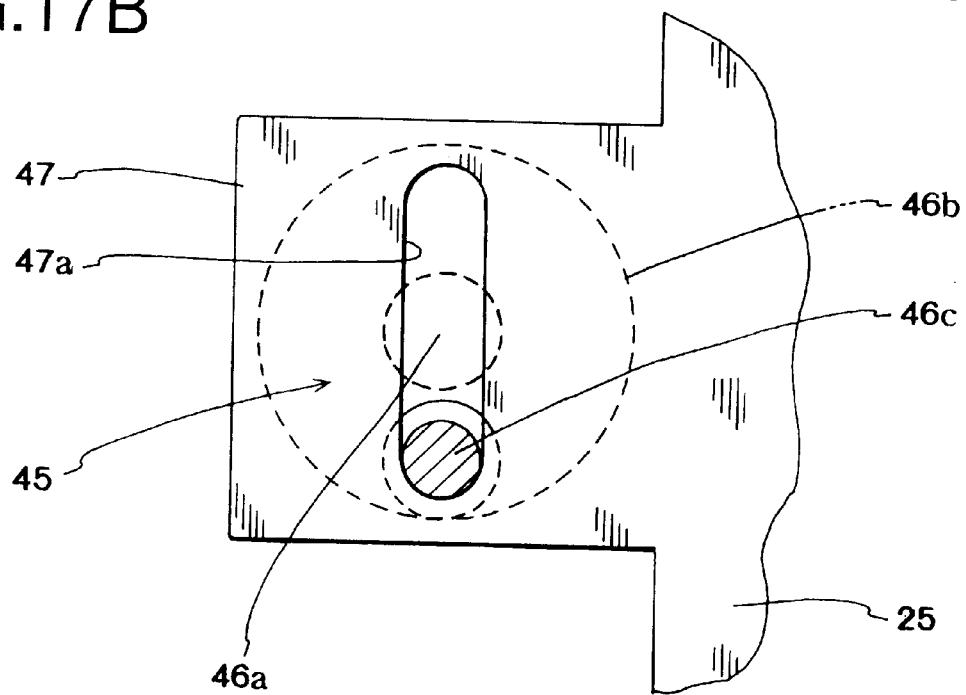

Sixth Embodiment will be explained with reference to FIGS. 16A–17B. FIG. 16A is a front view of the motion converting unit; FIG. 16B is a plan view; FIG. 16C is a side view; FIG. 17A is a front view of a part A shown in FIG. 16A; FIG. 17B is a side view of the part A.

In the present embodiment, the motion converting unit has guiding means for moving the swing fins (the swing fin unit), which are described in the former embodiments, like the sine curve motion. Namely, the guiding means linearly reciprocatively moves a frame 25, to which the swing fins 21 are provided, in the direction parallel to a plane 16.

Linear guides 44 are arranged, in parallel, in the X-direction with predetermined separation. The linear guides guide the linear reciprocative movement of a swing fin unit 24A in the X-direction. A basic structure of the swing fin unit 24A is equal to that described in the First Embodiment, and the swing fins 21 are provided to the bridge sections 25a, which are linearly arranged in the X-direction.

A swing cam unit 45 converts a rotation of a motor 36 into a linear reciprocative motion. In the present embodiment, the swing cam unit 45 includes a rotating cam 46 and a driven cam 47 (see FIGS. 17A and 17B).

The rotating cam 46 has: a rotor 46b being rotated, by the motor 36, about a shaft arranged in a Z-direction; and a cam follower 46c being located in a side face of the rotor 46b and projected in the Z-direction to link with the driven cam 47.

The driven cam 47 is integrally formed in the swing fin unit 24A, which is guided in the X-direction, and has a long hole 47a extending in the Y-direction.

When the rotating cam 46 is rotated, at fixed speed, by the motor 36, a motion component in the X-direction works to the swing fin unit 24A, so that the swing fin unit 24A is linearly reciprocatively moved in the X-direction. Since the rotating cam 46 is rotated at fixed speed, the swing fin unit 24A is moved as the desired sine curve movement.

By the linear reciprocative movement of the swing fin unit 24A, the swing fins 21, each of which has a first face 21f and a second face 21r, can be efficiently swung.

With this action, as described above, the wave motion flows W can be efficiently generated and motion can be efficiently converted.

Seventh Embodiment

Figure 18A:
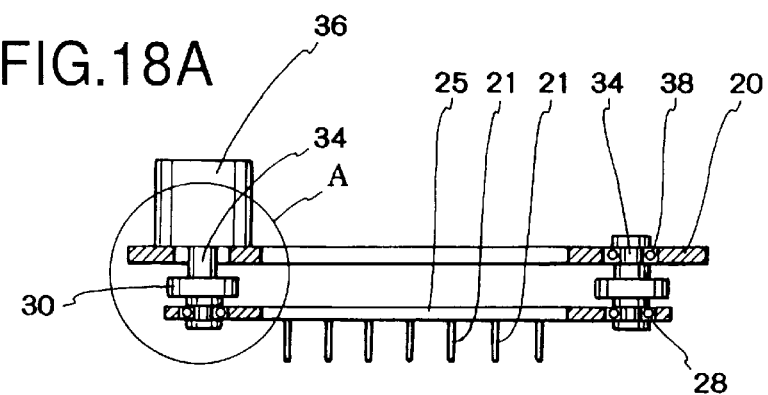
FIGS. 18A–18C are explanation views showing a drive system of Seventh Embodiment, which makes sine curve motion of the swing fin.
Figure 18B:
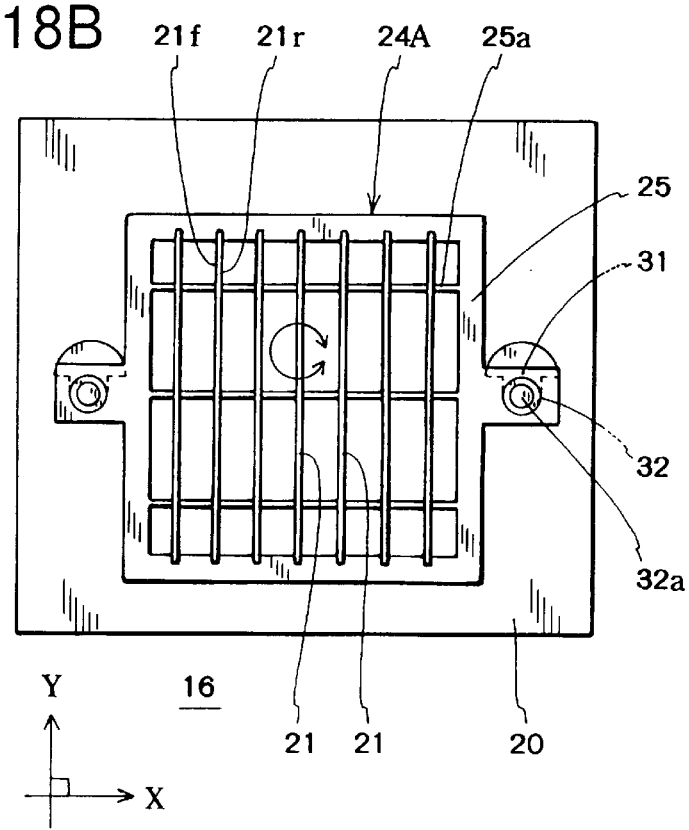
Figure 18C:
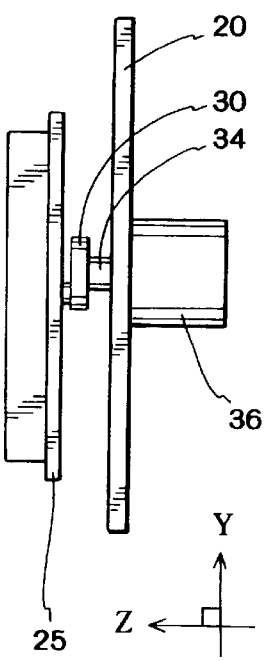
Figure 19A:
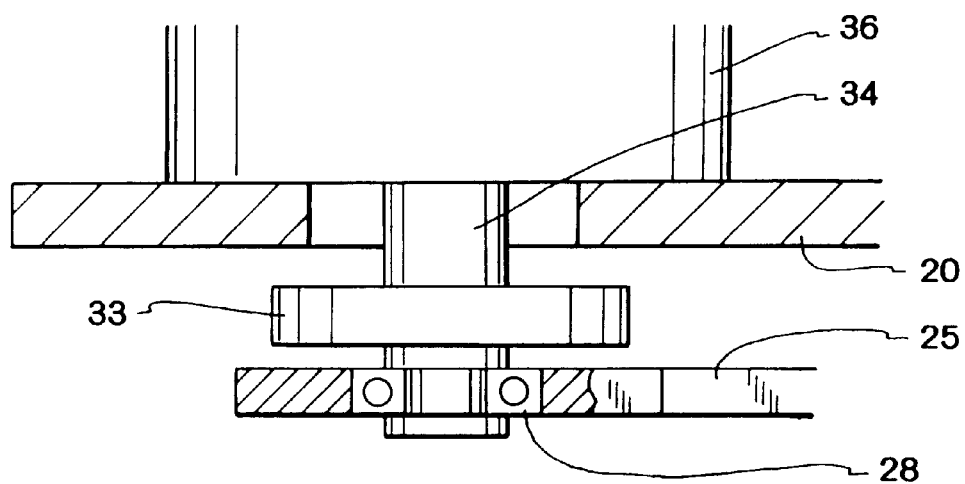
FIGS. 19A and 19B are detailed views of a part A of FIG. 18A.
Figure 19B:
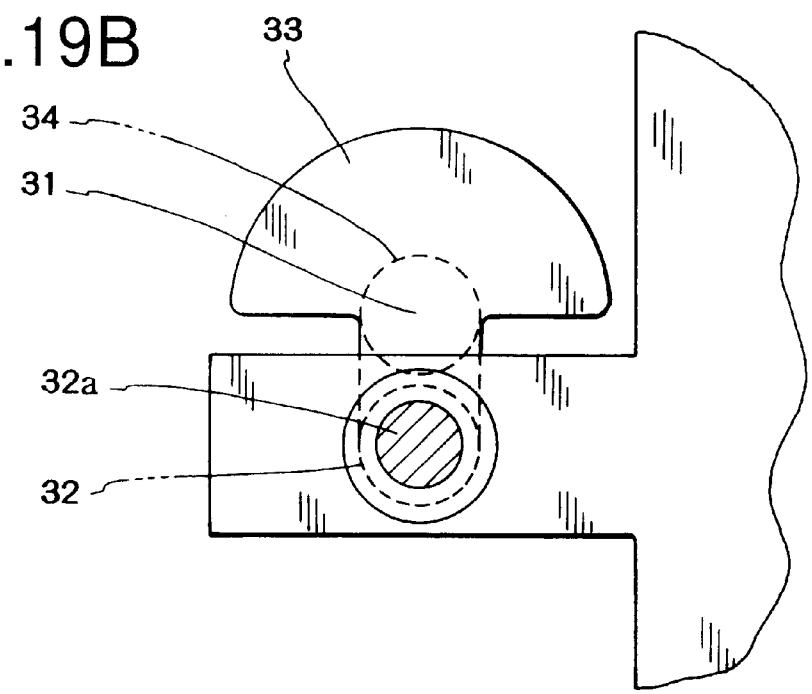

Seventh Embodiment will be explained with reference to FIGS. 18A–19B. FIG. 18A is a front view of the motion converting unit; FIG. 18B is a plan view; FIG. 18C is a side view; FIG. 19A is a front view of a part A shown in FIG. 18A; FIG. 19B is a side view of the part A.

In the Seventh Embodiment, the fin unit including a plurality of the swing fins 21, which has been described in the former embodiments, is moved round without revolving by guiding means (a drive system). The guiding means guides the swing fin unit, which includes the swing fins 21 and a frame 25, to move round, in a plane parallel to a plane 16, without revolving.

The guiding means is a two-dimensional drive system, which is capable of moving the swing fins 21, in the plane 16, without revolving.

While moving the swing fins 21 along a circular orbit, heading of the swing fins 21, with respect to a unit proper 20, is fixed, so this movement along the circular orbit can be regarded as a swing motion.

This will be further explained.

Even if the orbit is an elliptical orbit, a moving body does not revolve as far as its heading is fixed. If a minor axis of the elliptical orbit is infinitely shortened with respect to a major axis thereof, the movement is the linear reciprocative movement. In the mere linear reciprocative movement, heading of a moving body is fixed like the swing motion.

The two-dimensional drive system of the present embodiment will be explained.

Two crank levers 30 are provided to form a parallel link mechanism. One end 31 of each crank lever 30 is fixed to a shaft 34, which is pivotably connected to the unit proper 20; the other end 32 of each crank lever 30 is pivotably connected to the frame 25 of the swing fin unit 24A. The distance between the both ends 31 and 32 of the both crank levers 30 are equal. A basic structure of the swing fin unit 24A, in which the swing fins 21 are arranged, in parallel, in the X-direction and fixed to the bridge sections 25a of the frame 25, is the same as that explained in the First Embodiment.

A motor 36 is fixed to the shaft 34 to which the one end 31 of the crank lever 30 is fixed In the present embodiment, the motor 36 is connected to one of the crank levers 30, but the present invention is not limited to the present embodiment. Two motors may be respectively connected to the both crank levers.

Note that, another shaft 34, which is not directly driven by the motor 36, is pivotably held by a bearing 38, which is fixed to the unit proper 20.

Shafts 32a are respectively projected, in a Z-direction, from the ends 32 of the crank levers 30 and pivotably held by bearings 28, which are fixed to the frame 25.

Counter weights 33 are respectively fixed to the shafts 34. Each counter weight 33 is extended from each shaft 34 in the opposite direction to the direction of the crank lever 30. By the counter weights 33, partial load, which is caused by the orbital movement of the swing fin unit 24A, can be balanced, so that vibration can be prevented.

When the crank levers 30 are rotated, at the fixed speed, by the motor 36, the swing fin unit 24A is moved round without revolving. The motional component in the X-direction mainly works to the swing fin unit 24A, so that the swing fin unit 24A is swung in the X-direction. Since the swing fin unit 24A is swung in the X-direction at the fixed speed, the motional component of the X-direction of the swing fin unit 24A is the desired sine curve movement.

By the reciprocative movement of the X-direction of the swing fin unit 24A, the swing fins, each of which has a first face 21f and a second face 21r crossing the X-direction, can be efficiently swung.

Therefore, the wave motion flows W can be efficiently generated, and motion can be efficiently converted. Unlike the linear reciprocative movement, the orbital movement is the continuous circular movement, so that the swing fins can be smoothly moved without vibrations.

Note that, in the Sixth and Seventh Embodiments, the swing fins 21 are swung by the motor 36 to generate the wave motion flows W. On the other hand, the motion converting unit can be used for a mechanism for converting the wave motion flows W into a mechanical motion to extract energy. For example, an electric generator may be connected to the rotor 46b (see FIGS. 16A and 16B) or the shaft 34 (see FIGS. 18A–19B) instead of the motor 36, electric power (electricity) can be gained by converting the wave motion flows W into rotation of a rotor of the electric generator.

Eighth Embodiment

Figure 20:
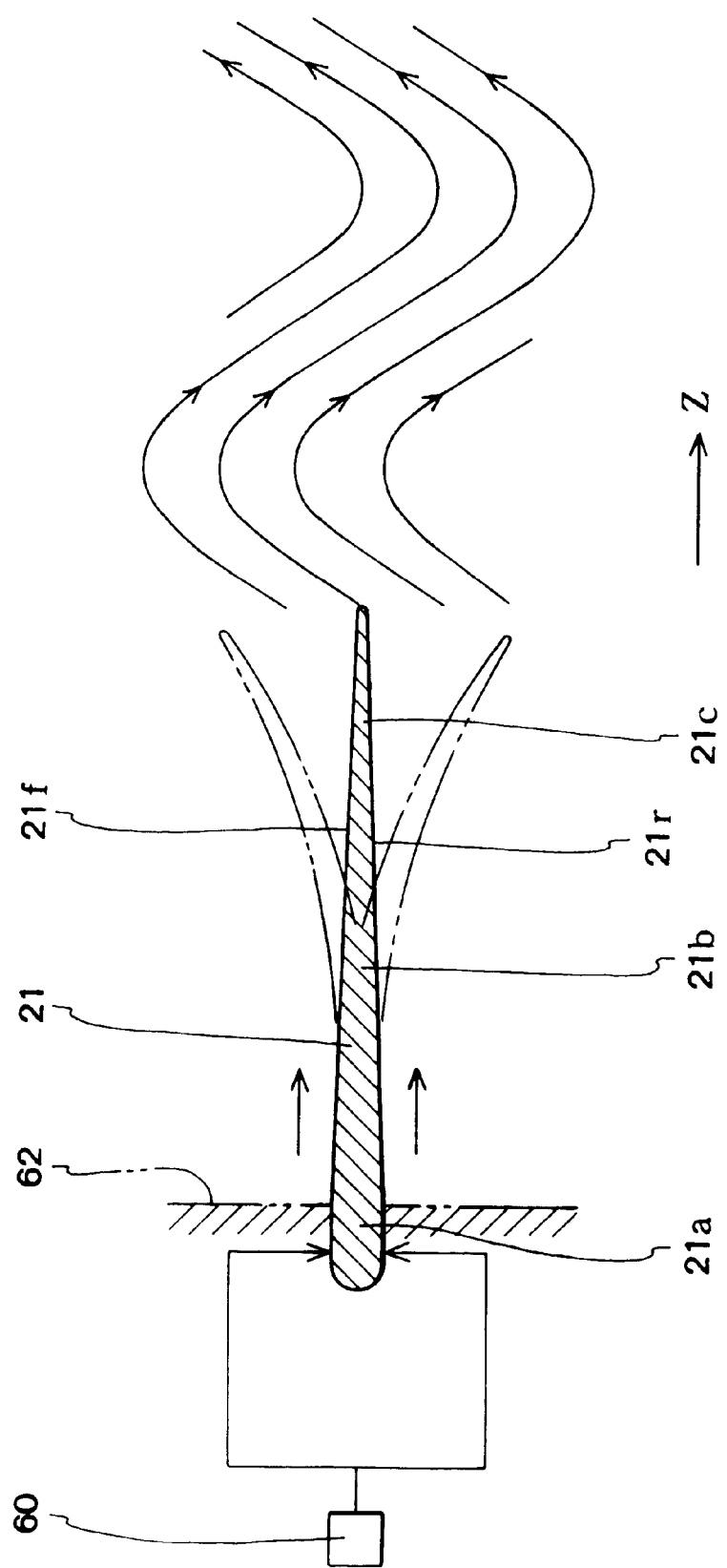
FIG. 20 is an explanation view the motion converting unit of Eighth Embodiment, in which sympathetic vibrations of the swing fin are used.

Eighth Embodiment will be explained with reference to FIGS. 20–22. In the present embodiment, guiding means for swinging the swing fins 21 and driving means for driving the guiding means will be explained.

A vibrator 60 vibrates a base end 21a of each swing fin 21. Various known vibrator may be used as the vibrator 60.

A holding member 62 elastically holds the swing fin 21 and acts as the guiding means. The holding member 62 guides the swing motion of the swing fin 21, which is a sympathetic vibration with a specific vibration number.

The swing motion of the swing fin 21 and the sympathetic vibration will be explained.

A solid body has a specific vibration number. When the solid body is vibrated, by an external force, with the specific vibration number, the solid body is sympathetically vibrated with the specific vibration number. The swing fin 21 is swung or vibrated by using the sympathetic vibration.

To swing the swing fin 21, vibration, whose vibration number is equal to the specific vibration number of the swing fin 21, is applied to a base end 21a of the swing fin 21. By applying the vibration, the swing fin 21 is sympathetically vibrated or swung. Generally, the swing motion of the swing fin has a high amplitude and low frequency.

A shape and a material of the swing fin 21 are equal to those of the former embodiments. As described above, when the vibration, whose vibration number is equal to the specific vibration number of the swing fin 21, is applied to the base end 21a of the swing fin 21, an intermediate part 21b and a free front end 21c of the swing fin 21 is swung like a dolphin kick, which is generally high amplitude and low frequency motion. With this action, the swing fin 21 makes the wave motion flow W in a fluid in which the swing fin 21 exists.

The base end 21a of the swing fin is elastically held by the holding member 62; the front end 21c is the free end, which is capable of swinging widely. Therefore, the high amplitude and low frequency swing motion can be properly generated.

By the high amplitude and low frequency swing motion of the swing fin 21, the wave motion flow W can be properly flown in the Z-direction.

Since the vibrator 60 is employed as a driving source, no rotating means, e.g., a motor, is required, so that the structure of the motion converting unit can be simple and small. Further, manufacturing cost can be reduced.

Concrete examples of arrangement of the swing fins 21 will be explained.

Figure 21:
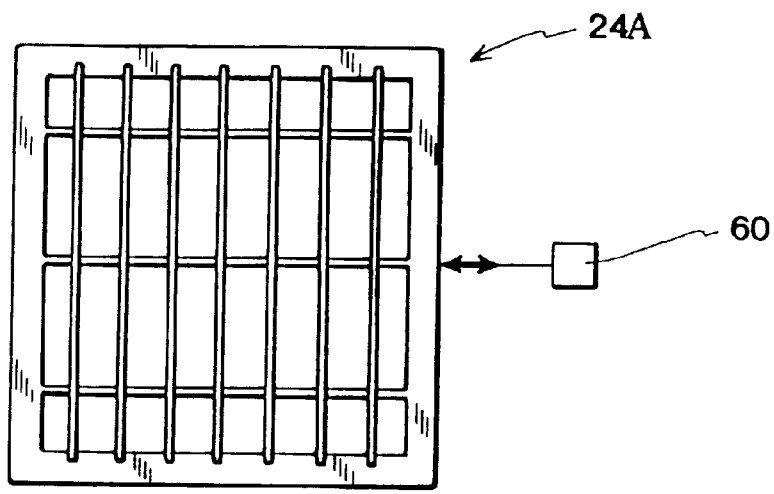
FIG. 21 is a plan view of the motion converting unit of the Eighth Embodiment, which explains the vibrating direction.

In the case of employing a vibrator as the driving source, the swing fins 21 are basically arranged as shown in FIG. 21. The swing fins 21 of a swing fin unit 24A are arranged parallel and lined in one direction. In the swing fin unit 24A, vibrating directions and swing directions of the swing fins 21 can easily be the same, the swing fin unit can be easily manufactured, and the wave motion flows W can be properly generated.

Figure 22:
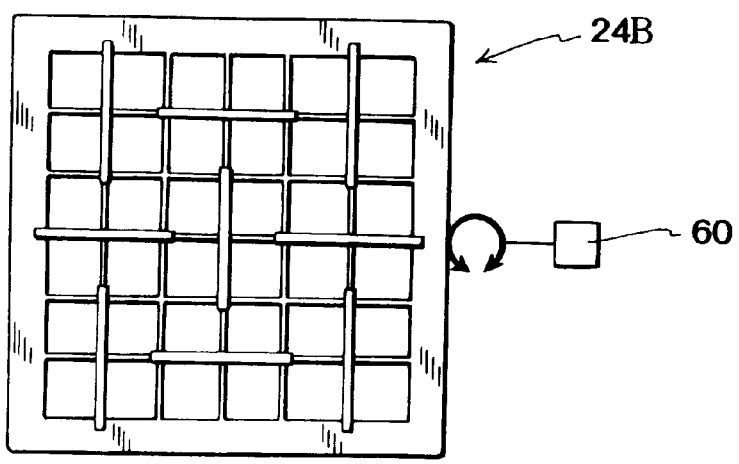
FIG. 22 is a plan view of the motion converting unit of the Eighth Embodiment, which explains another vibrating direction.

In FIG. 22, the swing fins 21 are matrically arranged in a swing fin unit 24B. By moving (vibrating) the swing fin unit 24B along a circular orbit, the wave motion flows W can be efficiently generated. A driving source has a complex structure.

To generate greater wave motion flows, a plurality of the swing fin units 24A or 24B are assembled as sub-units. This manner will be explained in the Ninth to Fourteenth Embodiments. Note that, in any embodiment, the sub-units are matrically and symmetrically arranged.

Ninth Embodiment

Figure 23:
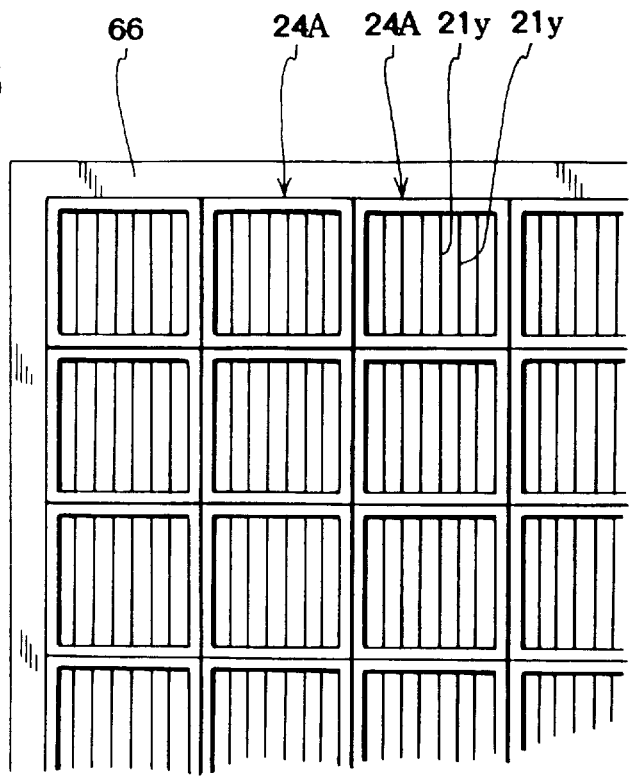
FIG. 23 is a plan view of the motion converting unit of Ninth Embodiment, which shows an arrangement of swing fin units.

Ninth Embodiment will be explained with reference to FIG. 23. A plurality of the swing fin units 24A are arranged. Each swing fin unit 24A has a plurality of swing fins 21y, which are provided in parallel. The swing fin units 24A are matrically and symmetrically arranged and fixed in a plane. The swing fins 21y of all the swing fin units 24A are arranged in parallel.

In the Ninth Embodiment, the motion converting unit can be easily enlarged with a low cost. The swing fins 21y of each swing fin unit 24A is fixed to a frame 25. Each swing fin unit 24A can be mass produced by relatively small molding dies with a low cost. Further, the swing fin units 24A are fixed to a large frame 66, but the large frame 66 has a simple structure and can be easily formed.

In the motion converting unit of the present embodiment, each swing fin 21y is swung in the direction crossing the guide faces 21f and 21r (see FIG. 1), so that the wave motion flows W can be efficiently generated from a whole surface of the motion converting unit. By using the motion converting unit as an air blower, for example, the air flows can be generated from the whole surface, so that a thin and efficient air blower can be realized.

Further, the swing fin units 24A can be freely connected. Therefore, a size and shape of the motion converting unit can be optionally designed.

Tenth Embodiment

Figure 24:
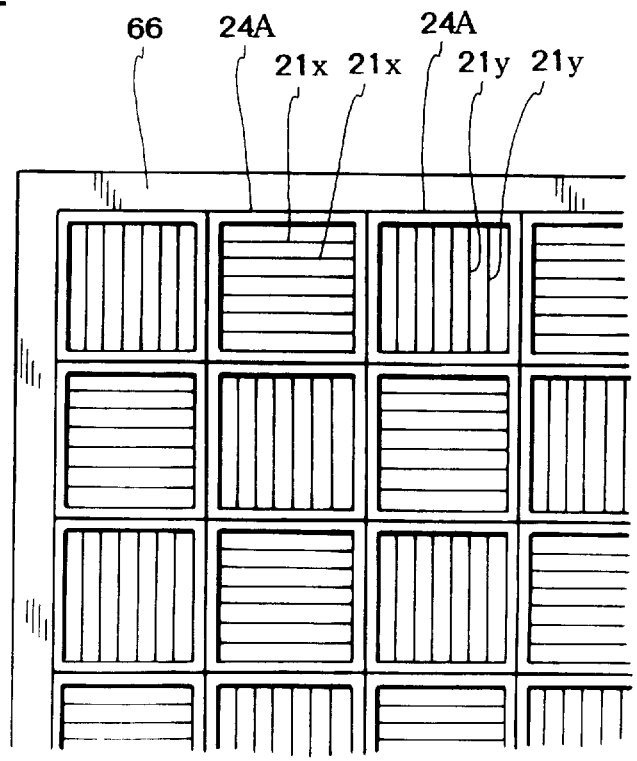
FIG. 24 is a plan view of the motion converting unit of Tenth Embodiment, which shows an arrangement of swing fin units.

Tenth Embodiment will be explained with reference to FIG. 24. A plurality of the swing fin units 24A are arranged as in the Ninth Embodiment. Each swing fin unit 24A has a plurality of swing fins 21x or 21y, which are provided in parallel. The swing fin units 24A are matrically and symmetrically arranged and fixed in a plane. Directions of the swing fins 21x and 21y of the adjacent swing fin units 24A are mutually different.

Function and effects of the motion converting unit of the Tenth Embodiment are the same as those of the Ninth Embodiment. Furthermore, in the present embodiment, when the swing fins are moved round, in the plane 16, without revolving, the wave motion flow W generated by the swing fins 21x and the wave motion flow W generated by the swing fins 21y are combined, so that the resultant wave motion flows are generated. Therefore, the mechanical motion can be efficiently converted into flow motion.

Eleventh Embodiment

Figure 25:
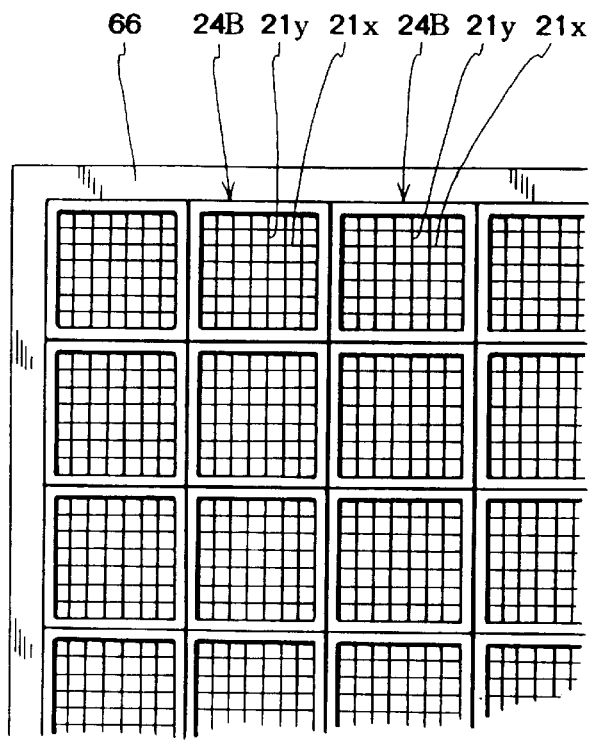
FIG. 25 is a plan view of the motion converting unit of Eleventh Embodiment, which shows an arrangement of swing fin units.

Eleventh Embodiment will be explained with reference to FIG. 25. A plurality of the swing fin units 24B are arranged. Each swing fin unit 24B has a plurality of swing fins 21x and 21y, which are provided like a lattice. The swing fin units 24B are matrically and symmetrically arranged and fixed in a plane.

Function and effects of the motion converting unit of the Eleventh Embodiment are the same as those of the Ninth Embodiment. Further, in the present embodiment, when the swing fins are moved round, in the plane 16, without revolving, the wave motion flow W generated by the swing fins 21x and the wave motion flow W generated by the swing fins 21y are combined, so that the resultant wave motion flows are generated. The resultant wave motion flow is generated by each swing fin unit 24b, so the resultant wave motion flows are uniformly generated from the whole surface of the motion converting unit.

Twelfth Embodiment

Figure 26:
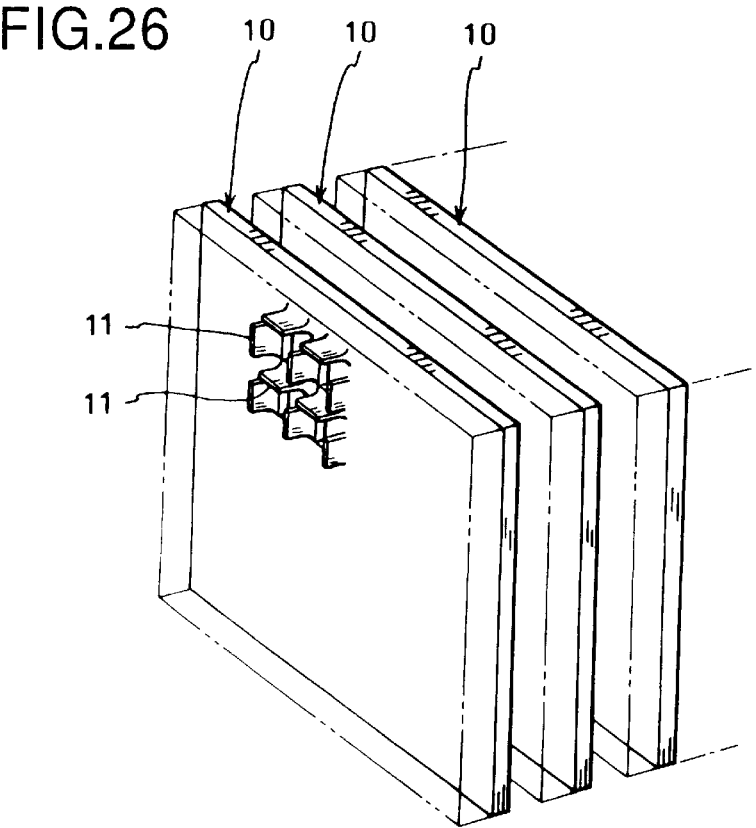
FIG. 26 is a perspective view of the motion converting unit of Twelfth Embodiment, in which subunits are linearly arranged.
Figure 27A:
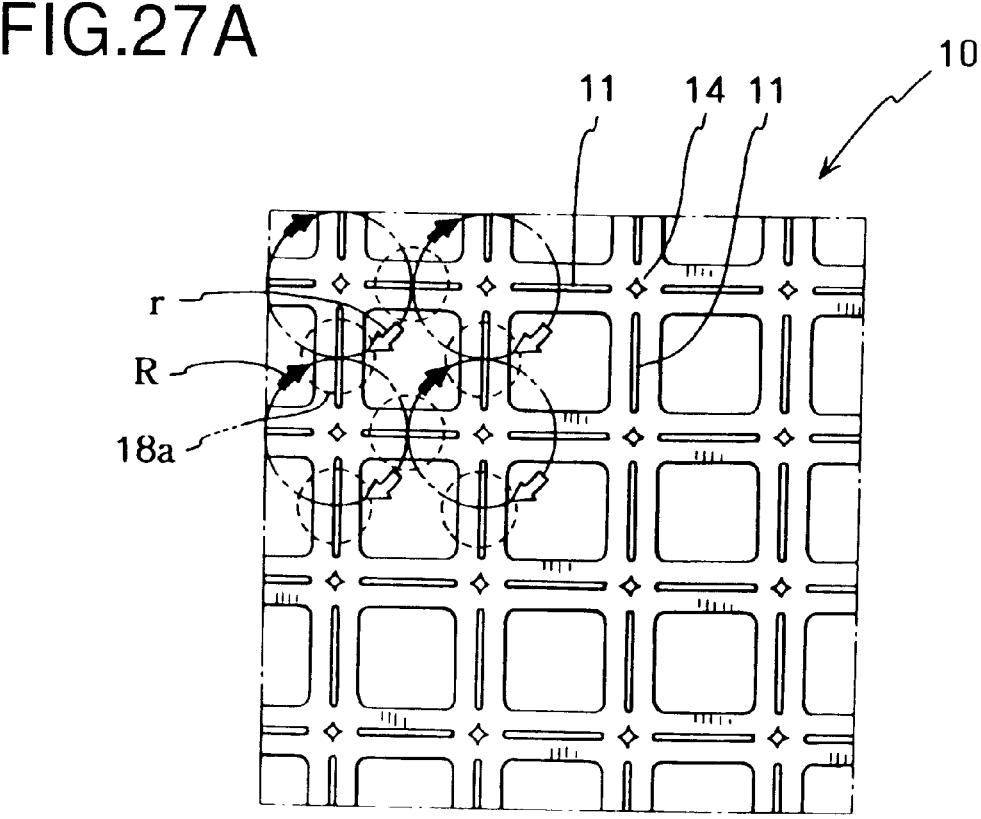
FIGS. 27A and 27B are explanation views showing action of two sub-units of the Twelfth Embodiment.
Figure 27B:
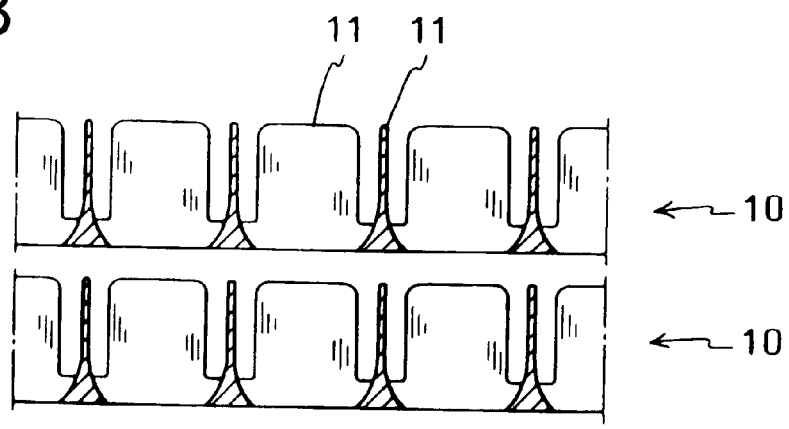

Twelfth Embodiment will be explained with reference to FIGS. 26–27B. FIG. 26 is a perspective view of the unit having a plurality of fin panels; FIG. 27A is a plan view of the unit having two fin panels; FIG. 27B is a front sectional view thereof.

A plurality of fin panels 10 is arranged, in parallel, in a direction of a flow of a fluid. By providing a plurality of the fin panels 10, a powerful flow can be generated, or greater energy can be generated from the flow. An air blower including the motion converting unit, which has two fin panels 10, will be explained with reference to FIGS. 27A and 27B. Note that, the fin panels 10 are moved round without revolving.

Rotational phase of the fin panels 10 are mutually shifted 180°. And radius of an orbit of each swing fin 11 is equal to a half of a distance between adjacent swing fins 11 as well as Third Embodiment (see FIGS. 10A and 10B), so explanation will be omitted.

In the air blower, the rotational phase of the fin panels 10 are mutually shifted 180°. So the swing fins 11 of the upper fin panel 10 are moved like black arrows R; the swing fins 11 of the lower fin panel 10 are moved like white arrows r. By moving the fin panels 10 round without revolving, hollow spaces 18a, in which the air is simultaneously pushed by the swing fins 11 of the two fin panels 10, are formed, so that the air flow can be efficiently generated.

Successively, the motion converting unit, in which a plurality of the sub-units are piled in the direction of a flow, will be explained in Thirteenth and Fourteenth Embodiments.

Thirteenth Embodiment

Figure 28A:
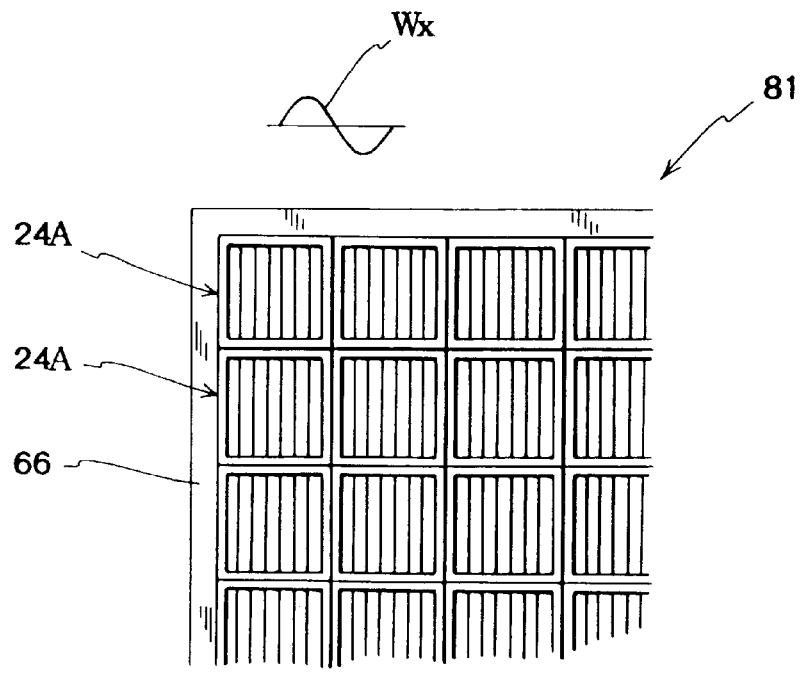
FIGS. 28A and 28B are explanation views of the motion converting unit of Thirteenth Embodiment, in which sub-units are linearly arranged.
Figure 28B:
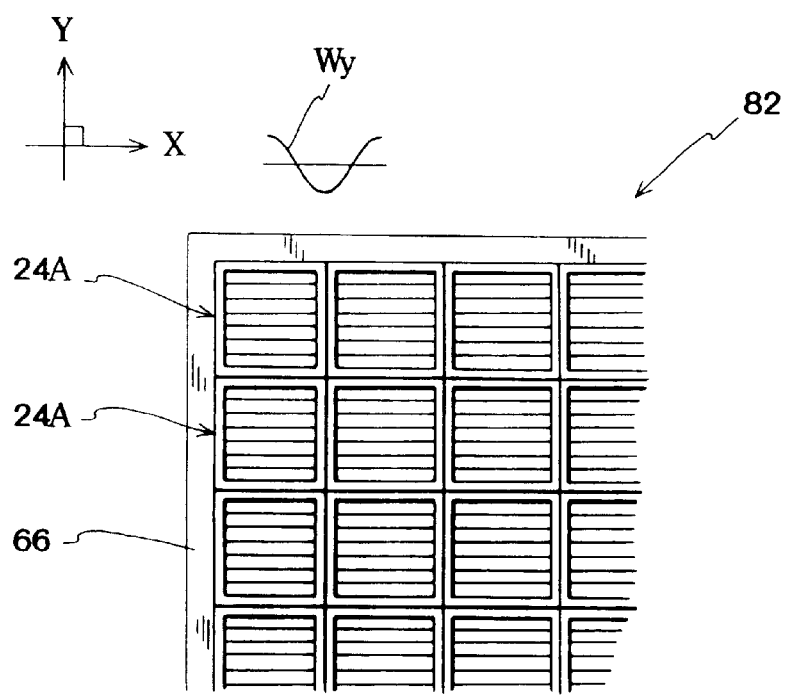

Thirteenth Embodiment will be explained with reference to FIGS. 28A and 28B. Two sub-units 81 and 82 are arranged in parallel. In the sub-unit 81, a plurality of the swing fin units 24A is arranged. Each swing fin unit 24A in the sub-unit 81 has a plurality of swing fins 21, which are provided in parallel and extended in the Y-direction (see FIG. 28A). The swing fin units 24A are matrically and symmetrically arranged and fixed in a plane. On the other hand, in the sub-unit 82, a plurality of the swing fin units 24A are arranged. Each swing fin unit 24A in the sub-unit 81 has a plurality of swing fins 21, which are provided in parallel and extended in the X-direction (see FIG. 28B). The swing fin units 24A are also matrically and symmetrically arranged and fixed in a plane. The sub-units 81 and 82 are piled in the Z-direction.

The extending direction of the swing fins of the first sub-unit 81 are different from that of the second sub-unit 82. Namely, a phase of the swing fins of the first subunit 81 is shifted 90° with respect to a phase of the swing fins of the second sub-unit 82.

With this structure, if the wave motion flow Wx generated by the first sub-unit 81 has the sine curve motion, the wave motion flow Wy generated by the second sub-unit 82 has a cosine curve motion. The two motions are combined, and the constant resultant wave motion flow, in which a pulsatory motion of the wave motion flow is removed, can be generated.

As described above, the phase of the swing fins of the first sub-unit 81 is shifted 90° with respect to that of the second subunit 82. So, a phase difference exists between the both flows, which flow in the Z-direction. The sine curve wave motion flow of the first sub-unit 81 and the cosine curve wave motion flow of the second sub-unit 82 can be properly combined by adjusting the phase difference. The phase difference can be easily adjusted by changing angular relationship between the swing fins of the first sub-unit 81 and the swing fins of the second sub-unit 82.

By serially arranging a plurality of the sub-units, energy of the flow can be made greater and greater by each sub-unit. Since the energy of the flow is made greater, durability of the latter sub-unit must be greater than that of the former sub-unit. Namely, in the present embodiment, the durability of the sub-unit 82 is greater than that of the sub-unit 81.

Further, by serially arranging a plurality of the sub-units, a uniform and constant flow, in which the pulsatory motion of the wave motion flow is removed, can be generated. Especially, the motion converting unit of the present embodiment, which includes a plurality of the sub-units, may be properly used for high pressure and high energy machines, e.g., a turbine, a pump, because the resultant wave motion flow can be properly generated.

The above described advantages can be gained by not only the motion converting unit including a plurality of the sub-units but also the motion converting unit including a plurality of the swing fin units or fin plates.

Fourteenth Embodiment

Fourteenth Embodiment will be explained with reference to FIGS. 29A and 29B. Two sub-units 81 and 82 are arranged in parallel. In the sub-unit 81, a plurality of the swing fin units 24A is arranged. Half of the swing fin units 24A in each sub-unit have swing fins 21, which are provided in parallel and extended in the X-direction; the rest of the swing fin units 24A in each subunit have swing fins 21, which are provided in parallel and. extended in the Y-direction. In each sub-unit, the extending direction of the swing fins 21 in the adjacent swing fin units 24A as mutually different. The swing fin units 24A of each sub-unit are matrically and symmetrically arranged and fixed in a plane. The X-Y arrangement of the swing fin units 24A in the first sub-unit unit 81 is inverse with respect to that in the second sub-unit 82. Namely, a phase of the swing fins of the first sub-unit 81 is shifted 90° with respect to a phase of the swing fins of the second sub-unit 82. The sub-units 81 and 82 are piled in the Z-direction.

Function and effects of the motion converting unit of the Fourteenth Embodiment are the same as those of the Thirteenth Embodiment. Further, in the present embodiment, the wave motion flow W generated by the swing fins 21 extending in the X-direction and the wave motion flow W generated by the swing fins 21 extending in the Y-direction are combined, so that the resultant wave motion flows are generated. The resultant wave motion flow is generated by each swing fin unit 24b, so the resultant wave motion flows are uniformly generated from the whole surface of the motion converting unit.

Fifteenth Embodiment

Figure 30:
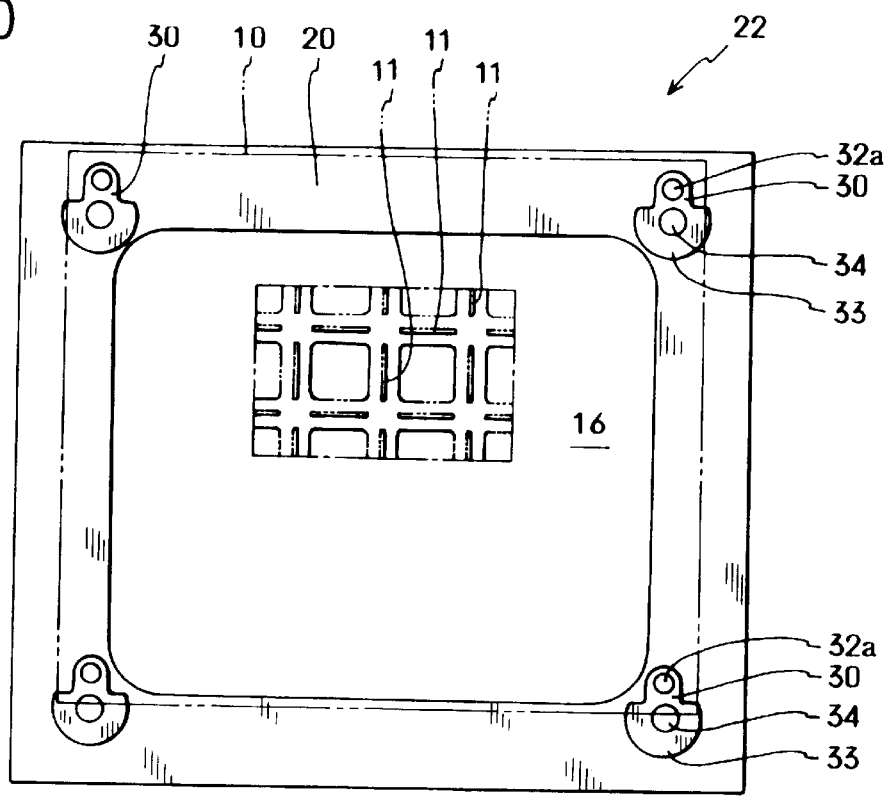
FIG. 30 is a plan view of the motion converting unit of Fifteenth Embodiment.
Figure 31:
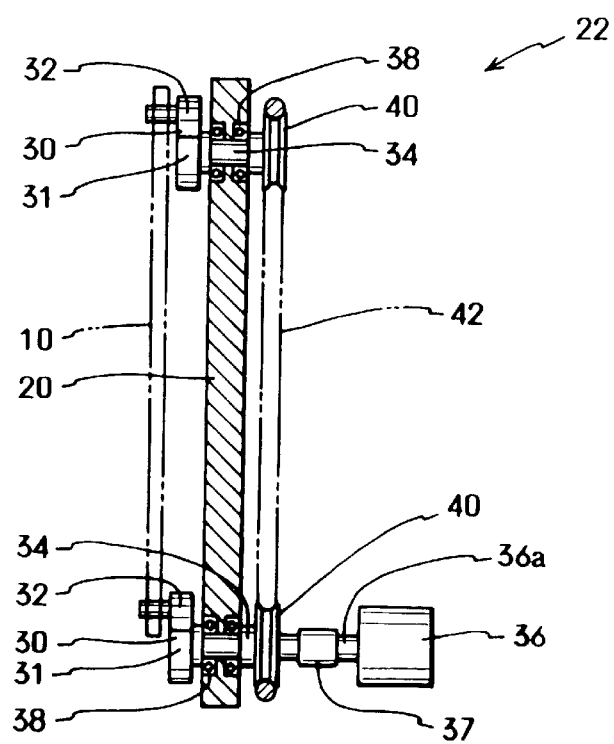
FIG. 31 is a side view of the Fifteenth Embodiment.
Figure 32:
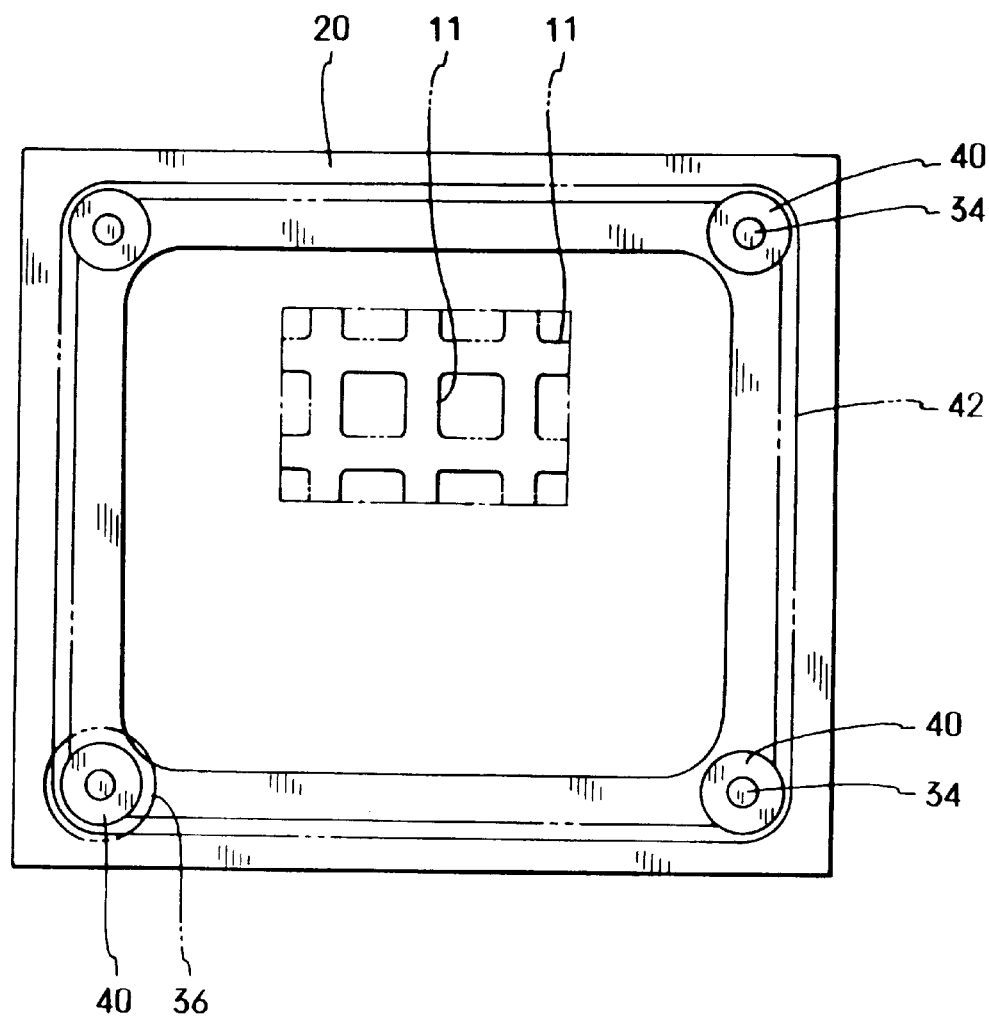
FIG. 32 is a rear view of the Fifteenth Embodiment.
Figure 33:
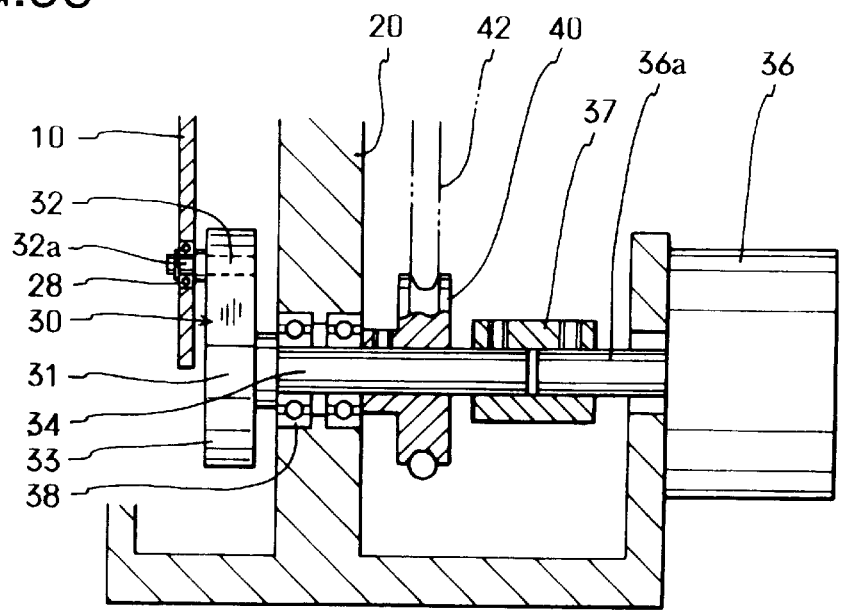
FIG. 33 is a sectional view of guiding means of the Fifteenth Embodiment.

Fiftieth Embodiment will be explained with reference to FIGS. 30–33. FIG. 30 is a plan view of the unit; FIG. 31 is a side view of the unit shown in FIG. 30; FIG. 32 is a rear view thereof; FIG. 33 is a partial sectional view thereof. In FIGS. 30 and 32, swing fins 11 of a fin panel 10 are partially shown.

Guiding means 22 includes a plurality of crank levers 30. One end 31 of each crank lever 30 is fixed to a rotary shaft 34, which is pivotably connected to a base frame 20; the other end 32 thereof is pivotably connected to the fin panel 10. In the present embodiment, four crank levers 30 are respectively pivotably connected to corners of the rectangular fin panel 10. Distance between the ends 31 and 32 of all crank levers 30 are equal. With this structure, the fin panel 10, which is shown by a two-dot chain line, can be moved round without revolving. Note that, at least two crank levers 30 are required to move the fin panel 10 round without revolving.

The unit of the present embodiment may be properly used for an air blower. Guide faces 11a of the swing fins 11 can generate an air flow. In the case of using the unit for a pump, the swing fins 11 can act as an impeller of a pump.

A motor 36 drives the fin panel 10 together with the swing fins 11. An output shaft 36a of the motor 36 is connected with the rotary shaft 34 by a compiler 37. The rotary shafts 34 are rotatably and vertically provided to the base frame 20 with bearings 38. The one end 31 of each crank lever 30 is fixed to one end of each rotary shaft 34; a pulley 40 is fixed to the other end of each rotary shaft 34.

Three rotary shafts 34 are not connected to the output shaft 36a of the motor 36. The one ends of the crank levers 30 are respectively fixed to one ends of the three; the pulleys 40 are respectively fixed to the other ends of the three. A belt 42 is engaged with the four pulleys 40.

With this structure, torque of the motor 36 is transmitted via the pulleys 40, the belt 42 and a crank mechanism, which includes the rotary shafts 34 and the crank levers 30, so that the fin panel 10 can be properly moved round without revolving.

Balance weight sections 33 are respectively extended from the one ends of the crank lever 30, so that the movement of the fin panel 10 can be stably balanced and executed smoothly.

A supporting shaft 32a is fixed to the other end 32 of each crank lever 30, and the supporting shaft 32a is pivotably attached to the fin panel 10 with a bearing 28.

Note that, unlike the present embodiment, the bearing 28 may be provided to the other end 32 of each crank lever 30, and each supporting shaft 32a may be fixed to the fin panel 10.

In the present embodiment, the crank levers 30 are parallel to the plane 16 and a surface of the base frame 20, so that the crank levers 30 can be rotated in a plane parallel thereto. With this structure, thickness of the unit can be made thinner.

Sixteenth Embodiment

Figure 34:
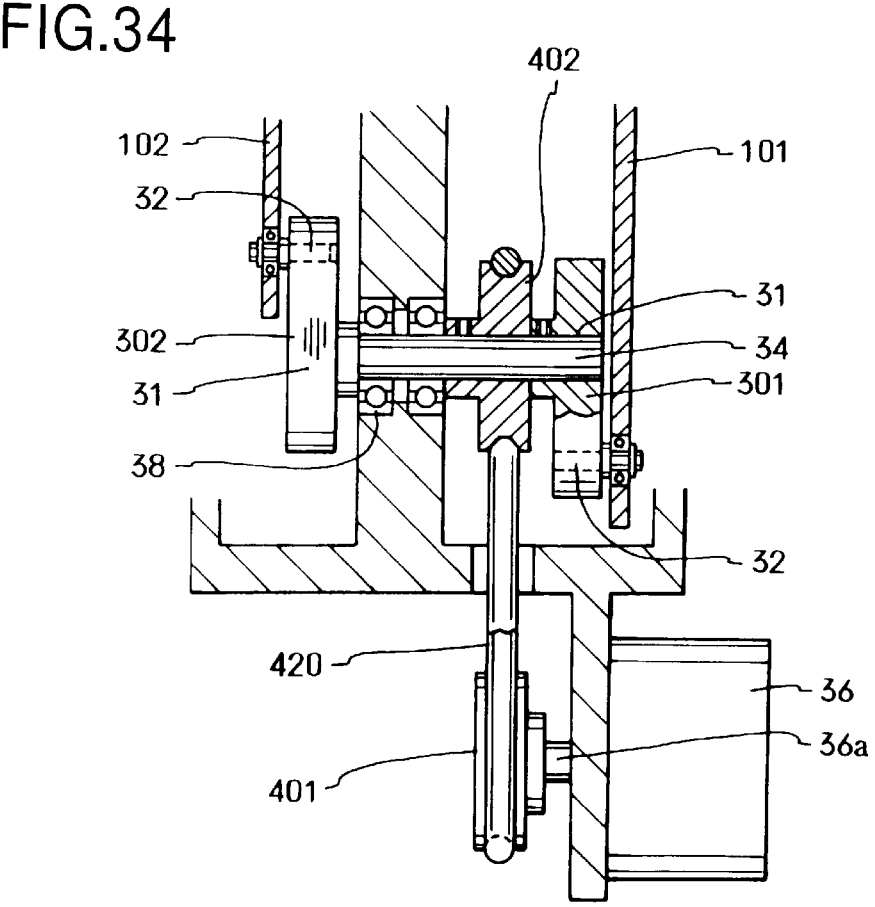
FIG. 34 is a sectional view of guiding means of Sixteenth Embodiment.

Sixteenth Embodiment will be explained with reference to FIG. 34 in which two fin panels are moved. Note that, the feature of the present embodiment is the guiding means. The elements shown in FIG. 33 are assigned the same symbols and explanation will be omitted.

A first fin panel 101 and a second fin panel 102 are employed. First crank levers 301 guide the movement of the first fin panel 101; second crank levers 302 guide the movement of the second fin panel 102. Rotational phase of each couple of the first crank lever 301 and the second crank lever 302 is mutually shifted 180°.

A driving pulley 401 is fixed to the output shaft 36a of the motor 36. A driven pulley 402 is fixed to the rotary shaft 34. A belt 420 transmit the torque of the motor 36 to the driven pulley 402 via the driving pulley 401.

Since the motion converting unit has two fin panels, the unit can be well balanced and a powerful flow can be generated.

Seventeenth Embodiment

Seventeenth Embodiment will be explained with reference to FIGS. 35 and 36. The motion converting unit is used for an air blower 50, whose guiding means is shown in FIGS. 30–33, so the elements shown in FIGS. 30–33 are assigned the same symbols and explanation will be omitted.

A hood 52 is provided on an air inlet side; a hood 54 is provided on an air outlet side. The air is introduced toward a front side from a rear face 13 along inner faces of the hoods 52 and 54.

A safety net cover 56 is provided on the air inlet side; a safety net cover 58 is provided on the air outlet side. The swing fins 11 of the air blower 50 is moved round without revolving, so the swing fins 11 never cut a finger, etc. In a conventional blower, a fan is revolved so outer ends of fins of the fan are moved at very high speed and dangerous. On the other hand, all swing fins 11 of the blower 50 are moved at the same speed, so it is relatively safe.

Figure 35:
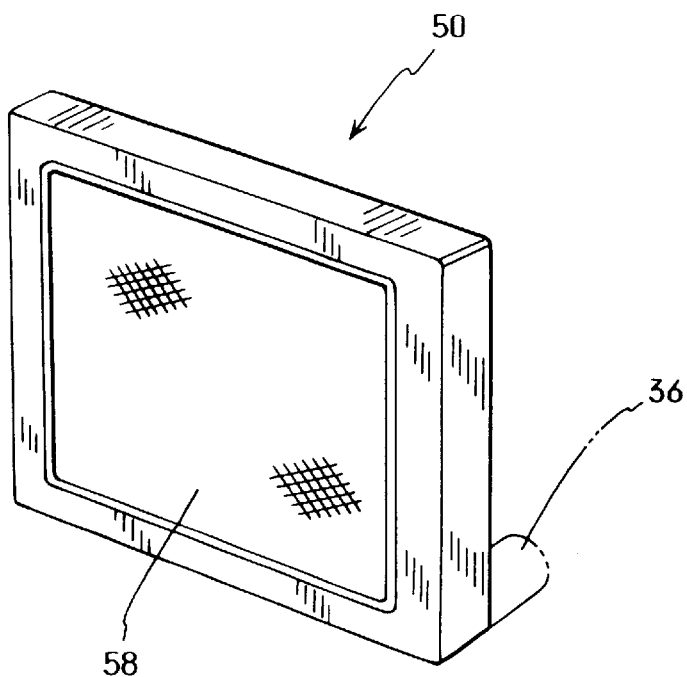
FIG. 35 is a perspective view of an air blower in which the motion converting unit of Seventeenth Embodiment is assembled.
Figure 36:
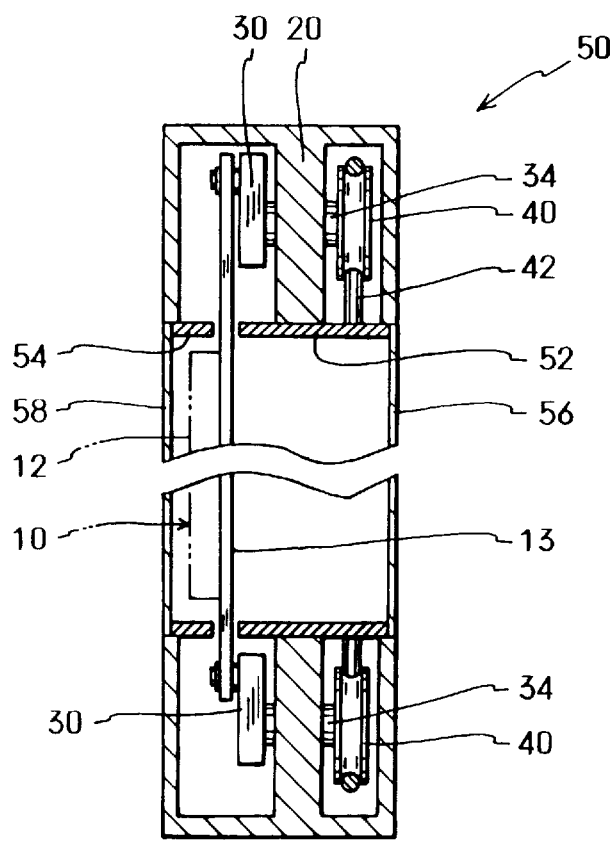
FIG. 36 is a sectional view of the air blower of the Seventeenth Embodiment is assembled

As shown in FIG. 35, the motor 36 is provided in a lower left part of the rear face 13, but the position of the motor 36 is not limited. A type of the motor 36 is also not limited, so a flat motor, for example, may be employed.

The guiding means of the present embodiment includes one motor 36 and the belt 42 so as to synchronously move four crank levers 30. The guiding means is not limited to the present embodiment.

For example, two pulleys 40 may be engaged by the belt 42 so as to synchronously move two crank levers 30, and the rest crank levers 30 may be moved freely. In this case too, the fin panel 10 can be well balanced and moved round without revolving.

Further, four crank levers 30 may be driven by four motors 36 respectively. In this case, power of each motor 36 may be small, so small motors can be employed and the size of the motion conventional unit can be small.

Furthermore, two crank levers 30, which are diagonally provided, may be driven by the motor 36, and the rest of the crank shaft may be moved freely. The type of the guiding means may be selected on the basis of the use of the unit.

Eighteenth Embodiment

Figure 37:
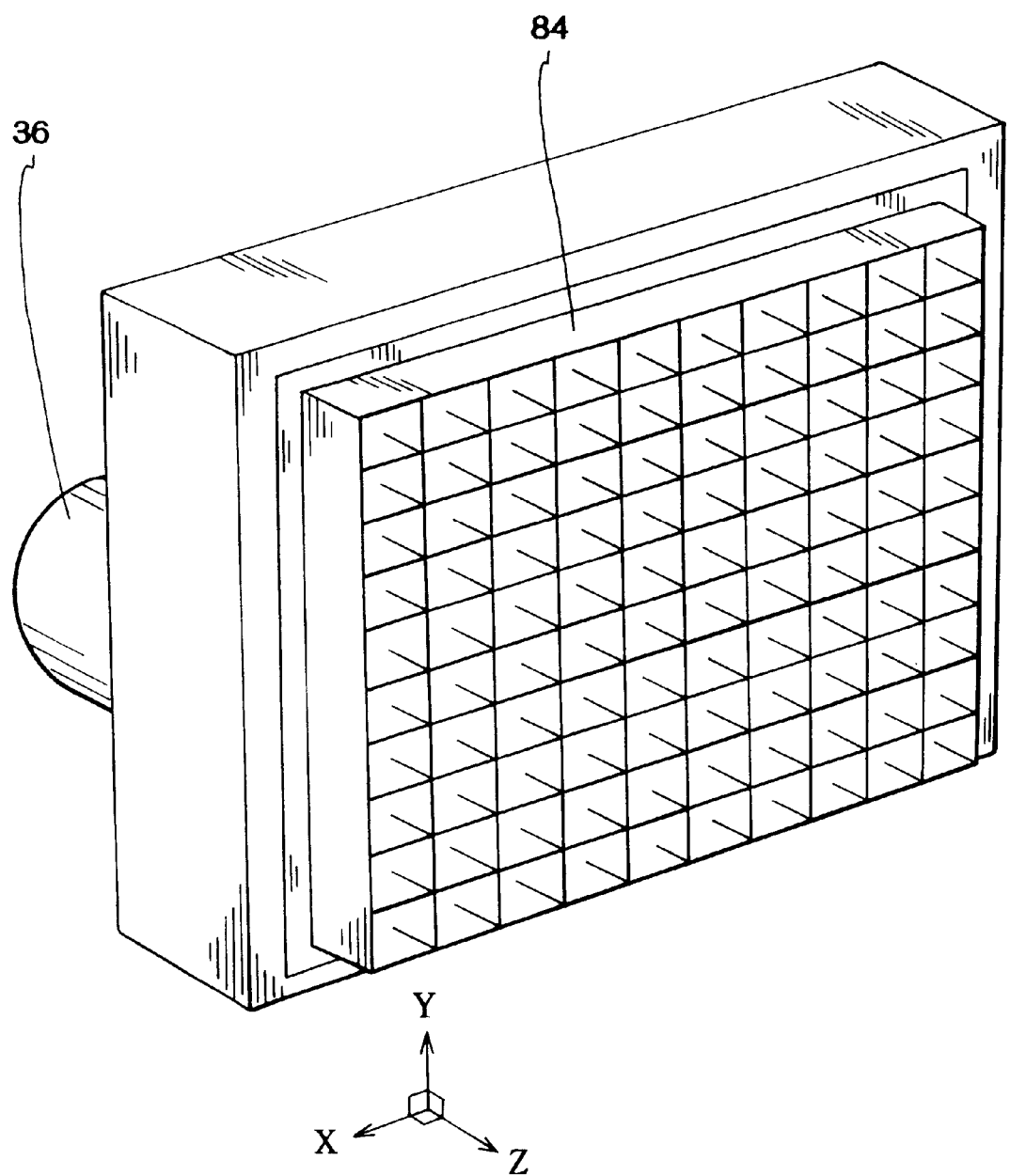
FIG. 37 is a perspective view of an air blower in which the motion converting unit of Eighteenth Embodiment is assembled.
Figure 38:
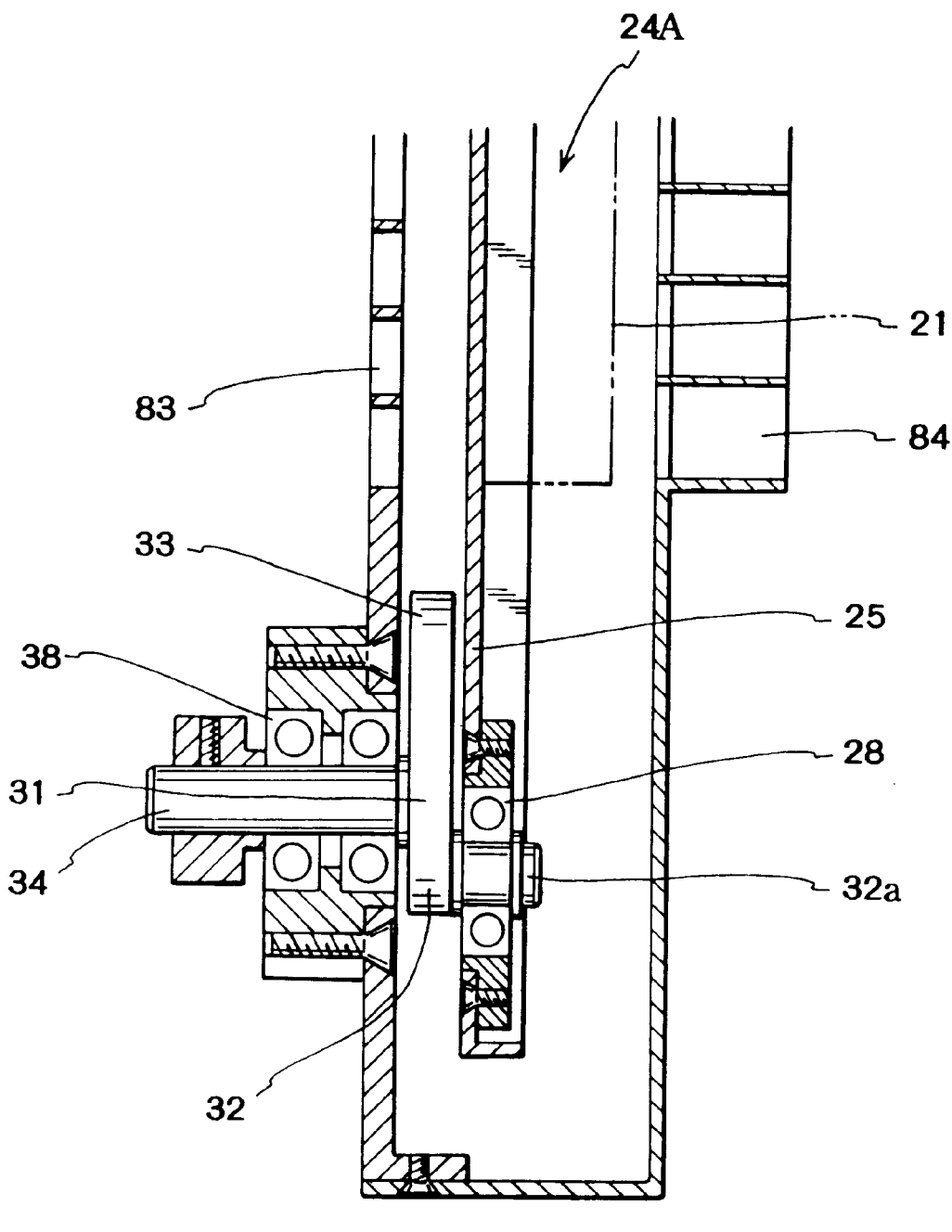
FIG. 38 is a sectional view of the air blower of the Eighteenth Embodiment is assembled.

Eighteenth Embodiment will be explained with reference to FIGS. 37 and 38. The motion converting unit of the Eighteenth Embodiment is an air blower, which is capable of converting a mechanical motion into an air flow. Swing fins 21 are used for sending the air. FIG. 37 is a perspective view; FIG. 38 is a sectional view showing a main part of an inner mechanism.

Unlike the air blower of the Seventeenth Embodiment, the air blower of the Eighteenth Embodiment has a rectifying panel 84, but the inner mechanism is almost the same as that of the Fifteenth Embodiment (see FIG. 33). Structural elements shown in the Fifteenth and Seventeenth Embodiments are assigned the same symbols and explanation will be omitted.

The rectifying panel 84 has a plurality of rectifying fins, which are extending in the direction Z of an air flow and whose surfaces are parallel to said direction Z. The rectifying fins are formed like a lattice. The rectifying panel 84 is fixed on an air-outlet side of the air blower. By the rectifying panel 84, the surfaces of the rectifying fins, which are extended in the Z-direction, guide the air flow, so that the air flow can be rectified and the direction of the air flow can be controlled.

A sucking panel 83 is fixed on an air-inlet side of the air blower. The sucking panel 83 mainly acts as a cover.

Nineteenth Embodiment

Figure 39:
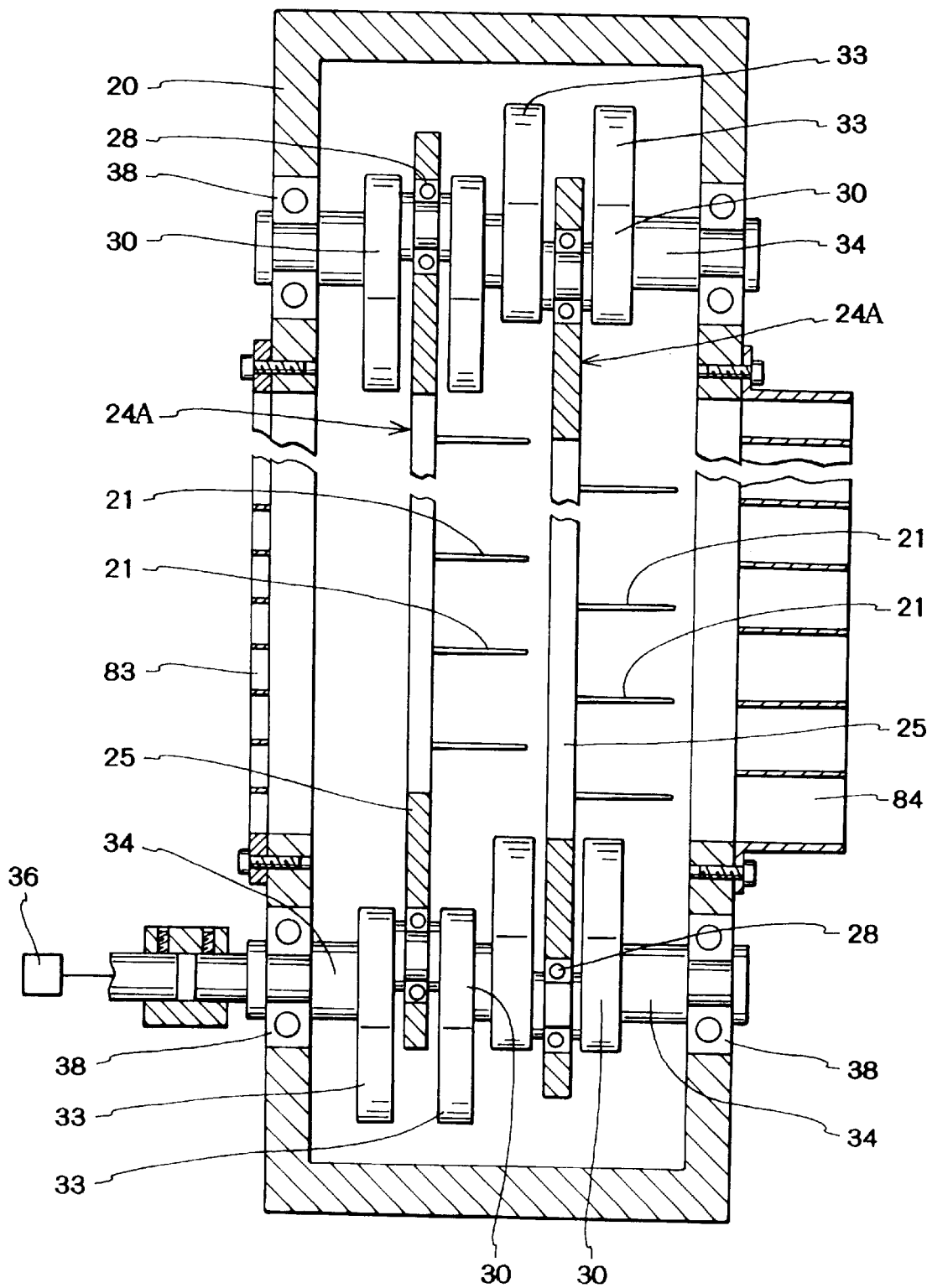
FIG. 39 is a perspective view of an air blower in which the motion converting unit of Nineteenth Embodiment is assembled.

Nineteenth Embodiment will be explained with reference to FIG. 39.

The motion converting unit of the Nineteenth Embodiment is an air blower, which is capable of converting a mechanical motion into an air flow. Two swung fin units 24A, each of which includes a plurality of swing fins 21, are used for sending the air. FIG. 39 is a sectional view showing a main part of an inner mechanism.

In the Nineteenth Embodiment, two swing fin units (fin panels) are employed as well as the Sixteenth Embodiment, but a structure of holding shafts 34 is unique. The motion converting unit is used for an air blower as well as the Eighteenth Embodiment. Structural elements shown in the Sixteenth and Eighteenth Embodiments are assigned the same symbols and explanation will be omitted.

Both ends of each shaft 34 are rotatably held by bearings 38. With this structure, the motion of the swing fin units 24A can be well balanced, vibration can be limited, and durability of the unit can be improved. Counter weights 33 are provided to both sides of each swing fin unit 24A. Thus, weight of the unit can be well balanced while operation, so that smooth operation can be executed.

In the Sixteenth and Nineteenth Embodiments, one motor 36 directly drives one of the shafts 34; other shafts 34 are not directly driven.

In the case that the shafts 34 are driven by one motor, if a distance between the crank levers 30 is short, no problem occurs. But, if the distance is long, rotational phases of the shafts 34 are shifted and vibration occurs.

To prevent the vibration, two or more shafts 34 may be directly driven by motors 36 to correct the phase shift of the shafts 34. By synchronously rotating the shafts 34 with a plurality of motors 36, torque of the shafts 34 can be balanced by the motors 36, so that the vibration can be prevented.

Twentieth Embodiment

Figure 40:
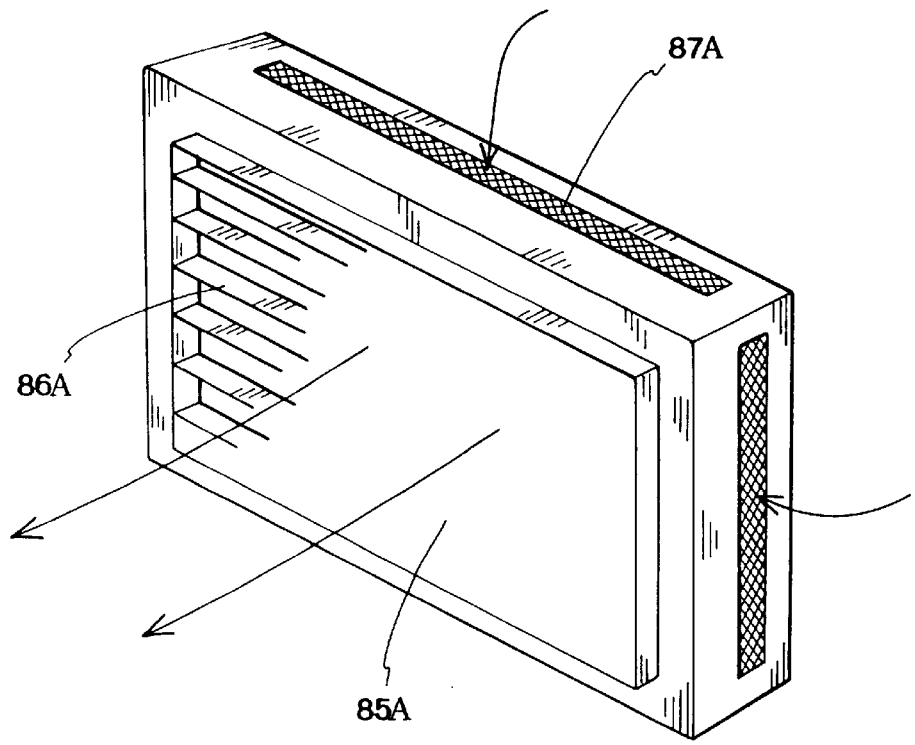
FIG. 40 is a sectional view of the air blower of the Nineteenth Embodiment.
Figure 41:
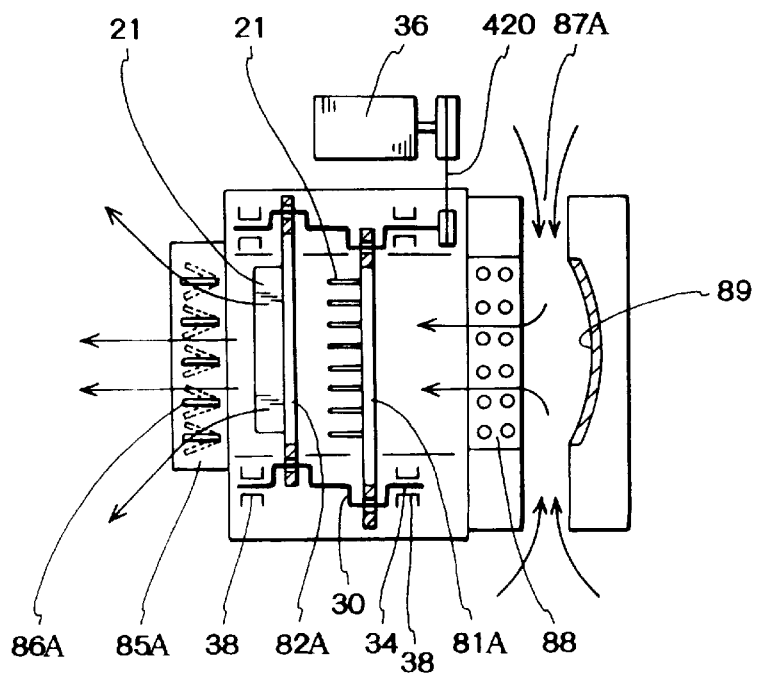
FIG. 41 is a sectional view of the motion converting unit of Twentieth Embodiment.

Twentieth Embodiment will be explained with reference to FIGS. 40 and 41.

The motion converting unit of the Twentieth Embodiment is a hot air blower. Swing fins 21 are used for sending the air. FIG. 40 is a perspective view of the hot air blower of the Twentieth Embodiment; FIG. 41 is a sectional view showing an inner mechanism thereof.

An outlet 85A, from which the hot air blows out, has a plurality of movable louvers 86A, which are capable of rectifying the hot air and controlling the flowing direction of the hot air. The air is introduced into the hot air blower from air-inlets 87A.

A first swing fin unit 81A and a second swing fin unit 82A are piled. The swing fin units 81A and 82A are attached to rotary shafts 34 and their rotational phases are mutually shifted 90°. The swing fin units 81A and 82 A moved round without revolving by guiding means.

A structure of the guiding means is the same as that of the Nineteenth Embodiment, so structural elements shown in the Nineteenth Embodiment are assigned the same symbols and explanation will be omitted.

The hot air blower has a heater section 88 and a reflector 89.

In the hot air blower of the Twentieth Embodiment, a cold air is introduced via the air-inlets 87A and heated by the heater section 88, then the hot air is sucked by the two swing fin units 81A and 82A and jetted out from the air-outlet 85A. By employing the motion converting unit of the present embodiment, a thin hot air blower can be realized.

The motion converting unit of the present embodiment is the hot air blower, but it may be used for a cool air blower by employing a cooling unit instead of the heater section 89 and removing the reflector 89.

Twenty-first Embodiment

Figure 42:
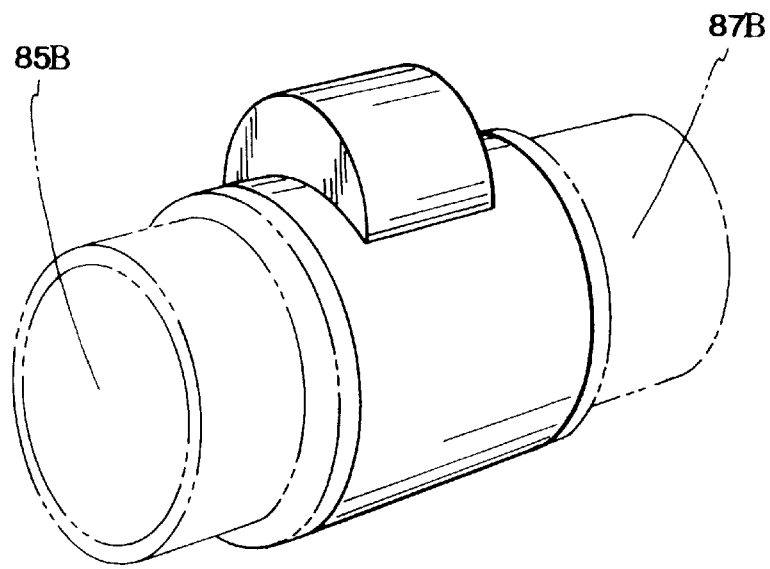
FIG. 42 is a perspective view of a pump in which the motion converting unit of Twenty-first Embodiment is assembled.
Figure 43:
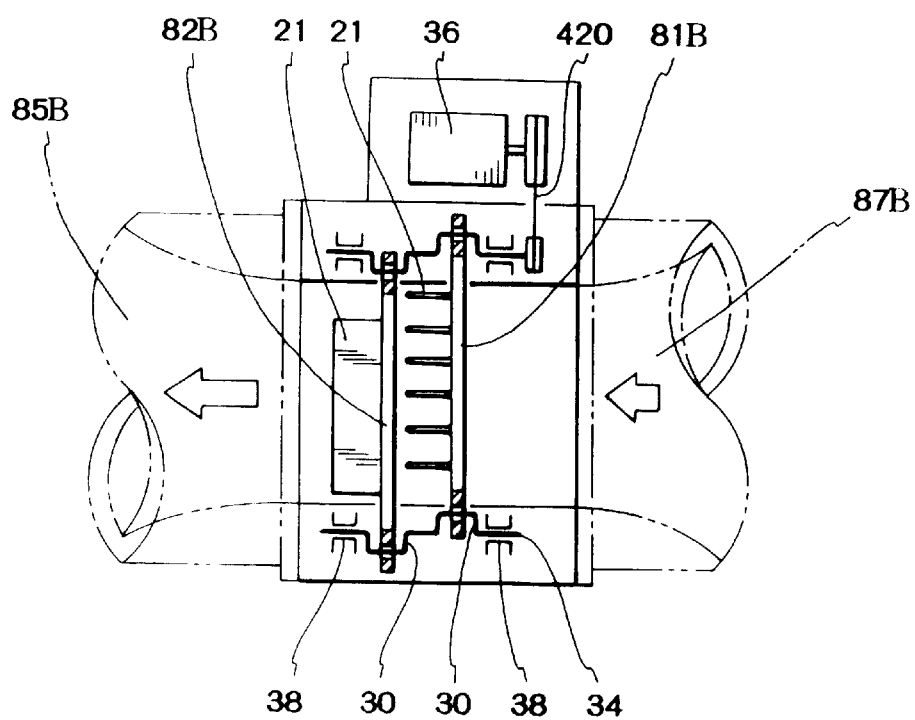
FIG. 43 is a sectional view of the motion converting unit of the Twenty-first Embodiment.

Twenty-first Embodiment will be explained with reference to FIGS. 42 and 43.

The motion converting unit of the Twenty-first Embodiment is a pump. Swing fins 21 are used for sending a fluid. FIG. 42 is a perspective view of the pump of the Twenty-first Embodiment; FIG. 43 is a sectional view showing an inner mechanism thereof.

An outlet 85B, from which the pressurized fluid flows out, is formed into a bell-mouthed shape so as to reduce fluid resistance. The fluid is introduced into the pump from an inlet 87b, which is also formed into a bell-mouthed shape so as to reduce the fluid resistance.

A first swing fin unit 81B and a second swing fin unit 82B are piled. The swing fin units 81B and 82B are attached to rotary shafts 34 and their rotational phases are mutually shifted 90°. The swing fin units 81B and 82B moved round without revolving by guiding means.

A structure of the guiding means is the same as that of the Nineteenth Embodiment, so structural elements shown in the Nineteenth Embodiment are assigned the same symbols and explanation will be omitted.

In the pump of the Twenty-first Embodiment, the fluid, e.g., water, oil, which has been introduced via the inlet 87B can be properly pressurized and discharged from the outlet 85B.

Twenty-second Embodiment

Figure 44:
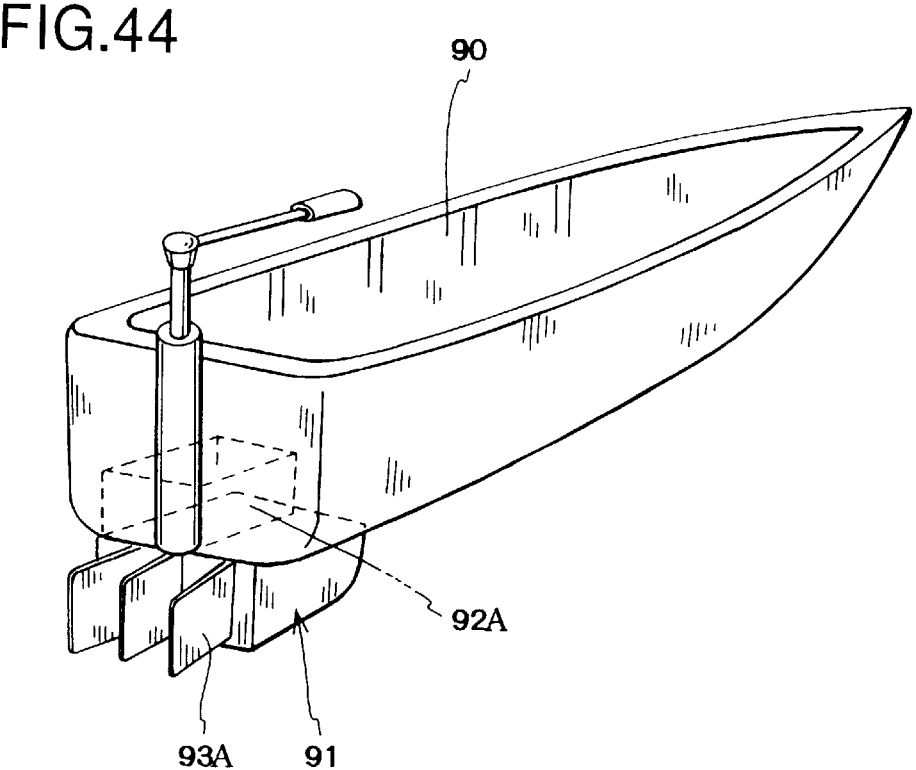
FIG. 44 is a perspective view of a boat in which the motion converting unit of Twenty-second Embodiment is assembled as a driving mechanism.
Figure 45:
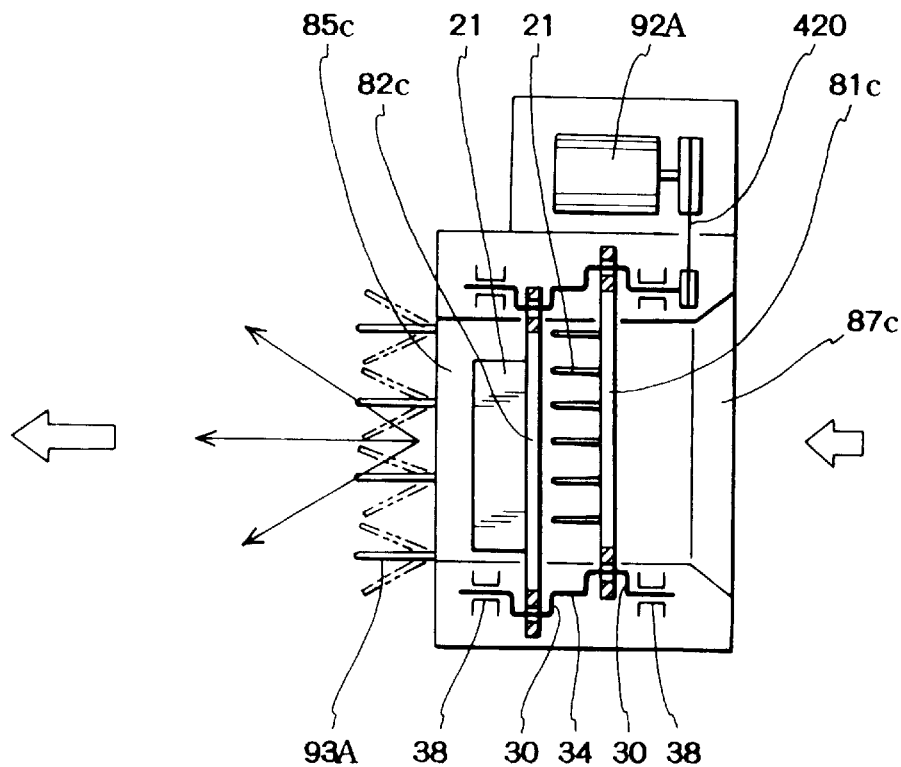
FIG. 45 is a sectional view of the motion converting unit of the Twenty-second Embodiment.

Twenty-second Embodiment will be explained with reference to FIGS. 44 and 45.

The motion converting unit of the Twenty-second Embodiment is a driving mechanism of a boat. Swing fins 21 are used for propelling the boat. FIG. 44 is a perspective view of the boat; FIG. 45 is a sectional view showing an inner mechanism of the driving mechanism of the Twenty-second Embodiment.

The boat 90 has the driving mechanism 91. An engine 92A drives the driving mechanism 91. Note that, other means, e.g., an electric motor, may be, of course, employed instead of the engine 92A.

Pressurized water flows out from an outlet 85C. There are provided a plurality of rudder plates 93A, which are capable of rectifying the water flow and controlling heading of the boat, at the outlet 85C. The water is introduced into the driving mechanism 91 via an inlet 87C, whose shape is designed to reduce water resistance.

A first swing fin unit 81C and a second swing fin unit 82C are piled. The swing fin units 81 C and 82C are attached to rotary shafts 34 and their rotational phases are mutually shifted 90°. The swing fin units 81C and 82C moved round without revolving by guiding means.

A structure of the guiding means is the same as that of the Nineteenth Embodiment, so structural elements shown in the Nineteenth Embodiment are assigned the same symbols and explanation will be omitted.

In the driving mechanism 91 of the Twenty-second Embodiment, a counter force, which is caused by the pressurized water jetted out from the outlet 85C, moves the boat 90.

Twenty-third Embodiment

Figure 46:
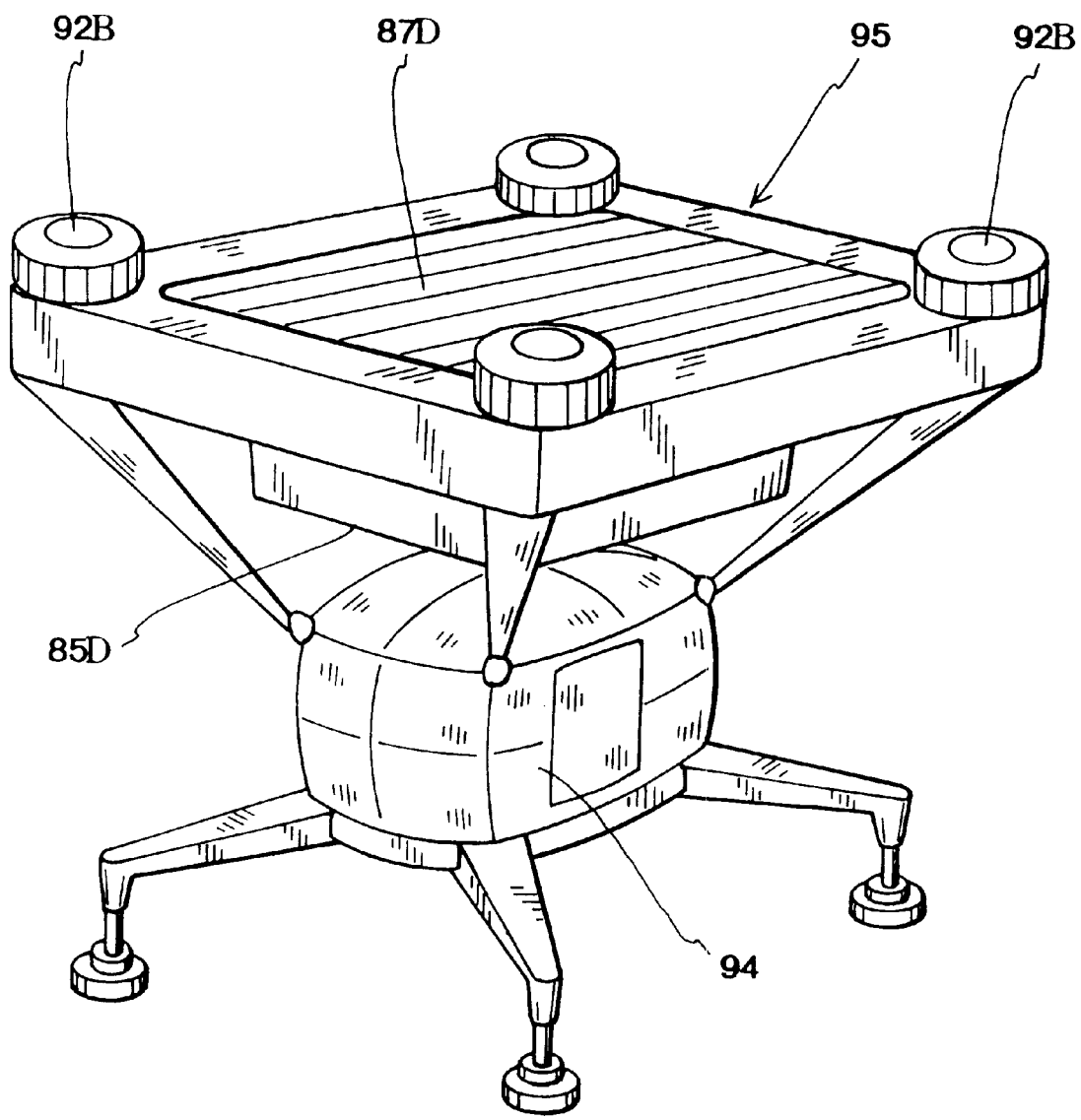
FIG. 46 is a perspective view of a driving mechanism of an aircraft in which the motion converting unit of Twenty-third Embodiment is assembled.
Figure 47:
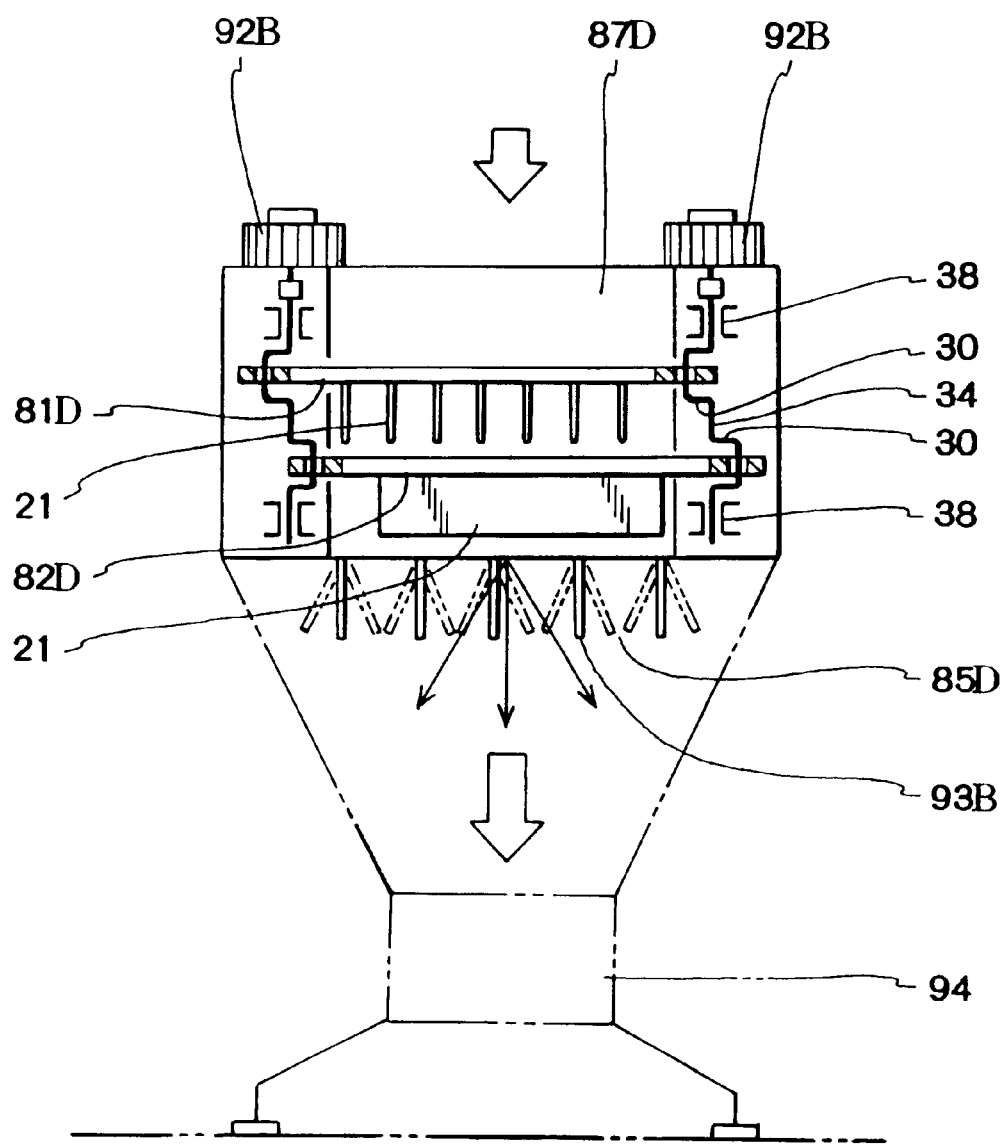
FIG. 47 is a sectional view of the motion converting unit of the Twenty-third Embodiment.

Twenty-third Embodiment will be explained with reference to FIGS. 46 and 47.

The motion converting unit of the Twenty-third Embodiment is a driving mechanism of an aircraft. Swing fins 21 are used for propelling the aircraft. FIG. 46 is a perspective view of the aircraft; FIG. 47 is a sectional view showing an inner mechanism of the driving mechanism of the Twenty-third Embodiment.

The aircraft has a cockpit 94 and the driving mechanism 95. Engines 92B are respectively connected to rotary shafts 34. Namely, the four engines 92B drive the driving mechanism 95 with high power.

Pressurized air jets out from an outlet 85D. There are provided a plurality of rudder plates 93B, which are capable of rectifying the air jet flow and controlling heading of the aircraft, at the outlet 85D. The air is introduced into the driving mechanism 95 via an inlet 87D.

A first swing fin unit 81D and a second swing fin unit 82D are piled. The swing fin units 81D and 82D are attached to rotary shafts 34 and their rotational phases are mutually shifted 90°. The swing fin units 81D and 82D moved round without revolving by guiding means.

A structure of the guiding means is the same as that of the Nineteenth Embodiment, so structural elements shown in the Nineteenth Embodiment are assigned the same symbols and explanation will be omitted.

In the driving mechanism of the Twenty-third Embodiment, a counter force, which is caused by the pressurized air jetted out from the outlet 85D, propels the aircraft. Note that, the driving mechanism may be used for not only fixed wing aircraft but also helicopters, hovercrafts, etc.

Concept 2

The concept of converting a flow motion into a mechanical motion will be explained with reference to FIG. 48.

Figure 48:
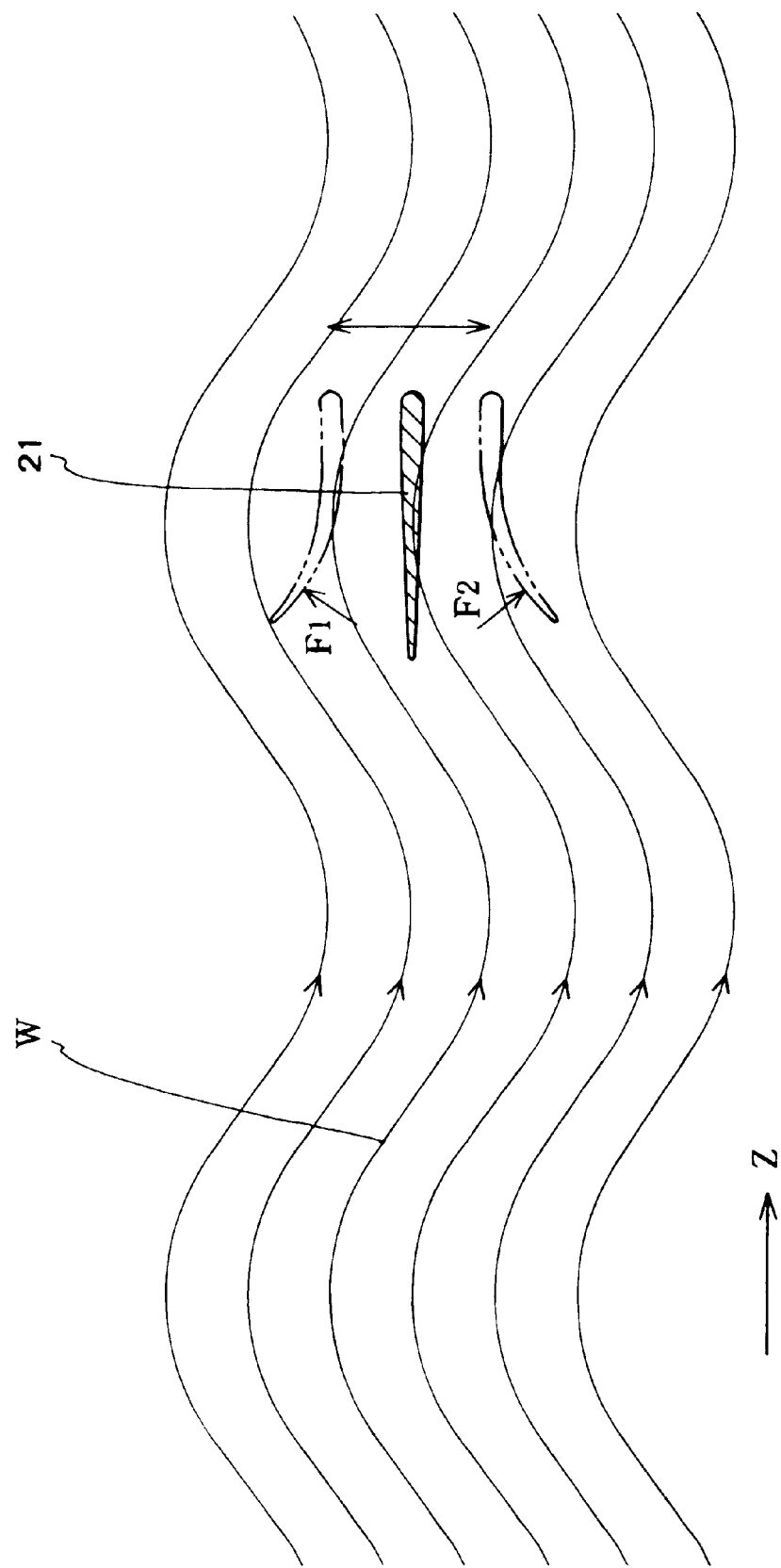
FIG. 48 is an explanation view explaining a theory of the motion converting unit of the present invention, in which a flow motion is converted into a mechanical motion by the swing motion of the swing fins.

In FIG. 48, a flow of a fluid, which flows in a third direction Z with wave motion, works to a swing fin 21. The swing fin 21 is swung together with guiding means.

The swing fin 21 receives energy of the flow to swing the swing fin 21, namely the Basic Theory 2 is a reverse theory with respect to the concept 1.

Firstly, background of the concept will be explained.

Sea waves are a natural wave motion flow. These days, we try to generate electric power from natural clean energy, e.g., a sea wave, but an efficient and effective mechanism has never been invented.

As described in the above described embodiments, the wave motion flow can be efficiently generated by swinging the swing fin 21. Then the inventor found that the mechanical motion of the swing fin 21, i.e., swing motion, can be efficiently generated by receiving the wave motion flow, so that the motion converting unit for converting the wave motion flow into the mechanical motion was invented. By the present theory, effective energy, e.g., electric power, can be efficiently generated from the natural clean energy.

Not only the sea wave but also wind is a wave motion flow. Configuration of the ground, temperature inclination, etc. influence the air flow or wind. By observing action of an anemoscope, a wind streamer, branches of a tree, we can understand that air flow includes wave motion flow. The natural wave motion flow can be converted into mechanical motion by the swing fin 21. Furthermore, effective energy, e.g., electric power, can be gained by the motion of the swing fin 21.

In the case of converting the flow motion into mechanical motion, a shape, a material, etc. of the swing fin 21 may be the same as those of the swing fin for converting mechanical motion into flow motion.

As shown in FIG. 48, the wave motion flow W flows, in the direction Z, toward a free front end of the swing fin 21. An upper component force F1 of the wave motion flow W bends and pushes the swing fin 21 upward; a lower component force F2 of the wave motion flow W bends and pushes the swing fin 21 downward. By repeating these actions, the swing fin 21 is swung. By swinging the swing fin 21, the wave motion flow W is damped and rectified.

With this action, kinetic energy of the wave motion flow W can be converted into kinetic energy of the swing motion of the swing fin 21.

In the case of converting the kinetic energy of the swing fin 21, whose swing motion is the sine curve motion, is converted into the electric power by a proper mechanism, a linear reciprocative motion of the swing fin 21 can be used. The swing motion can be directly used.

Further, the guiding means of the Sixth or Seventh Embodiment can be reversely used so as to properly generate the rotation. Namely, in the case of reversely changing the relationship between the input and the output of the Sixth or Seventh Embodiment, the electric power can be gained from the energy of the flow motion by a proper mechanism.

To limit the direction of the mechanical motion, a proper mechanism, e.g., a ratchet, a one-way clutch, may be employed to rotate in one direction.

Generally, natural wave motion flow has a low frequency, so linearity is low and diffusionability is high. Therefore, converting efficiency can be improved by providing a taper-shaped hood on the upper side of the flow W (an inlet side).

Twenty-fourth Embodiment

Figure 49:
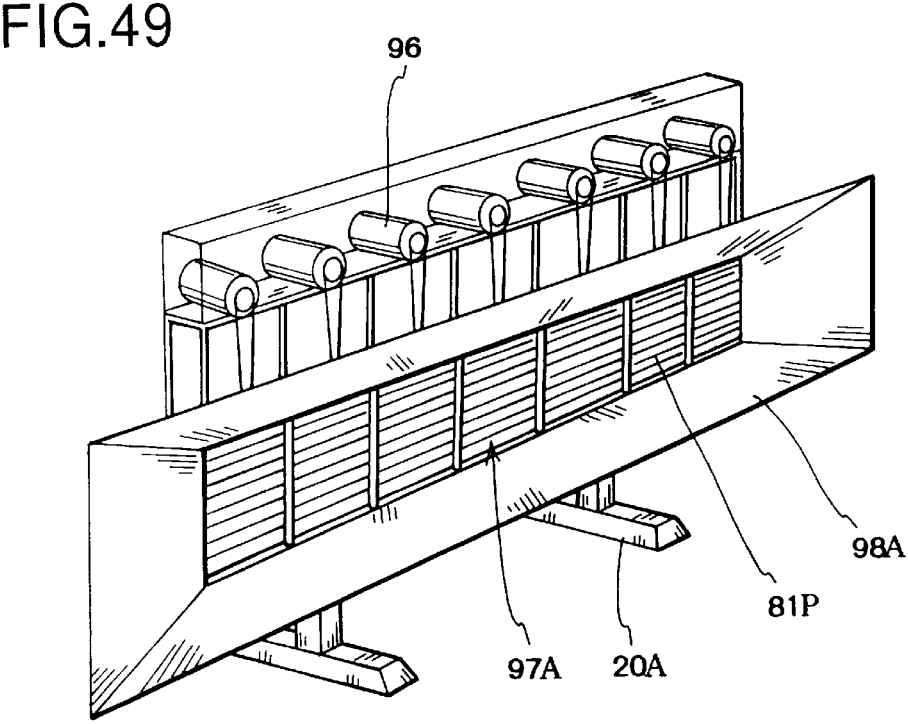
FIG. 49 is a perspective view of a wave electric generator in which the motion converting unit of Twenty-fourth Embodiment is assembled.
Figure 50:
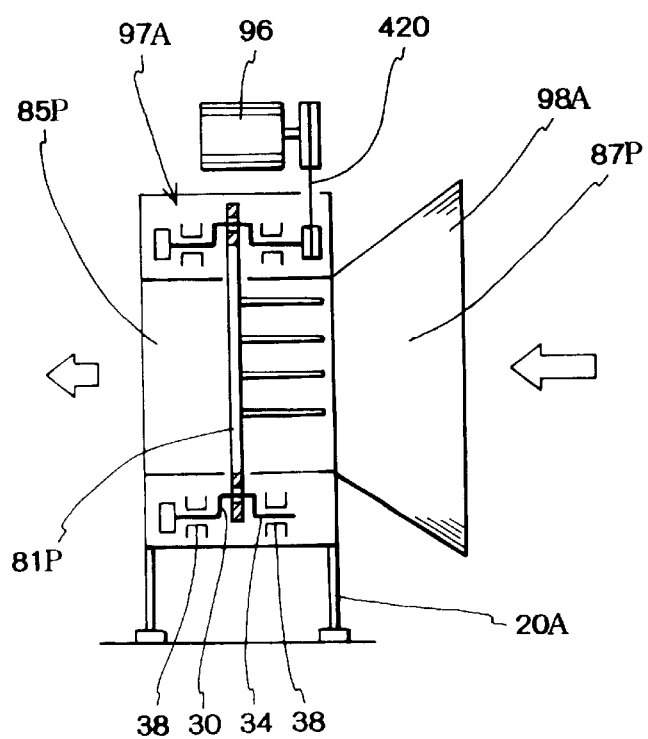
FIG. 50 is a sectional view of the motion converting unit of the Twenty-fourth Embodiment.

A wave electric generator is explained in the Twenty-fourth Embodiment. Swing fins 21 are used for the wave electric generator. FIG. 49 is a perspective view of the wave electric generator; FIG. 50 is a sectional view showing an inner mechanism.

A base section 20A is settled in the sea.

A generator unit 96 is fixed to the base section 20A and located above the surface of the sea.

A motion converting unit 97A, which converts the flow motion into mechanical motion, is fixed to the base section 20A and located in the sea.

A collecting hood 98A has a taper-shaped guide section, and the hood 98A is located on an inlet 87P side. The flow W is discharged from an outlet 85P.

A plurality of swing fin units 24A constitute a sub-unit 81P. The sub-unit 81P is connected to rotary shafts 34 and moved round without revolving by guiding means.

The motion converting unit 97A has one sub-unit 81P, but the guiding means of the Nineteenth Embodiment is employed as the guiding means. So the structural elements shown in the Nineteenth Embodiment are assigned the same symbols and explanation will be omitted.

In the Twenty-fourth Embodiment, the wave motion flow W of the sea water enters from the hood 98A, then the flow W moves (swings) the swing fins 21 of the swing fin units 24A of the sub-unit 81P. The swing motion of the swing fins 21 or the sub-unit 81 P is converted into a rotation by the crank levers 30, so that the electric generator unit 96 is driven (rotated) to generate electric power.

Twenty-fifth Embodiment

Figure 51:
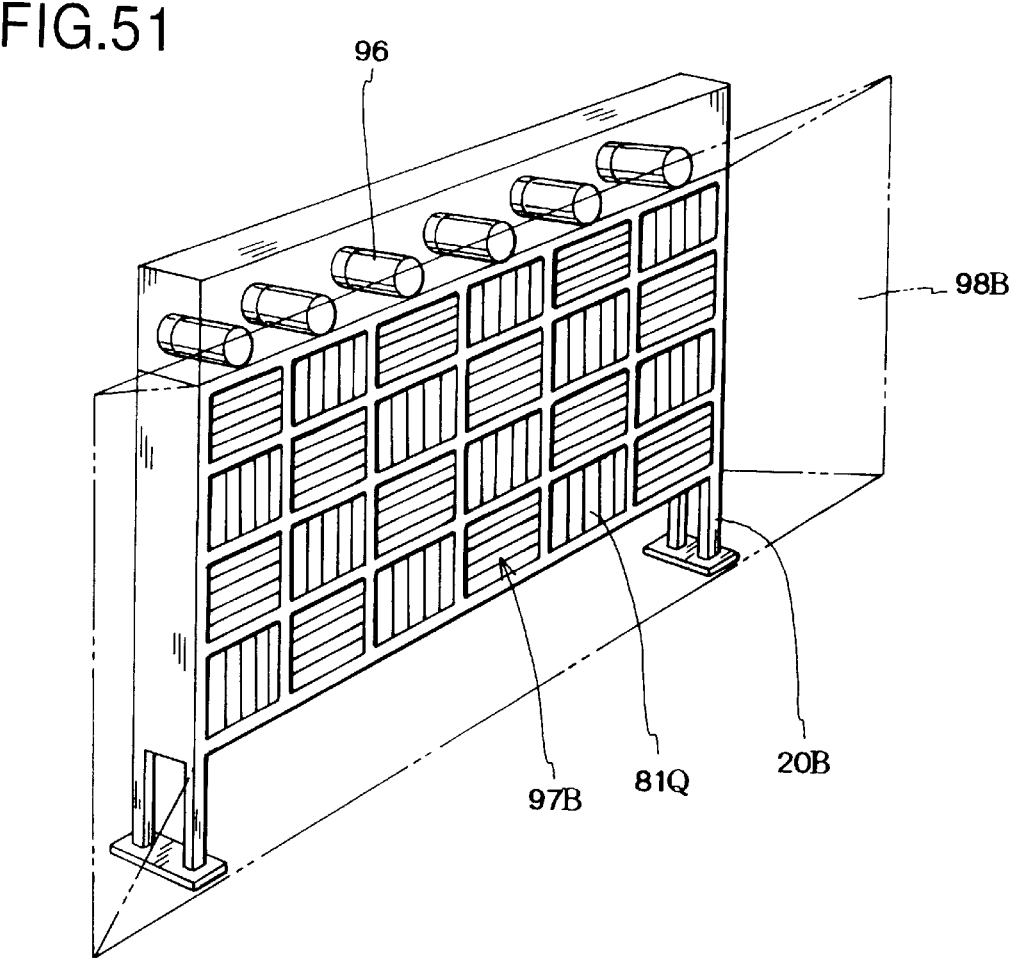
FIG. 51 is a perspective view of a wind electric generator in which the motion converting unit of Twenty-fifth Embodiment is assembled.
Figure 52:
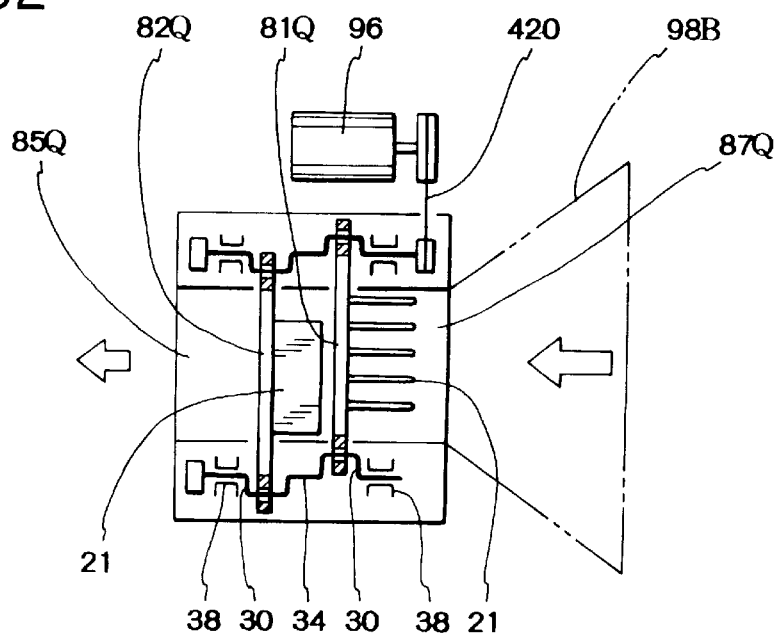
FIG. 52 is a sectional view of the motion converting unit of the Twenty-fifth Embodiment.

A wind electric generator is explained in the Twenty-fifth Embodiment. Swing fins 21 are used for the wind electric generator. FIG. 51 is a perspective view of the wind electric generator; FIG. 52 is a sectional view showing an inner mechanism.

A base section 20B is settled on the ground.

A generator unit 96 is fixed to the base section 20B.

A motion converting unit 97B, which converts the flow motion into mechanical motion, is fixed to the base section 20B.

A collecting hood 98B has a taper-shaped guide section, and the hood 98B is located on an inlet 87Q side. The flow W is discharged from an outlet 85Q.

A plurality of swing fin units 24A constitutes sub-units 81Q and 82Q. The sub-units 81Q and 82Q are respectively connected to rotary shafts 34 and moved round without revolving by guiding means. Phase of the sub-units 81Q and 82Q are mutually shifted 90°.

The guiding means of the Nineteenth Embodiment is employed as the guiding means. So the structural elements shown in the Nineteenth Embodiment are assigned the same symbols and explanation will be omitted.

In the Twenty-fifth Embodiment, the wave motion flow W of the wind enters from the hood 98B, then the flow W moves (swings) the sub-units 81Q and 82Q. The swing motion of the sub-units 81Q and 82Q are converted into a rotation by the crank levers 30, so that the electric generator unit 96 is driven (rotated) to generate electric power.

Twenty-sixth Embodiment

Figure 53:
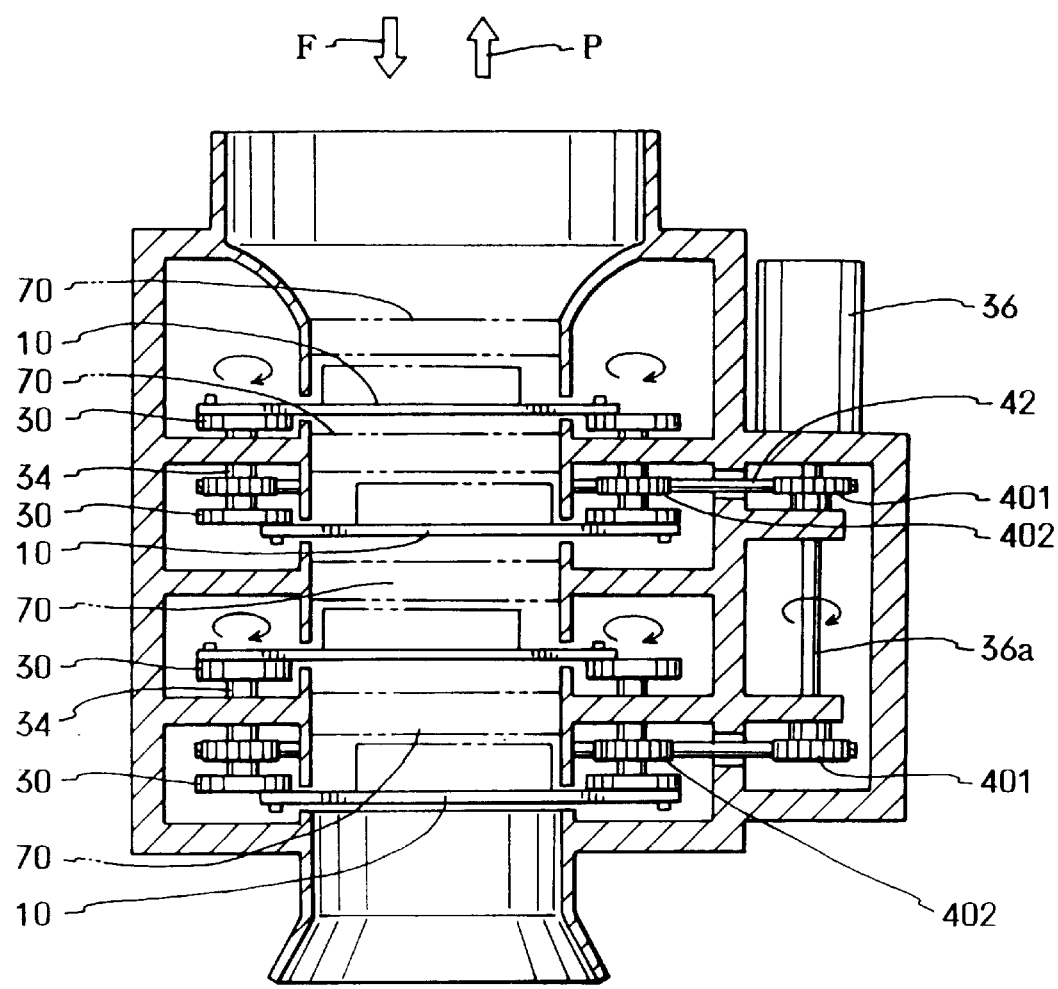
FIG. 53 is a sectional view of the motion converting unit of Twenty-sixth Embodiment, in which a plurality of sub-units are vertically arranged.

Twenty-sixth Embodiment will be explained with reference to FIG. 53. A plurality of fin plates are arranged in a direction of flow of a fluid. Note that, the elements described in former embodiments are assigned the same symbols and explanation will be omitted.

In the case that the motion conversion unit of the present embodiment is used for a pump or an air blower, the fluid is introduced in a direction P. When the motor 36 is driven, four fin panels 10, whose rotational phase are mutually shifted, are moved round, in the same direction, without revolving. With this action, the air, which has been pressurized by a plurality of the fin panels 10, is blown out in the direction P. Note that, the air is introduced inward via a guide part 70.

In the case that the motion conversion unit of the present embodiment is used for an electric generator instead of the motor 36. The electric generator can generate electricity. When a wave motion flow F of a fluid works to the fin panels 10, the fin panels 10 are moved round without revolving, so that the electric generator is driven and the electricity can be gained.

Twenty-seventh Embodiment

Figure 54:
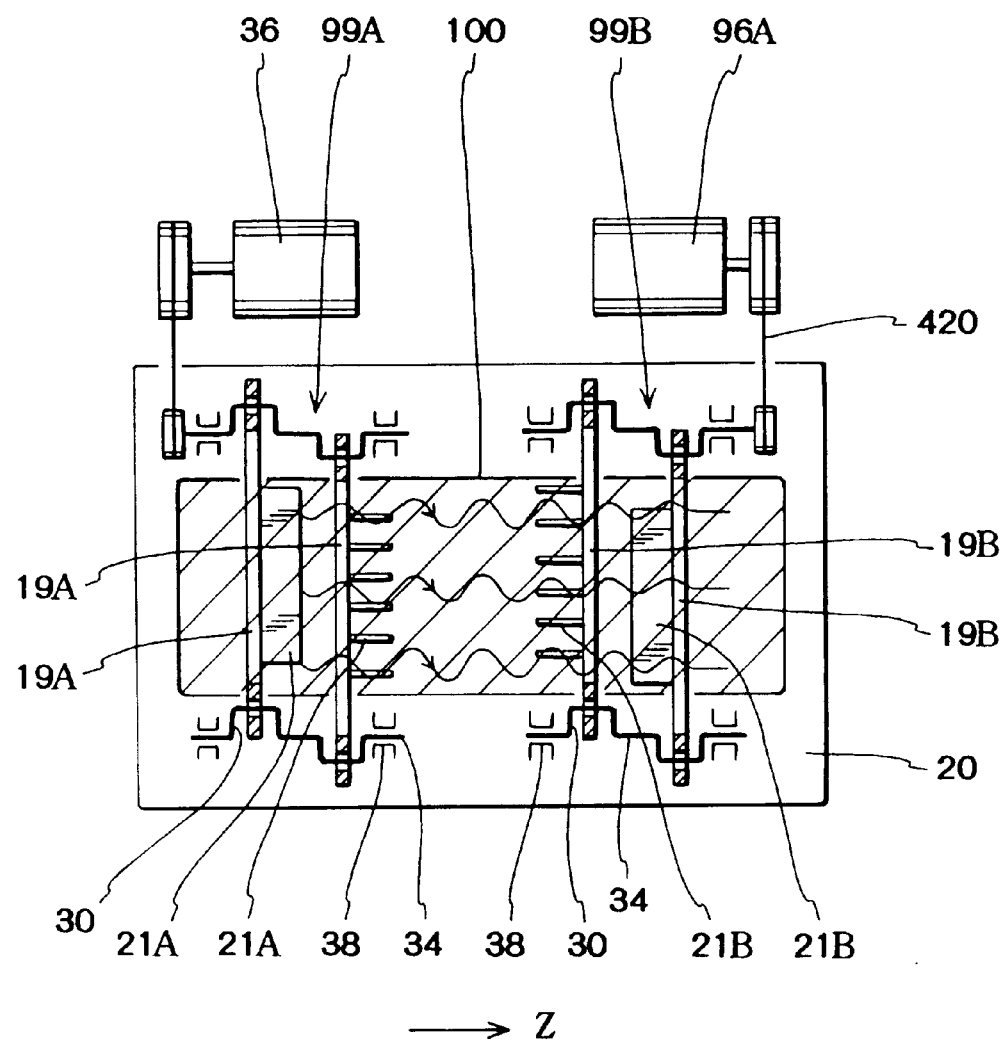
FIG. 54 is a sectional view of the motion converting unit of Twenty-seventh Embodiment, which can transmit energy.

The motion converting unit of Twenty-seventh Embodiment, which is capable of converting the wave motion flow to transmit energy, will be explained with reference to FIG. 54. Note that, structural elements explained in the former embodiments are assigned the same symbols and explanation will be omitted.

A first sub-unit 99A includes: a frame-shaped first holding member 19A provided in a plane 16 extending in a first direction X and a second direction Y perpendicular to the first direction X; a plurality of first swing fins 21A extending in a third direction Z, which is perpendicular to the first and second directions X and Y, from the first holding member 19A, each of the first swing fins having a first face and a second face, which cross a swing direction of the first swing fin 21A and which are capable of guiding a flow of a fluid, wherein a swing width of a free end of each first said swing fin 21A is wider than that of a base end 21a thereof when the first holding member 19A is moved in the direction parallel to the plane 16; and first guiding means for guiding the movement of the first swing fins 21A with the first holding member 19A.

A second sub-unit 99B includes: a frame-shaped second holding member 19A provided in a plane 16 extending in the first direction X and the second direction Y; a plurality of second swing fins 21B extending in the third direction Z from the second holding member 19B, each of the second swing fins having a first face and a second face, which cross a swing direction of the second swing fin 21B and which are capable of guiding a flow of a fluid, wherein a swing width of a free end of each second said swing fin 21B is wider than that of a base end 21a thereof when the second holding member 19B is moved in the direction parallel to the plane 16; and second guiding means for guiding the movement of the second swing fins 21B with the second holding member 19B.

The first subunit 99A converts a mechanical motion into a flow motion; the second sub-unit 99B converts the flow motion into another mechanical motion. To transmit energy from one to the other, the swing fins 21A of the sub-unit 99A and the swing fins 21B of the sub-unit 99B are mutually faced.

An inner space 100 is filled with a fluid, e.g., oil. A motor 36 and a driven member 96A are provided.

The guiding means of the Nineteenth Embodiment may be employed as the first and second guiding means, so structural elements explained in the Nineteenth Embodiment are assigned the same symbols and explanation will be omitted.

In the present embodiment, energy is transmitted by the wave motion flow of the fluid. Namely, rotational torque of the motor 36 is converted into the swing motion of the first swing fins 21A by the first guiding means, so that the wave motion flow of the fluid is generated. Then, the wave motion flow swings the second swing fins 21B, and the swing motion is converted into a rotational torque by the second guiding means, so that the driven member 96A is rotated.

In the motion converting unit of the present embodiment, the flow is the wave motion flow W so the flow can properly transmit the motion even if the inner space 100 is curved. Thus, direction of transmitting the motion or energy can be optionally designed. And, the motion converting unit can be used as a torque limiter for protecting a device.

Twenty-eighth Embodiment

In the above described embodiments, the end 21d of the swing fin 21 is integrally connected to the holding member 19. But the present invention is not limited to the embodiments.

The base end part 21a of the swing fin 21 may be merely held by the holding member 19, so the base end 21d need not to be fixed.

Figure 55A:
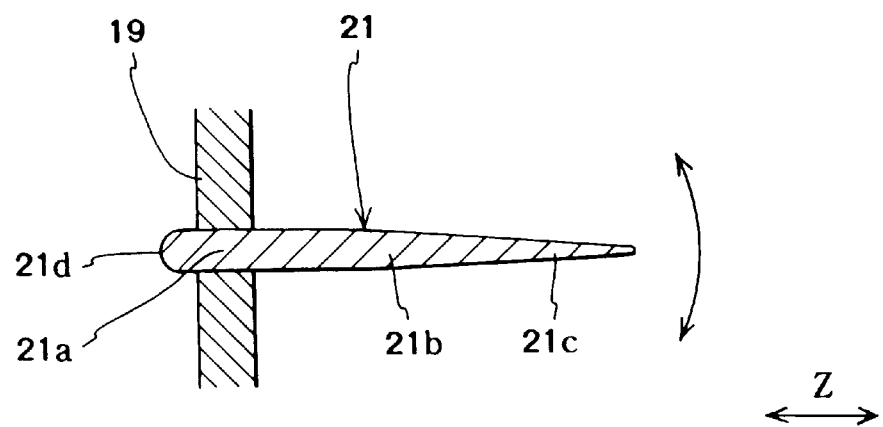
FIG. 55A and 55B are explanation views of the motion converting unit of Twenty-eighth Embodiment.
Figure 55B:
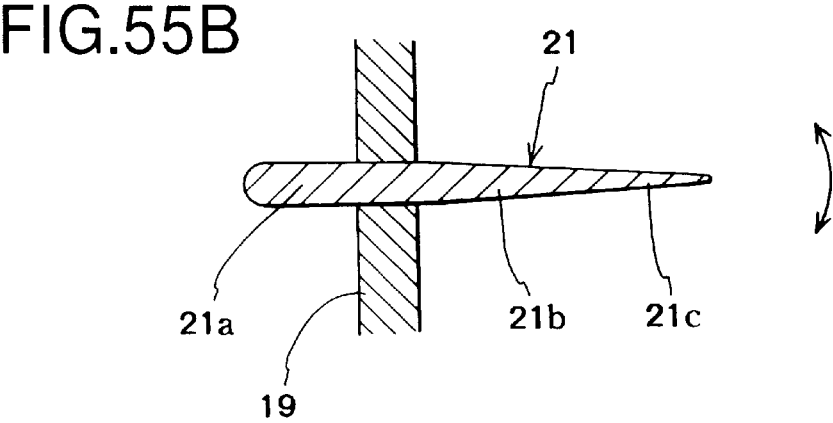

Twenty-eighth Embodiment will be explained with reference to FIGS. 55A and 55B. Projected length of a swing fin 21, which is the length of an intermediate part 21b and a free end part 21c projected from a holding member 19 rightward, can be changed. Namely, the swing fin 21 can be moved in a direction Z. By changing the projected length, the swing width (amplitude) of the swing fin 21 can be adjusted. If the projected length is long (see FIG. 55($a$)), the swing width can be made wider; if the projected length is short (see FIG. 55A), the swing width can be made smaller. Thus, in the case of generating the wave motion flow, the energy of the wave motion flow can be adjusted. On the other hand, in the case of generating the mechanical motion by receiving the wave motion flow, converting ability can be adjusted, so that an excessive motion of the swing fin 21 can be prevented, and a proper operation can be maintained.

Twenty-ninth Embodiment

In the above embodiments, a driven member, e.g., an electric generator, is driven by the guiding means, which moves the holding member 19 for holding the swing fin 21. But the present invention is not limited to the embodiments.

Figure 56:
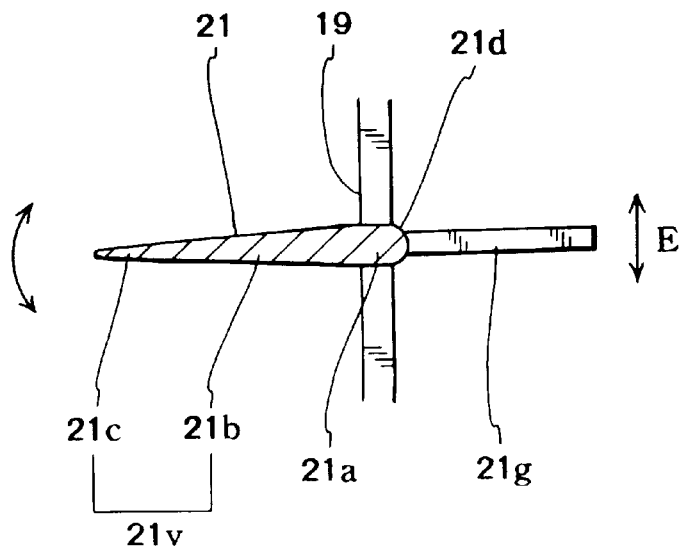
FIG. 56 is an explanation view of the motion converting unit of Twenty-ninth Embodiment.

In FIG. 56, a swing fin 21 has an arm section 21g, which is extended from a rear end 21d like a rod, and a base end part 21a is held by the holding member 19. Guiding means may be driven by the arm section 21g. The swing arm 21 acts like a lever. Namely, the base end part 21a, which is held by the holding member 19, acts as a fulcrum point; a part 21v, which includes an intermediate part 21b and a front end part 21c, acts as a power point; the arm section 21g acts as an action point. Therefore, a swing motion of the swing fin 21 makes a swing motion E of the arm section 21g. The swing action E of the arm section 21g may be used for driving an energy converting device, e.g., an electric generator, with the guiding means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A motion converting unit, comprising:
   a holding member provided in a plane extending in a first direction and a second direction perpendicular to the first direction;
   a swing fin extending in a third direction, perpendicular to the first and second directions, from said holding member, said swing fin having a first face and a second face, crossing a swing direction of said swing fin and capable of guiding a flow of a fluid, wherein a swing width of a free end of said swing fin is wider than that of a base end thereof when said holding member is moved in the direction parallel to said plane; and
   means for guiding the movement of said swing fin with said holding member, wherein a plurality of said swing fins are matrically and symmetrically provided, in parallel, in the first and second directions.

2. The motion converting unit according to claim 1, wherein rigidity of a base end part of said swing fin is greater than that of a free end part thereof.

3. The motion converting unit according to claim 1, wherein said swing fins are held by said holding member, said holding member having an opening section for introducing the fluid in the third direction.

4. A motion converting unit, comprising:
- a holding member provided in a plane extending in a first direction and a second direction perpendicular to the first direction;
- a plurality of said swing fins provided in parallel on said holding member, each of said plurality of swing fins being held by said holding member and extending in a third direction, perpendicular to the first and second directions, from said holding member, said holding member having an opening section for introducing the fluid in the third direction, each of said plurality of swing fins having a first face and a second face, crossing a swing direction of a respective of said plurality of swing fins and capable of guiding a flow of a fluid, wherein a swing width of a free end of each of said plurality of swing fins is wider than that of a base end thereof when said holding member is moved in the direction parallel to said plane;
- means for guiding the movement of said swing fin with said holding member; and
- wherein each of said plurality of swing fins and said holding member are formed in a swing fin unit, said holding member is formed into a frame shape, a bridge section is spanned in said frame-shaped holding member, each of said plurality of swing fins are integrally connected to said bridge section.

5. The motion converting unit according to claim 4, wherein a plurality of said swing fin units are matrically and symmetrically provided.

6. A motion converting unit, comprising a plurality of sub-units, serially arranged in a flowing direction of a fluid, wherein each sub-unit comprises:
- a holding member provided in a plane extending in a first direction and a second direction perpendicular to the first direction;
- a swing fin extending in a third direction, perpendicular to the first and second directions, from said holding member, said swing fin having a first face and a second face, crossing the swing direction of said swing fin and capable of guiding a flow of a fluid, wherein a swing width of a free end of said swing fin is wider than that of a base end thereof when said holding member is moved in the direction parallel to said plane; and
- means for guiding the movement of said swing fin with said holding member.

7. The motion converting unit according to claim 6, wherein said swing fins and said holding member of each sub-unit are formed in a swing fin unit, said holding member is formed into a frame shape and has an opening section for introducing the fluid in the third direction, a bridge section is spanned in said frameshaped holding member, said swing fins are integrally connected to said bridge section.

8. The motion converting unit according to claim 4, wherein said guiding means is a linear guide capable of linearly moving said swing fin in the direction parallel to said plane.

9. The motion converting unit according to claim 1, wherein said guiding means is a two-dimensional drive system capable of moving said swing fin, along a circular orbit, in a plane parallel to said plane without revolving.

10. The motion converting unit according to claim 9, wherein said two-dimensional drive system includes a plurality of crank levers, one end of each of said plurality of crank levers is fixed to a rotary shaft, said rotary shaft being rotatably provided to a body of said motion converting unit, the other end of each of said plurality of crank levers is pivotably connected to said swing fin, and a distance between said ends of each of said plurality of crank levers is fixed.

11. The motion converting unit according to claim 10, wherein at least one of said rotary shafts is connected to means for converting energy.

12. The motion converting unit according to claim 1, wherein said swing fin generates a flow of the fluid, with a wave motion, in the third direction when said swing fin is moved by a driving unit and said guiding means.

13. The motion converting unit according to claim 12, wherein said swing fin act as a propeller of an air blower.

14. The motion converting unit according to claim 12, wherein said swing fin acts as a propeller for generating a flow of the fluid.

15. The motion converting unit according to claim 12, wherein said swing fin is used for a driving mechanism of a ship.

16. The motion converting unit according to claim 12, wherein said swing fin is used for a driving mechanism of an aircraft.

17. The motion converting unit according to claim 4, wherein said driving unit is a vibrator, and said holding member is capable of elastically holding said swing fin so as to use sympathetic vibrations of said swing fin when said vibrator vibrates said holding member.

18. The motion converting unit according to claim 1,
- wherein said swing fin generates a mechanical motion when the flow of the fluid, which includes a wave motion, works to said swing fin and said guiding means.

19. The motion converting unit according to claim 18, wherein said swing fin is used for a wave electric generator.

20. The motion converting unit according to claim 18, wherein said swing fin is used for a wind electric generator.

21. A motion converting unit, comprising:
- a first sub-unit including:
  - a first holding member provided in a first plane extending in a first direction and a second direction perpendicular to the first direction;
  - a first swing fin extending in a third direction, perpendicular to the first and second directions, from said first holding member, said first swing fin having a first face and a second face, crossing the swing direction of said first swing fin and capable of guiding a flow of a fluid, wherein a swing width of a free end of said first swing fin is wider than that of a base end thereof when said first holding member is moved in the direction parallel to said first plane; and
  - first guiding means for guiding the movement of said first swing fin with said first holding member; and
- a second sub-unit including:
  - a second holding member provided in a second plane extending in the first direction and the second direction;
  - a second swing fin extending in the third direction from said second holding member, said second swing fin having a first face and a second face, crossing the swing direction of said second swing fin and capable of guiding the flow of the fluid, wherein a swing width of a free end of said second swing fin is wider than that of a base end thereof when said second holding member is moved in the direction parallel to said second plane; and second guiding means for guiding the movement of said second swing fin with said second holding member,
wherein the free ends of said first swing fin and the free end of said second swing fin are mutually faced, whereby said first sub-unit converts an inputted mechanical motion into a flow of the fluid, and said second sub-unit converts the flow into an output mechanical motion.

* * * * *